(12) United States Patent
Brown

(10) Patent No.: US 11,188,958 B1
(45) Date of Patent: Nov. 30, 2021

(54) SYSTEMS AND METHODS FOR MANIPULATION OF DIGITAL VIDEO CONTENT IN A NETWORKED COMMUNITY OF USERS

(71) Applicant: Jammal Brown, Ashburn, VA (US)

(72) Inventor: Jammal Brown, Ashburn, VA (US)

(*) Notice: Subject to any disclaimer, the term of this patent is extended or adjusted under 35 U.S.C. 154(b) by 0 days.

(21) Appl. No.: 16/258,164

(22) Filed: Jan. 25, 2019

Related U.S. Application Data

(63) Continuation of application No. 15/493,998, filed on Apr. 21, 2017, now Pat. No. 10,225,616.

(60) Provisional application No. 62/325,473, filed on Apr. 21, 2016.

(51) Int. Cl.
| | | |
|---|---|---|
| *H04N 21/274* | (2011.01) | |
| *G06Q 30/06* | (2012.01) | |
| *H04N 21/81* | (2011.01) | |
| *H04L 29/06* | (2006.01) | |
| *H04N 21/254* | (2011.01) | |

(52) U.S. Cl.
CPC ..... *G06Q 30/0601* (2013.01); *H04L 65/1069* (2013.01); *H04N 21/2542* (2013.01); *H04N 21/274* (2013.01); *H04N 21/812* (2013.01)

(58) Field of Classification Search
CPC ............. H04N 21/2542; H04N 21/274; H04N 21/812; H04N 5/225; H04N 5/232; H04N 7/18; H04L 65/1069; G06Q 30/0601; G06Q 30/0207; G06Q 30/08; G06Q 30/0645; G06Q 30/0609; G06F 17/50; G06F 9/455

USPC ........... 725/37; 703/21, 78, 80; 348/211.11; 347/207

See application file for complete search history.

(56) References Cited

U.S. PATENT DOCUMENTS

| | | | |
|---|---|---|---|
| 7,702,545 B1* | 4/2010 | Compton | G06Q 30/08 705/26.9 |
| 9,129,324 B2* | 9/2015 | Shimogori | G06Q 30/08 |
| 10,304,102 B2* | 5/2019 | Cheng | G06Q 30/0601 |
| 2002/0120935 A1* | 8/2002 | Huber | H04N 21/25891 725/60 |
| 2006/0221195 A1* | 10/2006 | Sohmers | H04N 7/173 348/211.11 |
| 2009/0063206 A1* | 3/2009 | Payne | G06Q 30/0601 705/5 |
| 2009/0248482 A1* | 10/2009 | Knyphausen | G06Q 40/04 705/37 |

(Continued)

*Primary Examiner* — Nathan J Flynn
*Assistant Examiner* — Caroline Somera
(74) *Attorney, Agent, or Firm* — Attentive Law Group, PLLC; Paul Ratcliffe; James Miner

(57) ABSTRACT

The invention provides systems and methods for manipulation of digital video content in a networked community of users. In a networked environment in a community of users, the invention provides for a product, for trade or buy, to be displayed in video form—with the video created by a user of the disclosed T-BOSSES platform. In particular, the systems and methods of the invention provide an optimized platform to engage a user who has an "item offering" as depicted in a video created by the user—with a second user interested in "item acquisition." The system leverages the power of video in a novel manner. Additionally, the system effectively coordinates interested users in a beneficial and efficient manner. Further, the system leverages the power of social media. The technology of the system provides a variety of other advantages and features, as are described in detail herein.

17 Claims, 38 Drawing Sheets

(56) References Cited

U.S. PATENT DOCUMENTS

| | | | |
|---|---|---|---|
| 2009/0265257 A1* | 10/2009 | Klinger | G06Q 30/02 705/26.1 |
| 2010/0070364 A1* | 3/2010 | Dugan | G06Q 30/02 705/14.43 |
| 2010/0088175 A1* | 4/2010 | Lundquist | G06Q 30/06 705/14.34 |
| 2011/0231260 A1* | 9/2011 | Price | G06Q 30/02 705/14.61 |
| 2011/0288910 A1* | 11/2011 | Garg | G06Q 30/0207 705/14.1 |
| 2012/0022965 A1* | 1/2012 | Seergy | G06Q 30/0639 705/26.4 |
| 2012/0197746 A1* | 8/2012 | Harris | G06Q 30/0601 705/26.1 |
| 2013/0339191 A1* | 12/2013 | Shanfeld | G06Q 30/0627 705/26.63 |
| 2015/0032563 A1* | 1/2015 | Moser | G06Q 30/08 705/26.3 |
| 2015/0046280 A1* | 2/2015 | Alston | G06Q 30/0609 705/26.4 |
| 2015/0205894 A1* | 7/2015 | Faris | G06Q 30/0207 703/21 |
| 2016/0148238 A1* | 5/2016 | He | G06Q 30/0224 705/14.1 |
| 2016/0300279 A1* | 10/2016 | Ahmed | G06Q 30/0605 |
| 2017/0103450 A1* | 4/2017 | Gonzalez | G06Q 30/08 |
| 2019/0244279 A1* | 8/2019 | Afaq | G06Q 30/0639 |

* cited by examiner

Fig. 24

Each "video item" processed by the T-BOSSES system is constituted by "video item content"

Such "video item content" includes:

- video media data, which is the actual "user created video" that is created by an "offering user" and viewable by "acquiring users," who have access to view the offered item; and

- video attribute data, which includes various associated data such as:
    - description of the video that the user enters in to the T-BOSSES platform.
    - distribution data of the video item that controls user distribution, i.e. to what users will the particular video item be accessible.
    - User data that maps the particular video item to the creating user.
    - Geo data that includes geographical association of the video item (the geo data may be mapped to the particular video item via the user data).
    - Date and time information of when the video was created.
    - Eye-stop data associated with the video
    - Other data associated with the video item.

Processing aspects of T-BOSSES platform (100) - 2400

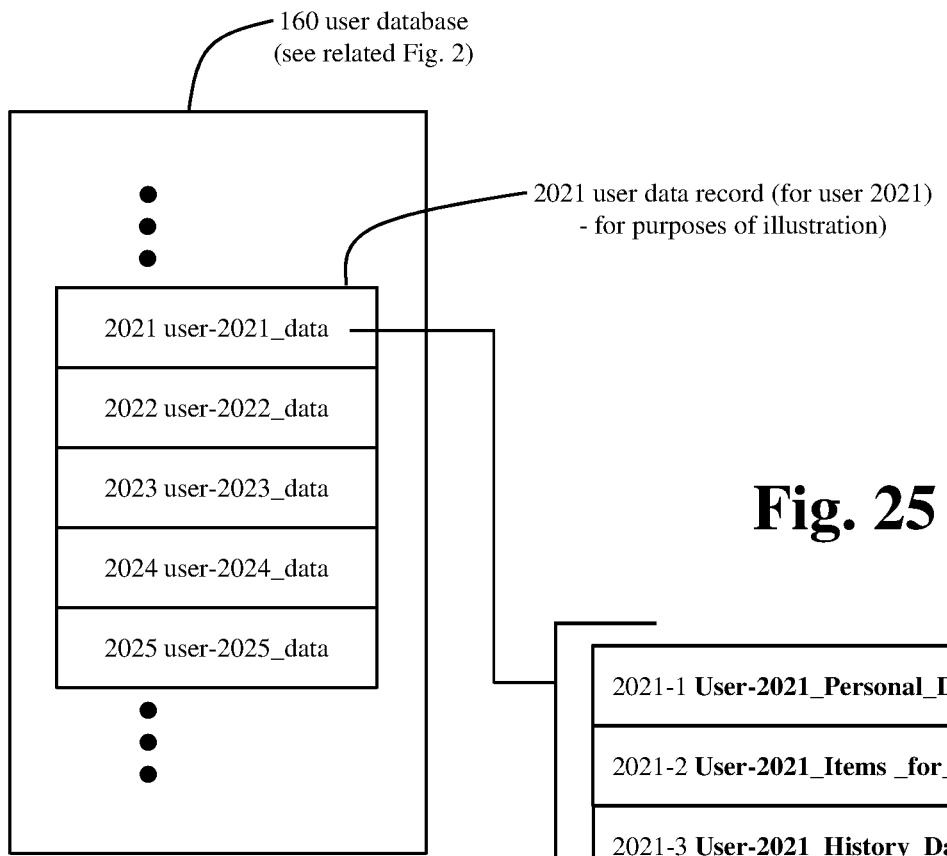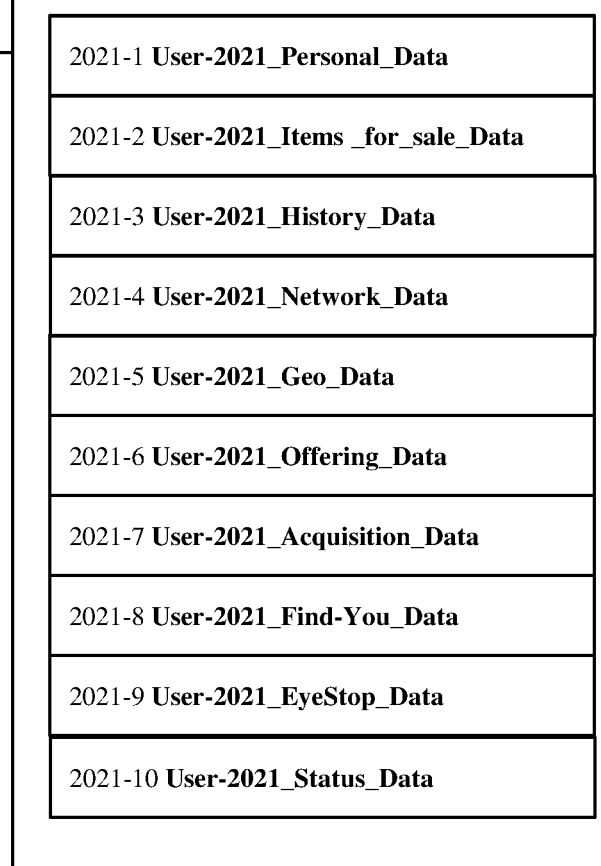
Fig. 25

2800 User-7 Queue Data Record

T-BOSSES provides a personal "videotized" retail platform. The platform allows users to create and post videos for personal retail (to sell or trade personal items), along with various associated functionality / processing.
- Traffic to a particular user's page increases the user's T-BOSSES "social status."
- Platform brings a "social status" environment to personal "videotized" retail.
- Allows an individual seller to reach buyers directly.

T-BOSSES provides a virtual "mall" like "structure" for personal retail, leveraging the power of video.
- Provides an authentic environment for users to create a personal retail experience of their own.
- T-BOSSES is great for both celebrities and non-celebrities.

Example features of the T-BOSSES platform:

(1) Platform provides for users to sell, buy, and trade items through video.

(2) Platform observes the activity of a user and gives a user opportunity to attain a social status based on how many people (other users) shop his / her page. In other words, the platform affords "social status" based on activity associated with the particular user.
- As a user's "social status" on the system is raised, that user is provided additional features:
- For example, a user may be granted "Big BOSS Status" based on activity associated with that user.
- For example, at a certain "level" the user's backdrop is unlocked to allow for icons.

(3) Platform allows geographic focus - a user can select a particular geographical area to sell his item, or in which to purchase an item. For example, Kirk Cousins only wants to sell game jersey in DC area.

(4) Platform includes various "exclusives." For example, "exclusive videos" are not automatically sent to users (buyers), but rather select buyers have to "search their favorite sellers." This feature promotes traffic.

(5) Platform provides "find you" feature in which a user designates a "find you" item. A user is provided with the ability to select a discrete number of items at a time, for example 5 items at a time) using descriptors, which that user wishes to purchase.

(6) "Eye Stop" feature addresses safety associated with use of the system, e.g. an "Eye Stop" (at which an offering user meets with an acquiring user to physically transfer an item) may be in a mall parking lot and/or might be associated with a major store, such as Walmart.

(7) The T-BOSSES Platform may adjust "tutorial assistance" to user, depending on the user's experience with the system.

Further processing aspects of T-BOSSES platform (100) - 3200'

Fig. 32

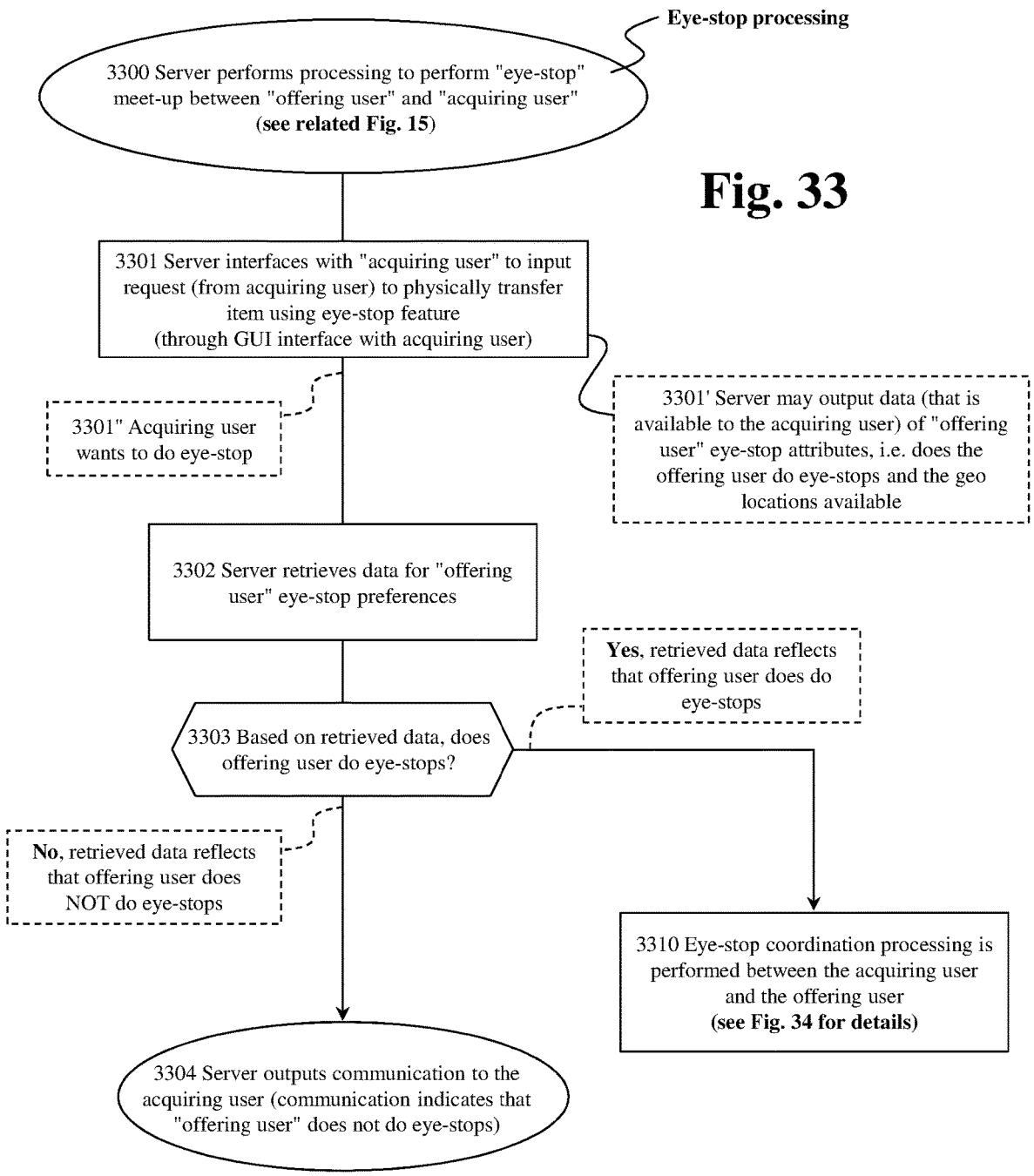

3710 button
User-7 taps when completed selection 3700 browser window

3700' T-BOSSES HOD (Highlight on Demand) GUI

SYSTEMS AND METHODS FOR MANIPULATION OF DIGITAL VIDEO CONTENT IN A NETWORKED COMMUNITY OF USERS

RELATED PATENT APPLICATION AND PRIORITY

This application is a continuation patent application of and claims priority to U.S. patent application Ser. No. 15/493,998, filed on Apr. 21, 2017. This application and U.S. patent application Ser. No. 15/493,998 claim priority to U.S. Provisional Patent Application 62/325,473 filed Apr. 21, 2016, the content of which is incorporated herein by reference in its entirety. The content of U.S. patent application Ser. No. 15/493,998 is incorporated herein by reference in its entirety.

BACKGROUND OF THE INVENTION

The systems and methods described herein relate to transfer of digital video content between users in a networked community of users.

In the present technological environment, people transfer items with other individuals using various platforms. However, current platforms are insufficient in various respects. Therefore, improvements are needed to accommodate the evolving needs of people. The systems and methods of the invention provide such improvements.

BRIEF SUMMARY OF THE INVENTION

The invention provides systems and methods for manipulation of digital video content in a networked community of users. The invention provides for a product, for trade or buy, to be displayed in video form—with the video created by a user of a disclosed T-BOSSES platform. In particular, the systems and methods of the invention provide an optimized platform to engage a user who has an "item offering" depicted in a video that is created by the user—with a second user interested in "item acquisition." The system leverages the power of video in a novel manner. Additionally, the system effectively coordinates interested users in a beneficial and efficient manner. Further, the system leverages the power of social media. The technology of the system provides a variety of other advantages and features, as are described in detail herein.

BRIEF DESCRIPTION OF THE DRAWINGS

The present invention can be more fully understood by reading the following detailed description together with the accompanying drawings, in which like reference indicators are used to designate like elements, and in which:

FIG. 24 is a diagram illustrating processing aspects of the T-BOSSES platform (100), in accordance with one embodiment of the invention.

FIG. 25 is a diagram showing a portion of a user database, in accordance with one embodiment of the invention.

FIG. 32 (3200') illustrates various processing aspects of the T-BOSSES system, in accordance with one embodiment of the invention.

FIG. 33 is a flowchart showing T-BOSSES processing to perform an "eye-stop" meet-up between an "offering user" and an "acquiring user", in accordance with one embodiment of the invention.

DETAILED DESCRIPTION OF THE INVENTION

Hereinafter, aspects of the systems and methods of the invention will be described in accordance with various embodiments. As used herein, any term in the singular may be interpreted to be in the plural, and alternatively, any term in the plural may be interpreted to be in the singular.

Figure 1:
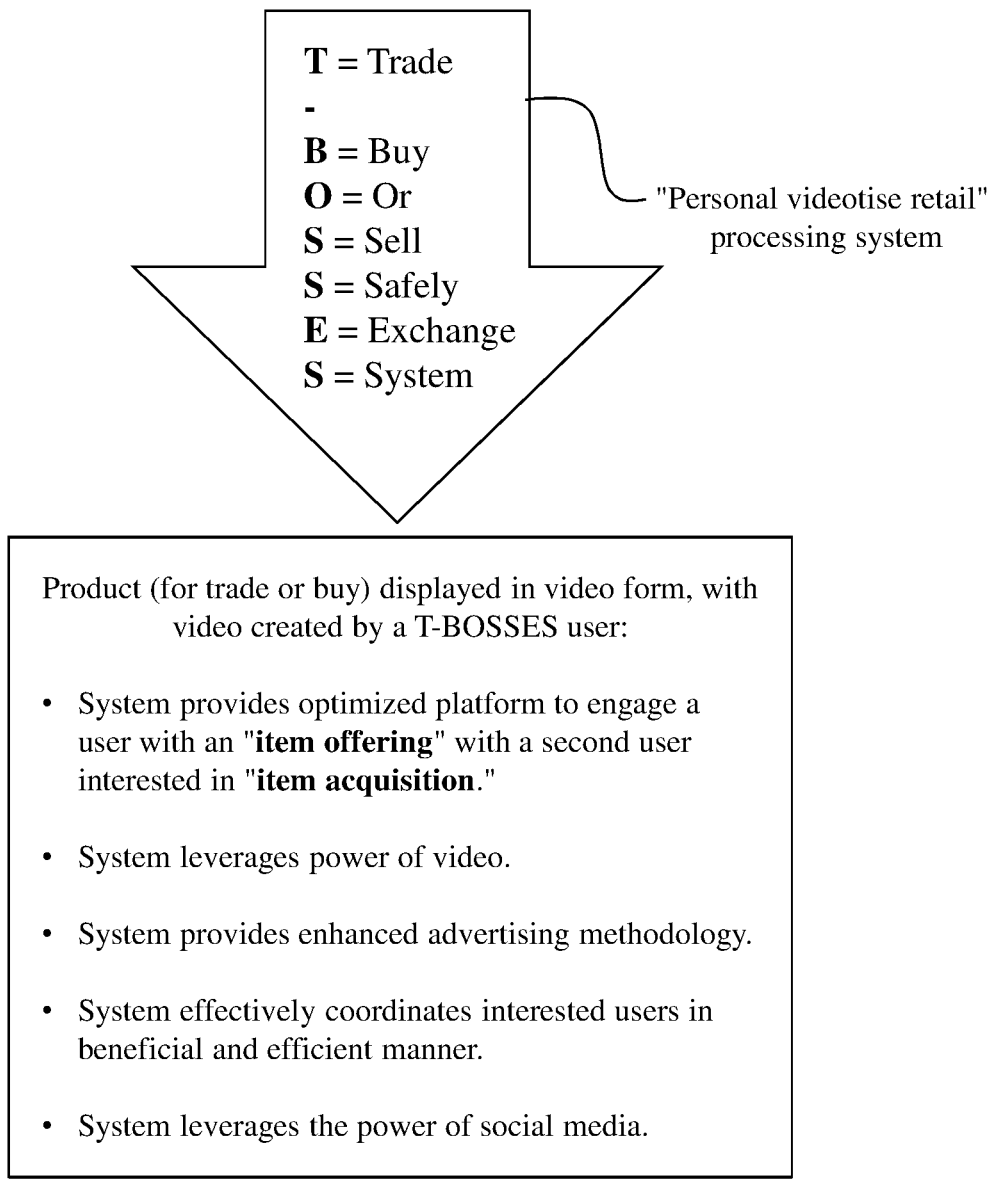
FIG. 1 is a diagram showing various aspects of the invention.

FIG. 1 is a diagram showing various aspects of the invention. The invention is directed to what is herein characterized as a "T-BOSSES" or alternatively "T-BOSS" system, which may also be characterized as a platform or server, for example. As shown in FIG. 1, the acronym reflects aspects of the invention including "T"rade "B"uy "O"r "S"ell "S"afely "E"xchange "S"ystems. As described in detail below, the invention provides a personal "videotize" retail platform. Operational components of the system may include, for example, a server that performs the various processing associated with the invention; an application or "app" component that may be disposed on a user's mobile device, such as for example a cell phone; and a webpage component through which a user may interact with the T-BOSSES server via a browser application on a personal device, such as a laptop. The T-BOSSES system allows users to buy, sell, or trade products with other users in a novel manner. As described in detail below, users may interact with other users on a local level, national level, or even grander scale. In accordance with aspects of the invention, products for sale or barter are displayed in video form, with the respective users (who are respectively selling the items) creating the videos themselves. As used herein, the term "video" may be understood to mean an electronic capture, over a period of time, of moving visual images upon a computer readable medium. For example, such "video" includes the common capture of "video" upon a person's cell phone, for example. Such "video" may be maintained on the computer readable medium in the form of a data file and electronically transferred over a network.

In further description of the invention with reference to FIG. 1, the invention provides for a product, for trade or buy, to be displayed in video form—with the video created by a user of the T-BOSSES platform. In particular, the system provides an optimized platform to engage a user—who has an "item offering" depicted in a video created by the user—with a second user interested in "item acquisition." The user with the item offering may be characterized as an "offering user" and the second user characterized as an "acquiring user". The system leverages the power of video in a novel manner. Further, the system provides enhanced advertising methodology. Additionally, the system effectively coordinates interested users in a beneficial and efficient manner. Further, the system leverages the power of social media. The technology of the system provides a variety of other advantages and features, as are described in detail herein.

As used herein, the terms "item" and "product" and other similar terms have been used interchangeably. Further, as used herein, the terms "trade" and "barter" and other similar terms have been used interchangeably.

In accordance with one aspect of the T-BOSSES system, the platform 100 provides functionality for an individual to create an account on the system. In accordance with one embodiment of the invention, the creation of a user account begins with that user's location. In particular, creation of a user account may include the setting of a preference of whether that user prefers to buy/sell from other users in his or her area, or alternatively, whether that user prefers to buy/sell from other users in a larger geographical area e.g. nationally.

As described in further detail below, each individual i.e. "user", may interface with the T-BOSSES platform via a T-BOSSES application (an "app") on the user's cell phone, for example, or alternatively, via a web browser on a suitable user device, such as a personal computer. Accordingly, hereinafter aspects of the invention will be described in the context of a web browser. However, it is appreciated the functionality described may well be provided in the form of an application (app) on a user's phone or through some other processing device and/or interface. The processing of the T-BOSSES platform provides for a user to interface with her account through a variety of interfaces that may be constituted into the environment of respective webpages. Relatedly, the T-BOSSES system provides for each user to create his or her profile page. In accordance with one embodiment of the invention, the creation of a profile page is a first step of becoming a user of the T-BOSSES system. Once the user creates a profile page, the T-BOSSES platform further creates and/or populates the particular user's account. Each user's account may be constituted by a collection of data records associated with that particular user. Based on the various data associated with the user's account, the T-BOSSES platform generates a variety of webpages (in a session with the user), in accordance with one embodiment of the invention, to interface with the user. Once a user account is created, each user may interface with the T-BOSSES platform via the collection of web pages, including a buy page, a sell page, and a trade page, for example. Each of the buy page, the sell page, and the trade page, may be generated by the T-BOSSES platform based on associated data records in the user database 160.

Each of the buy page, the sell page, and the trade page provide for respective processing and functionality as described below. A user's "sell page" includes all the videos of items the particular user is selling. Further, the user's "trade page" includes a description of items that particular user is willing to trade their "sell" items for. It is appreciated that the particular interrelationship between a sell item, a buy item, and a trade item may differ between various embodiments of the invention.

In addition to the webpages described above, there may be a "cover page" generated by the T-BOSSES platform. In accordance with one embodiment, the cover page includes both paid advertisements as well as a search engine interface. More specifically, paid advertisements may be disposed at the top of the cover page and the search engine, i.e. a suitable interface box to accept search criteria, disposed at the bottom of the cover page. As a result of this particular spatial arrangement, a user may be prompted to review the various advertisements disposed at the top of the webpage in conjunction with scrolling down to the bottom of the webpage—to access the search engine. In other words, a user is prompted to scroll down through various advertisements before typing in his or her search criteria.

The cover page, as generated by the T-BOSSES platform and displayed via a user's browser, may also show data regarding top sellers of the T-BOSSES platform. The T-BOSSES platform performs various data manipulation and related processing associated with such "top sellers." In particular, the "top sellers" webpage may include data regarding which sellers (of the T-BOSSES platform) have the most shoppers to that "sell" page. The particular manner in which the T-BOSSES platform processes data to determine which sellers have the most shoppers may vary. In accordance with one embodiment, the particular metric utilized may include "clicks on videos" disposed on a particular user's web page. The cover page (generated by the T-BOSSES platform and presented to the user via browser) may also include what is here characterized as "items of the week". In accord with one embodiment of the invention, "items of the week" may be constituted by particular items attaining a threshold level of sales through the T-BOSSES platform. More specifically, the threshold level of sales may be constrained to a specific geographical area. Accordingly, for example, items of the week might include the top 5 selling items in the Norman, Okla. geographical area. It is of course appreciated that the particular attributes of a sold item—and whether those attributes factor into a particular "items of the week" determination—may be varied as desired. A user may be provided with the opportunity to opt in to have access to the "items of the week" or not to "opt in." To "opt in" a user may be required to pay a nominal fee to access the "items of the week" such as $1 per month to see the top items sold (in his or her area) each week, for example. Various details of such features are described below in connection with more specific disclosure of particular data manipulation and processing.

One aspect of the T-BOSSES system is the "trade" component. The T-BOSSES system allows a user to trade an item, in the possession of that user, with an item offered by a second user. The T-BOSSES system provides an entirely novel approach, as constituted by the particular manipulation of data and processing performed by the T-BOSSES system, for those buying, trading and selling items online.

Through interface with the T-BOSSES system, users generate videos of items they are willing to trade for—and post the created video to the user's trade page, in accordance with one embodiment of the invention. Subsequent to the user posting her video on her trade page, the T-BOSSES platform does not send the particular video to others. Rather, the video will be disposed on the particular user's trade page—for others to see and look at on their own. Also, on the user's trade page, the user can list items he or she is looking to trade for. As an example, say a user possesses a watch that the user wishes to trade. In accordance with one embodiment, the processing of the T-BOSSES platform provides for the particular user to take a video of that watch (he wishes to sell). The T-BOSSES platform interfaces with the user, and specifically interfaces with the user device of the user, to post that video on the particular user's "trade page." The user also interfaces with the platform to list items the user is looking to trade the watch for. So, for example, the user might interface with the platform to put an iPod down as an item that user is trying to trade his watch for. In the processing of the invention, other users (e.g. a second user) are provided access to come to the "selling user's" trade page.

Accordingly, if the second user comes to the first user's trade page, likes the watch, and wants to trade for the watch—the T-BOSSES platform provides processing to effect such transaction. Specifically, the second user interfaces with the T-BOSSES platform via the web browser of the second user, to ask for a trade. The first user then interfaces with the T-BOSSES platform via her web browser and is presented with a particular item that the second user wishes to trade. Thereafter, the first user interfaces with the platform to indicate whether the first user wishes to perform the trade or whether the first user does not wish to perform the trade. Such processing is performed by the system utilizing various data manipulation as is described below. For example, various rules are implemented by the T-BOSSES platform to control access to data by both the first user and the second user (in this example), as well as to control the options presented to the first user and the second user. Additional details are described below with further focus on the technical aspects of the processing, the particular data that is utilized, and the particular manner in which the data is manipulated.

In relation to a more humanistic aspect of the invention, it is appreciated that the systems and methods of the invention will appeal to a wide variety of users for a variety of reasons. Illustratively, it is envisioned that a major key market for trade, utilizing the T-BOSSES system, will be mothers. There are extensive moms groups and moms clubs that exist online (Facebook, Twitter, etc.) and that exist in the physical world through local communities, for example. Moms are generally very involved in trading with other moms for kids items and/or baby items. For example, one mother with a booster car seat may trade another mom for an infant car seat. With the processing described in further detail below, the T-BOSSES platform provides a trading marketplace for moms to do this easily and efficiently. Illustratively, another market space that the T-BOSSES platform is relevant to is the shoe area. For instance, utilizing the processing of the T-BOSSES platform, a first user with a pair of Jordan sneakers may trade with a user for a different style of Jordan sneakers, for example. It is also envisioned that the technology of the T-BOSSES platform will create a large marketplace for trading electronics. For example, a first user with an iPhone may trade that iPhone with another user who has an iPad. Each of the first user and the second user will interface with the T-BOSSES system to record a video of their respective items, post each user's respective video, and interface with the T-BOSSES platform to engage in and approve the transaction, i.e. approve of the trade. The invention provides this functionality utilizing various manipulation of data and related processing.

A further aspect of the T-BOSSES platform is the "buy" component. In accordance with one embodiment of the invention, the "buy" component of the invention effectively allows an item (posted by another user) to find you. Accordingly, the T-BOSSES platform provides what might be characterized as "find you processing (FY processing)" in which a user designates a "find you item (FY item)." That is, in accord with one example of the invention, a user is provided with the ability to select a discrete number of items at a time, which that user wishes to purchase. For example, the number of items that a user may select to buy, at a time, might be constrained to two FY items. Such two FY items can be any two things (i.e. items) that the particular user is currently looking to buy. For example, a user might select Jordan basketball shoes and handbags as the user's two FY items, which that user is currently looking to buy. Thereafter, if a video (for a product) is posted that contains either of these 2 items, the user will be immediately notified of such posting. In one embodiment of the invention, the T-BOSSES platform generates a data record that represents an item the first user is interested in purchasing, i.e. the "find you" item (FY item). In particular, the T-BOSSES platform interfaces with the first user to input representative attributes that reflect the item in which the first user is interested in purchasing. In addition, the T-BOSSES platform also generates a second data record through interface with a second user. This second data record represents an item that the second user is interested in selling. In particular, the T-BOSSES platform interfaces with the second user to input representative attributes that reflect the item that the second user is interested in selling. The find you processing of the invention may utilize both description and geolocation controls. For example, the number of characters with which a user describes a find you item (that the user desires) may be limited. Further, find you processing of the invention may be limited to any particular geographical region—around the user (who is looking for the item). It is appreciated that various alerts may be utilized with find you processing, such as alerting a user of an identified item—which has been matched with her find you description.

On an ongoing basis, the T-BOSSES platform runs comparison processing between items for sale vis-à-vis FY items. More specifically, the T-BOSSES platform performs such comparison processing utilizing the respective attributes associated with the various (i.e. potentially millions) of items for sale vis-à-vis the various (i.e. potentially millions) of FY items. Such comparison processing may include initial normalization of the attributes associated with items. For example, such normalization may include processing to equate "bag" to be interpreted in same manner as "bags". The comparison processing may further include thresholds that dictate whether a particular item for sale will be identified as a hit for an FY item sought out by another user. For example, the thresholds might relate to the particular number of attributes that match between an item for sale and an FY item. Illustratively, if each of the item for sale and the FY item has 5 attributes—and only 2 of those attributes match—the platform may not identify a hit. On the other hand, if each of the items has the 5 attributes, and 3 of those attributes match –then the platform may indeed identify the particular item for sale as a hit vis-à-vis the particular FY item.

Accordingly, in such FY processing, a first user identifies an FY item that she wishes to buy—and in due course—the T-BOSSES platform identifies an item being sold that sufficiently corresponds to the first user's FY item. Once the T-BOSSES platform identifies the sufficiently corresponding item (that is being sold)—the first user is immediately notified via a suitable interface/communication between the first user and the T-BOSSES platform. That first user will then have an opportunity to decide if that first user wants to pursue buying the sufficiently corresponding item (that is being sold).

If the first user is indeed interested in buying the item, then the T-BOSSES platform will perform processing characterized as placing the first user "in-line". In accordance with one illustrative embodiment of the invention, each video item can have up to 5 people in line to buy a particular item. Illustratively, each person, consecutively, receives 2 hours to determine if they want to buy the particular item. If not, then (through interface with the T-BOSSES platform), the offer to buy will be extended to the next user in line. In accord with one embodiment, during the 2 hour window, the potential buyer can contact the seller through the T-BOSSES platform "message" system with any questions regarding the particular item being offered for sale. In more specific terminology, a user who is "in-line" and who has not yet reached the 2 hour window (in which that user may actually buy the item)—is herein characterized as "in-line waiting". On the other hand, a user who is "in-line" and who is currently in the 2 hour window (in which the user may actually buy the item)—is herein characterized as "in-line active". Various further details of such in-line processing are described below in conjunction with more technical aspects of the invention.

A further aspect of the T-BOSSES platform is the "sell" component. The T-BOSSES platform utilizes a novel approach, including various technical functionality, to allow a user the ability to actually be a "salesperson." More specifically, the T-BOSSES platform provides a highly conducive environment and associated tools through which a user may sell his or her items in a highly effective manner utilizing video. It is appreciated that the T-BOSSES platform's utilization of video, and the various tools provided by the platform, are much more effective than mere pictures commonly utilized in known personal retail. It is appreciated that a seller indeed wants to possess the ability to show her item (i.e. the item wishing to be sold), talk about her item, and indeed advocate in a verbal manner regarding her item. The T-BOSSES platform provides an environment and tools that embrace this desire of sellers.

In accordance with one embodiment of the invention, the particular length of the video (i.e. duration of the video) may be limited by the T-BOSSES platform. For example, the duration of a video that a seller posts to his or her page might be constrained to 45 seconds or less. It is of course appreciated that the particular duration of time may be varied as desired. For example, the particular nature of the item for sale might dictate the maximum duration of a posted video. Relatedly, the maximum duration of a posted video might depend on the complexity of the item for sale, the price of the particular item for sale, or might depend on some other attribute of the item.

Once a user posts a video (directed to an item the user wishes to sell) buyers that have this item selected, as one of their two items, will receive a notification alert of the posted video. Relatedly, as described above, a user can select whether the user wishes to sell to people nationally, within just the state of the user, or within some local area or geographical area, for example. What is a "local" area might be designated by proximity to the user, e.g. 50 miles. In accordance with one embodiment of the invention, a user (selling an item) indeed sets the particular price of the item. In accord with aspects of the invention, each seller will want to price his or her item well in order to gain good social status to personal retail as provided by the T-BOSSES platform. Further details are described below.

Various aspects of the T-BOSSES platform providing and utilizing status mechanisms are described throughout this disclosure. Further features include that, for example, an offering user who has sufficient activity might be characterized as "trending". As a result, various attributes might be associated with such user, such as placing all trending users on one side of a T-BOSSES page. It is appreciated that various aspects of a particular user's status on the system may indeed be pushed out to other users in any suitable manner. For example, upon a user attaining "boss mode" and/or a "blast out"—this event may be published to a relevant T-BOSSES population via push messaging or otherwise.

The T-BOSSES system may monitor and control various aspects of videos posted by users. Such monitor and control may utilize various attributes of a video. For example, the amount of time that a video remains posted (e.g. a day) may be controlled by the T-BOSSES system. Such processing performed by the platform may utilize a suitable set of programmed rules vis-à-vis attributes of the user's videos. Each video posted by a seller might automatically delete after some set period of time, e.g. 24 hours. The seller can then repost another video of that same item if the item does not sell in the initial 24-hour period, or some other predetermined time period. Further, the T-BOSSES platform may monitor and control the number of videos posted by any given user. For example, each seller may be allotted up to 10 videos at a time, with each video of a different item, i.e. a total of 10 products the particular user is trying to sell. Accordingly, if that user sells one of those products, the user can take that video off her page (or alternatively the T-BOSSES platform automatically takes that video off upon sale of the product)—and then the user can post another video for an additional product.

Illustratively, it might be the situation that a seller posts his or her allotted videos and none of the items sell. In this situation, the seller may simply take all of those 10 videos down and put all new videos up. It is of course appreciated that the particular number of videos allotted to a particular user may vary. Accordingly, instead of a maximum of 10 videos, the T-BOSSES platform may allow a maximum of 12 videos or any other number as desired. Further, the T-BOSSES platform might limit the number of a particular type of video. In similar manner as noted above, such processing may utilize a suitable set of programmed rules vis-à-vis respective attributes of posted videos. Videos may be respectively associated with a particular category of product. Accordingly, the platform might be programmed to limit the number of postings associated with any given category. Illustratively, there may be a "home goods" category and a "sports gear" category. In such situation, the platform may be programmed to limit postings to 2 postings in the home goods category and 2 postings in the sports gear category. The particular maximum number of postings may of course vary as desired. Further, the particular number and types of categories may of course widely vary as desired. Functionality may be provided by the T-BOSSES system to allow a user to browse for items in her geographical area using various criteria. For example, a user may browse for items, via the T-BOSSES platform, using categories, topics of the day, searching, top items in her area, or other methodology or mechanism. In accordance with one aspect of the invention, access of any particular user to "top items in your area" or other desirable information may be restricted in some manner. Such restriction might be based on the particular status of the user or based on some other attribute of the user.

The T-BOSSES platform provides processing and tools to allow an individual, in his or her home, to be a highly effective and efficient seller. A user (seller) may interface and work with the system such that over time the seller evolves his or her approach to selling using the T-Bosses system. In addition to providing ease of use and effectiveness, the platform also provides an environment in which a user can, through video post, promote and sell an item in safety. Illustratively, users may be encouraged to use a backdrop or an area in their home that does not show any pictures or give any indication of location. It is envisioned that a user need not show any personal attributes in a posted video, including not showing the user's living space. However, it may be provided, through the processing of the platform, to disclose a user's face once a purchase and/or barter has been completed. For example, a buyer might request to see a seller's face prior to a meet up to transfer a purchased item. Similarly, a seller might request to see a buyer's face prior to a meet-up. Such disclosure of a user's face might also be generated in some automated manner by the T-Bosses platform. For example, the programming of the platform may provide for both the seller's face and the buyer's face to be displayed to the other upon a purchase or barter, i.e. an acquisition, being completed. Additionally, such programming of the platform may be contingent on preference settings of each respective user. For example, a set of programmed rules and preferences set by a user may dictate that user's face is not automatically displayed to another user upon completion of a transaction—but rather only upon request.

In accordance with one aspect of the invention, the T-BOSSES platform provides processing and tools to give a more "s"afe feeling to buying and selling online and the associated physical exchange of a purchased item. For example, it may be the situation that two users meet and exchange an item in person. In such a situation, the programming of the platform may provide that each person, i.e. user, sends the other user a video of themselves. This capability will give each person knowledge of who they are meeting, before meeting them. The safety aspects of the T-BOSSES platform of the invention are further enhanced by processing, performed by the platform, characterized as an "Eye-Stop". The Eye-Stop processing relates to the T-BOSSES platform being programmed to provide predetermined geographical locations at which 2 parties in a transaction may meet. For example, the T-Bosses platform may interface with users and/or platform administrators to input predetermined locations in a particular geographical area. Such predetermined geographical locations might be a particular gas station or restaurant in various towns around a particular area of the country, for example. The Eye-Stop processing may include the system retrieving data of available Eye-Stop locations as well as data regarding the geographical location of each user in a transaction. As described in further detail below, the Eye-Stop processing might then determine the proximity of each user in the transaction vis-à-vis each available Eye-Stop location. A suitable methodology might then be utilized to determine which Eye-Stop location is best weighing (1) the proximity of each user involved in the transaction vis-à-vis each available location against (2) a differential value of how far each user needs to travel for each respective Eye-Stop location. However, above and beyond the distance considerations and related processing, the T-BOSSES platform provides (through the Eye-Stop processing) a predetermined safe location at which users may complete a transaction by physical exchange of a purchased or bartered item.

In accordance with embodiments of the invention, a further component of the T-BOSSES platform is the "e"xchange component. Through the processing and tools of the T-BOSSES platform, the platform allows for individuals to meet in person to exchange an item for money (in the case where funds are not electronically transferred), or alternatively, an item for bartered item. The system may also provide for the electronic transfer of funds in conjunction with the transaction. Such electronic transfer of funds may be performed through interface, of each respective user, with the T-BOSSES platform and utilizing some suitable payment mechanism. For example, the T-BOSSES platform might be provided with a payment mechanism utilizing PayPal, for example. Illustratively, in an example situation, 2 people from opposite sides of the country trade items. In such situation, no exchange of physical funds (i.e. cash) would be involved—and each user involved in the transaction would be responsible for the shipping and handling of that user's respective item.

In accordance with embodiments of the invention, a further component of the T-BOSSES platform is indeed the "s"ystem itself. The processing and tools of the T-BOSSES platform will be available to users in application form, such as through an "app" on iOS and/or android systems. The T-BOSSES platform will provide processing and tools that provide capabilities and benefits not available in other known systems. Features and technical aspects of the system are described throughout the application.

In accordance with embodiments of the invention, a further component of the T-BOSSES platform is the "s"ocial media component. The T-BOSSES platform provides various technical features that are effective and useful in the social media environment in which we live. Social media has an extremely strong impact on people today. Apps and sites, such as Twitter, Instagram and Facebook, continue to set the stage for the future in people selling themselves, including their strengths and attributes. In accord with one aspect of the invention, the T-BOSSES platform provides individuals, i.e. users, an opportunity to reach a social status based on how many people "shop" on that particular user's page. It is envisioned that this aspect of the processing (of the T-BOSSES platform) is distinct from various other social media sites because other sites tend toward status attributed based on selling and sales. However, the processing afforded by the T-BOSSES platform relates to how good a user is at selling items. The more you sell, the more people look at your videos of items for sale, and the higher your social status will be on T-BOSSES. Each "salesperson" on the T-BOSSES platform will be able to show others their status by the number of "shoppers" on that particular user's page. The T-BOSSES platform will keep track of each individual's, i.e. user's, number of shoppers. In accord with one embodiment, the "number of shoppers" is based on the number of people that have clicked on that user's videos. Accordingly, sellers will gain a reputation on the T-BOSSES platform by the particular user's number of shoppers. As a result, the platform provides a particular user a social status in a retail environment—creating status for those that do well "selling". For instance, just as millions of people follow a business owner on Twitter because of their success—with the T-BOSSES platform, sellers will get a large following (a.k.a. a large number of shoppers) based on the user's success in selling. Accordingly, with the technical features of the invention described below, the T-BOSSES platform provides for the generation of a social media social status that is brought to online retail. Offering good prices and being a good salesperson will create a large shopper following. It is appreciated that social media status has a substantial impact on people today and the T-BOSSES platform will give social media impact, in addition, to providing an avenue to buy and sell items through the generation and posting (by the user) of video medium to promote the particular item.

Hereinafter, further aspects will be described that are provided by the processing of the T-BOSSES platform. Illustratively, the situation might be that a user has 10 videos posted of items for sale (the maximum number of videos that may be posted at a time, in accordance with one embodiment of the invention) and that user has 5 people "in-line" to purchase each item (the maximum number of people in-line at a time in accordance with one embodiment of the invention). As a result, that user has a total of 50 people, in-line, at a time to purchase items for which that particular user has posted videos. It is appreciated that such situation, observed by the T-BOSSES platform via processing of the data associated with that particular user, represents substantial success by the user. As a result, the platform is programmed, based on a set of rules and data associated with such situation, to tag that user with specific social indicators. In other words, in a novel environment, the T-BOSSES platform observes the activity of a user (and potential buyers interacting with that user) and associates status to that activity. Illustratively, if the above situation is observed by the system through data, the platform will grant that user "Big BOSS Status"—meaning that the user will temporarily be associated with indicators reflecting such status. Additionally, such status may be output to a substantial number of users, i.e. millions. This dynamic, i.e. functionality, is characterized in the invention as a "Blast-Out." This "Blast-Out" functionality, as provided by the processing of the invention, causes more people to look at that particular user's page, thus creating even more shoppers to that user's page, and thus gaining even more status to that user. A "Blast Out" may be performed automatically upon "Big BOSS Status" being attained by the particular user—or alternatively—may be dependent on additional factors, such as other social status attributes, for example.

In accordance with embodiments of the invention, the invention also provides what is herein characterized as a "VidView". A VidView is constituted by a review by video, by a second user, of a first user's posted video (of an item being sold by the first user). In particular, a VidView may be constituted by a video that the buyer can generate—and push to the sellers page—reviewing the item that the second user purchased from the first user. A VidView may be available for some predetermined time, such as 48 hours, for example. After the predetermined time expires, the T-BOSSES platform may automatically delete the VidView. In accordance with one embodiment of the invention, a separate webpage may be generated and dedicated to VidViews of a user's sold products.

In accordance with one embodiment of the invention, the T-BOSSES platform may include a processing portion dedicated to real estate and related items. In such processing, a user may click on a separate link or page to lead that user to the real estate page generated by the T-BOSSES platform. Owners and realtors will be able to post videos of land, homes and/or commercial property for sale. The systems and methods of the invention, and that processing described below, will be highly useful with such product. Users may generate videos that will effectively show a true representation of land and/or property for rent or sale.

In accordance with a further processing component of the T-BOSSES system, a seller is presented with the opportunity to post what is herein characterized as an "exclusive video" to that user's webpage. With this processing, the exclusive video will not get sent automatically to buyers that have that item listed under their "items". Rather, for exclusive videos, buyers will have to search their favorite sellers for exclusive videos. Accordingly, the systems and methods of the invention afford a strategy mechanism to encourage sellers to have good items and good prices, i.e., so as that seller can gain a higher social status. In this environment, users will look to (and at) their favorite sellers to post exclusive videos. In this context, is appreciated that it is important for sellers to have a good and prominent reputation when posting exclusive videos. Accordingly, the "exclusive video" mechanism of the T-BOSSES platform can be beneficial to both sellers and buyers.

Hereinafter, further aspects of the systems and methods of the invention will be described relating to the processing performed by the T-BOSSES platform 100.

Figure 2:
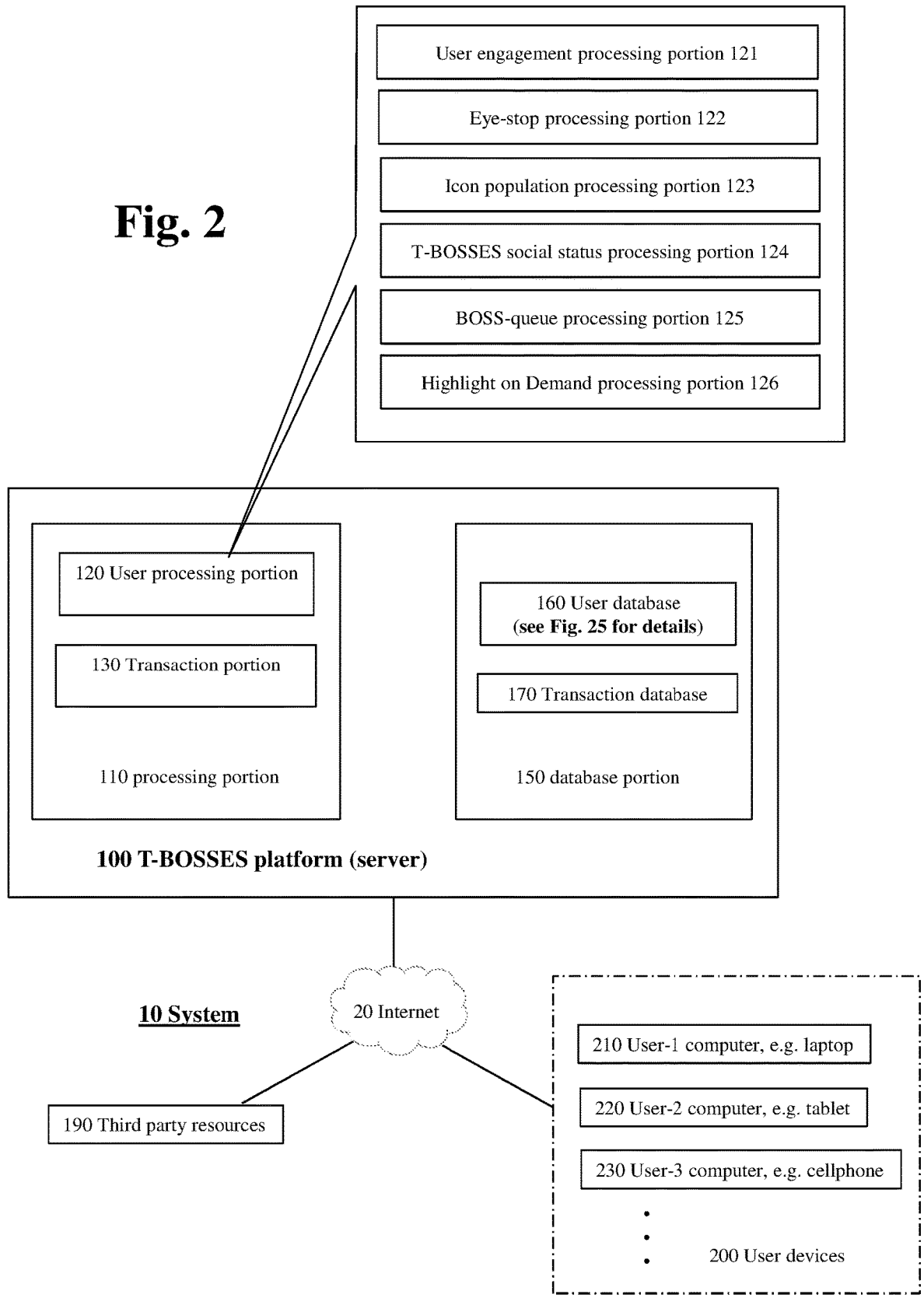
FIG. 2 is a block diagram showing a system 10 in accordance with one embodiment of the invention.

FIG. 2 is a block diagram showing a system 10 in accordance with one embodiment of the invention. As shown, the system includes a T-BOSSES platform 100. The T-BOSSES platform 100 may be in the form of one or more servers. The platform portion includes both a processing portion 110 as well as a database portion 150.

The processing portion 110 includes a user processing portion 120 and a transaction portion 130. In accordance with one embodiment of the invention, the user processing portion 120 performs a wide variety of processing associated with the buy, trade, and sale of items amongst individuals (i.e. users) and other entities. In particular, the transaction portion 120 performs processing related to the input of videos (by users) promoting an item the user wishes to sell or trade, as well as a wide variety of processing related to the interaction between users involved in the buy, trade, and sale of items. Relatedly, the transaction portion 130 performs processing related to the exchange of funds in connection with the buy and sale of an item.

In accordance with some embodiments of the invention, the use of processing portion 120 may include sub processing portions that perform specialized processing of the invention, as described herein. The user engagement processing portion 121 may perform a wide variety of user processing not otherwise performed by the user processing portion 120. The eye-stop processing portion 122 may perform eye-stop processing as described herein. The icon population processing portion 123 may perform icon population processing. The T-BOSSES social status processing portion 124 may perform various processing relating to the social status of users. The BOSS-queue processing portion 125 may perform BOSS-queue related processing as described below. Further, the Highlight on Demand processing portion 126 may perform HOD related processing as described below with reference to FIGS. 35 to 37. It is appreciated that some of such processing may be performed via a suitable "app" on a user device—as opposed to being performed by the T-BOSSES platform 100.

The database portion 150 stores a wide variety of data used by the processing portion 110 and/or generated by the processing portion 110. In parallel to the processing portion 110, the database portion 150 the database portion 150 includes a user database 160 and a transaction database 170. Accordingly, the user database 160 includes various data used by and/or generated by the user processing portion 120. Further, the transaction database 170 includes various data used by and/or generated by the transaction portion 130. Further details and technical aspects of such processing and associated data described in detail below.

The system 10 also includes a plurality of user devices 200 as well as third-party resources 190. The platform 100, third-party resources 190, and user devices 200 may be in electronic communication with each other via the Internet or some other suitable network.

As noted above, the system includes a plurality of user devices 200. Such "plurality" may include thousands and likely millions of user devices. Such user devices (210, 220, 230) as represented in FIG. 2 may be in a wide variety of forms. For example, the user devices might be in the form of a laptop, a tablet, a cell phone, or any other user device (as further describe below) capable of interfacing with the platform 100 as described below.

The third-party resources 190 represent that the platform 100 may be provided access to a wide variety of external data resources. For example, the third-party resources 190 might be in the form of advertising resources, which are input and displayed on webpages generated by the platform 100 (and displayed to users of the T-BOSSES platform).

Figure 3:
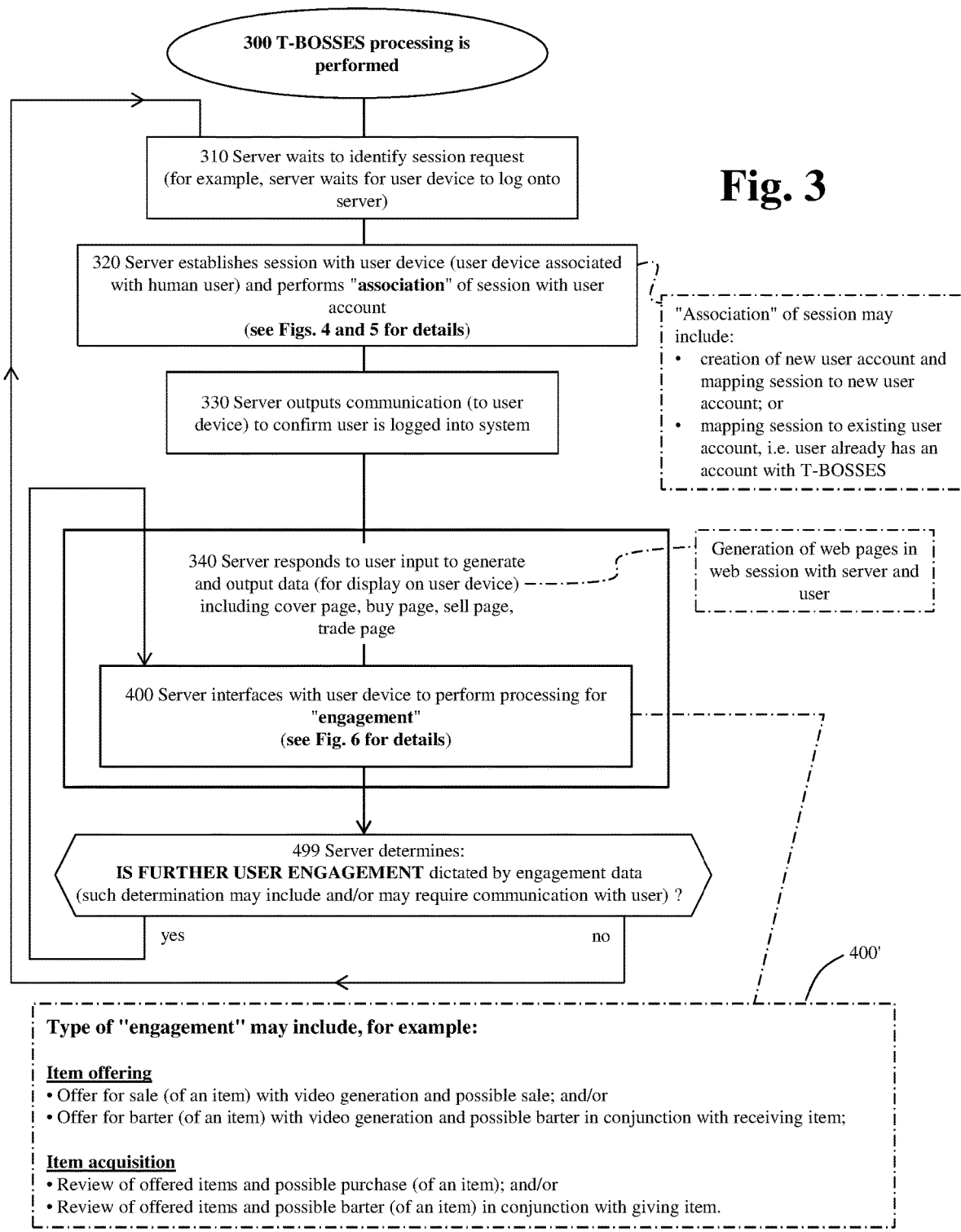
FIG. 3 is a high-level flowchart showing processing performed by the T-BOSSES platform in accordance with one embodiment of the invention.

FIG. 3 is a high-level flowchart showing processing performed by the T-BOSSES platform in accordance with one embodiment of the invention. As shown, the processing of FIG. 3 starts in step 300 and passes to step 310. As reflected in step 310, the server waits to identify a session request from a user. For example, such processing might be in the form of the server waiting for a user device to log on to the server. After step 310, the processing passes to step 320. Step 320 reflects the situation in which a server has indeed established a session with a user device. In accordance with embodiments of the invention, the user device will of course typically be associated with a human user—although the invention is not limited to such implementation. In a suitable manner, the server performs an "association" of the session with a user account. For example, such association might be in the form of the particular user entering a username and password—and the server mapping that username and password to a particular user account. However, it should of course be appreciated that a variety of credentials might be utilized to associate a particular session with a user (such as a web session) vis-à-vis the particular account of that user. Indeed, such association might be performed by the server identifying attributes of the particular user device (being used by the human user) and mapping those attributes to a particular user account.

Figure 4:
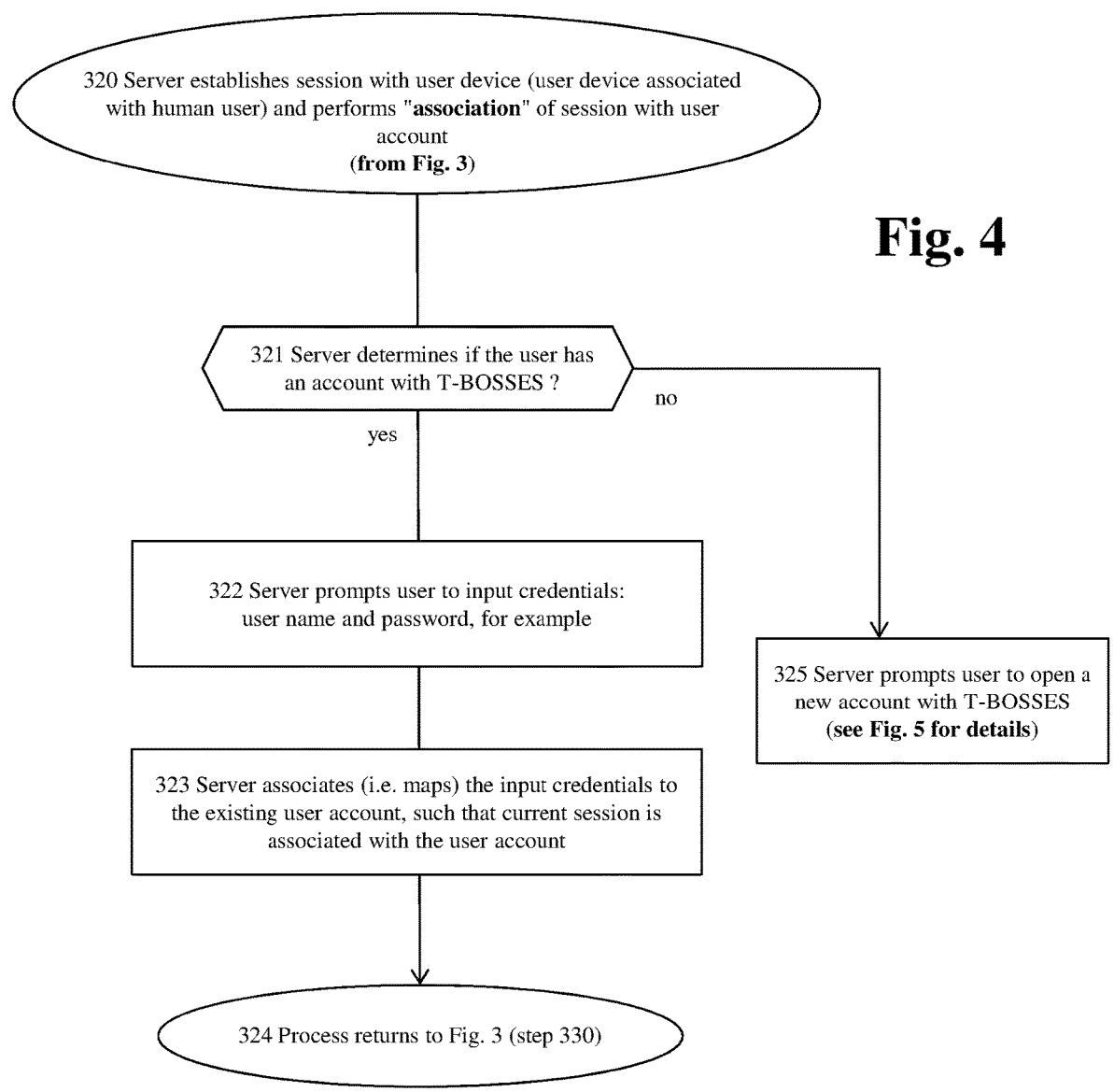
FIG. 4 is a flowchart showing in further detail the "server establishes a session with a user device and performs "association" of the session with a user account" step 320 of FIG. 3, in accordance with one embodiment of the invention.
Figure 5:
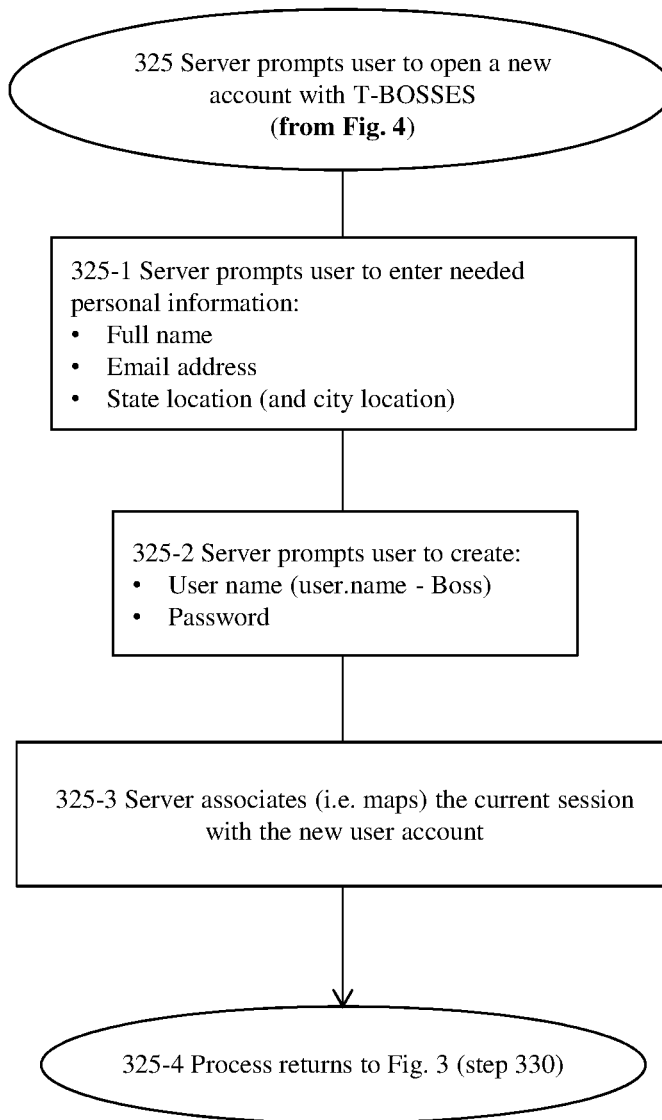
FIG. 5 is a flowchart showing in further detail the "server prompts the user to open a new account" step 325 of FIG. 4, in accordance with one embodiment of the invention.

As reflected in FIG. 3, FIGS. 4 and 5 show further details of the processing of step 320.

As reflected in FIG. 3, an association of a session to a user account may include the creation of a new user account and mapping the session to that new user account, i.e. in the situation where the particular user had not previously had a user account on the T-BOSSES platform. Alternatively, the association of the session with the user, as noted above, may include mapping the session to an existing user account. That is, in this situation, the user already had an account with the T-BOSSES platform.

After step 320, the processing passes to step 330. Step through 30 merely reflects that the server may output a communication (to the user device) to confirm that the user is indeed logged onto the system. After step 330 of FIG. 3, the processing passes to step 340.

In step 340, the server responds to user input to generate output data for display on the user device. In particular, such processing may include the generation of webpages (by the server) in a web session between the server and the user. In particular, as described above, the webpages might include a cover page, a buy page, a sell page, and a trade page, as well as a wide variety of other pages. Inclusive in the processing of step 340 FIG. 3, is step 400. In step 400, the server interfaces with a user device to perform processing for what is herein characterized as an "engagement". Such engagement may include a user making a video or interfacing with the T-BOSSES platform in conjunction with purchase of an item. Further details of the processing of step 400 are described below with reference to FIG. 6.

Once a particular engagement is completed, the process then passes to step 499. In step 499, the server determines whether there is further user engagement dictated by the engagement data observed by the server. For example, this processing might simply involve a user "signing off" from a session, i.e. in the situation where the user does not wish further engagement. If further engagement is indeed dictated by the engagement data, the processing then passes back to step 400. The processing then continues as described above.

On the other hand, it may be the situation that further user engagement is indeed not dictated by the engagement data observed by the server. As a result, the processing passes from step 499 back to step 310. As described above, in step 310, the server waits to identify a further session request from a user.

As noted above, in the processing depicted by step 400, the server interfaces with the user device to perform processing for an "engagement". As shown in FIG. 3 (box 400'), the type of engagement may be in various forms. For example, the engagement might be an "item offering." An item offering may include an offer for sale (of an item) with video generation depicting the particular item for sale, as well as sale of the item. In addition, an item offering may include an offer for barter (of an item) with video generation and possible barter in conjunction with receiving an item in return.

The type of engagement might also be an "item acquisition". The item acquisition may include a review of offered items (by a user) and possible purchase of an item. On the other hand, an item acquisition may include a review of an offered item and barter (of the item).

FIG. 4 is a flowchart showing in further detail the "server establishes a session with a user device and performs "association" of the session with a user account" step 320 of FIG. 3, in accordance with one embodiment of the invention. As shown, the processing starts in step 320 passes to step 321. In step 321, the server determines if the particular user (in which the server has an open session) has an account with the T-BOSSES system. If "no", i.e. the user does not yet have an account, then the processing passes to step 325. In step 325, the server prompts the user to open a new account with the T-BOSSES system. Further details of such processing are described below with reference to FIG. 5.

Alternatively, the server may determine that the user does indeed have an account with the T-BOSSES system. In this situation, the processing passes from step 321 to step 322 (of FIG. 4). In step 322, the server prompts the user to input credentials. For example, the credentials might include a username and password. However, as noted above, the credentials may vary as desired. Then, the processing passes to step 323. In step 323, the server associates (i.e. maps) the credentials input by the user to an existing user account. Accordingly, the current session with the particular user is associated with the account of the particular user. Thereafter, the processing passes to step 324. In step 324, the process returns to FIG. 3, and specifically step 330 of FIG. 3.

FIG. 5 is a flowchart showing in further detail the "server prompts the user to open a new account" step 325 of FIG. 4, in accordance with one embodiment of the invention. That is, FIG. 5 illustrates processing that is performed when a user does not possess an account. After such processing starts in step 325, the processing passes to step 325-1. In step 325-1, the server prompts the user to enter needed personal information. Illustratively, the information might include the user's full name, email address, and state location. However, it is appreciated that additional information may be input as desired. Then, the process passes to step 325-2. In step 325-2, the server prompts the user to create both the username and a password. Then in step 325-3, the server associates the current session with the new user account. In other words, the server maps the current session (being conducted with the user) with the newly created account.

After step 325-3, the processing passes to step 325-4. In step 325-4, the process returns to FIG. 3—and specifically the processing passes to step 330 of FIG. 3.

Figure 6:
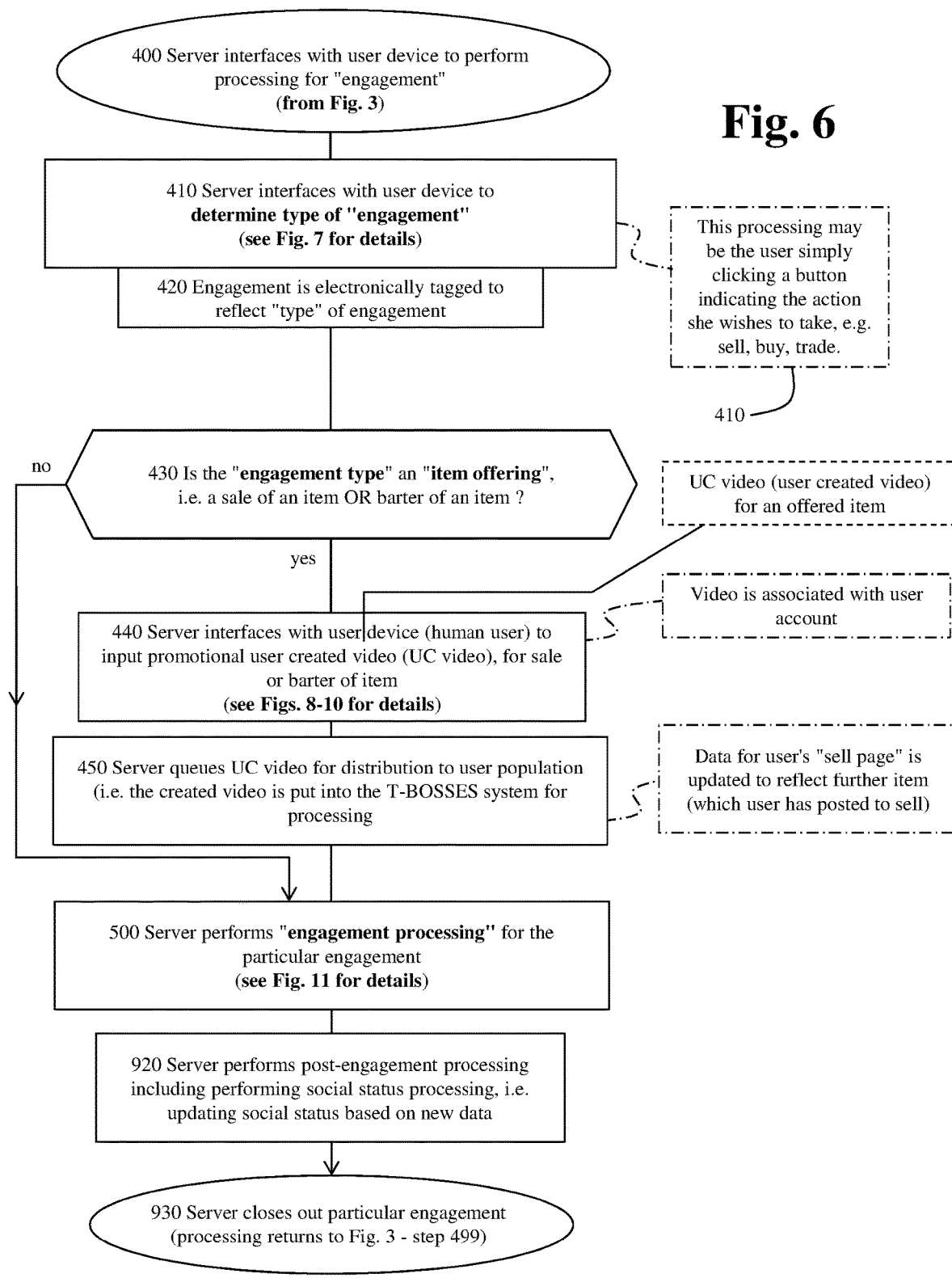
FIG. 6 is a flowchart showing in further detail the "server interfaces with user device to perform processing for engagement" step 400 of FIG. 3, in accordance with one embodiment of the invention.

FIG. 6 is a flowchart showing in further detail the "server interfaces with user device to perform processing for engagement" step 400 of FIG. 3, in accordance with one embodiment of the invention. As shown, the processing starts in step 400 and passes to step 410. In step 410, the server interfaces with the user device (of the human user) to determine the particular type of "engagement" being requested by the user, i.e., based on interaction of the user with the server. Further details of the processing of step 410 are described below with reference to FIG. 7. As reflected in box 410' of FIG. 6, the processing (to determine the type of engagement) may be simply constituted by the user simply clicking a button indicating the action she wishes to take, e.g., sell, buy, trade. The processing of step 420 (FIG. 6) reflects that once the server determines the particular type of engagement being requested, the engagement is electronically tagged to reflect the particular "type" of engagement. In other words, the "tagging" of step 420 might be constituted by the server retrieving select data (for processing of the particular type of engagement) and associating that data with particular indicia. As described below, the particular indicia will be observed by the server to dictate the particular type of engagement performed (by the server). In accordance with one embodiment, such characterized "tagging" might be constituted by the server outputting select data to a particular subroutine (of the program). After step 420 of FIG. 6, the processing passes to step 430.

In step 430 of FIG. 6, the server determines whether or not the "engagement type" is an "item offering". Such an offering might be constituted by a sale of an item or a barter of an item. If "yes" in step 430, then the processing passes to step 440. Further details of such processing are described below with reference to FIG. 8—FIG. 10. In conjunction with the processing of step 440, a further video (i.e. a "user created video or "UC video") will be generated and associated with the user account. In other words, this simply means that if the server determines the user wishes to "sell" an item, for example—then the server will interface with the user accordingly. Illustratively, the processing of step 440 may result in a data record being created for the sale of the particular item (of the user) and reflective data being displayed on the user's "sell" page.

After step 440 of FIG. 6 (in which a UC video is created) the processing passes to step 450. In step 450, the server queues up the UC video for distribution to the user population. In other words, this simply means that the UC video is put into queue for distribution to other users. It is appreciated that such "distribution" may be in various forms. Such distribution might be constituted by the fact that the particular video will be viewable by other users when such other users look at the sellers "sell page".

Accordingly, the processing of step 440 and step 450, is dedicated to the situation in which the "engagement type" is an item offering that is inherently associated with the creation of a video. After the processing of step 450, the process passes to step 500.

With further reference to step 430 of FIG. 6, it may well be determined that the "engagement type" is not an item offering. As a result, the process passes from step 430 directly to step 500.

In step 500, the server performs "engagement processing" for the particular type of engagement. Further details of such engagement processing are described below with reference to FIG. 11. In other words, the server determines the particular type of processing being requested by the user and (as reflected by the steps of FIG. 11)—and proceeds to perform such processing request.

With further reference to FIG. 6, after step 500, processing passes to step 920. In step 920, the server performs what is characterized as "post-engagement" processing. In other words, once the server has interacted with the user to either queue up sale of an item (including the generation of a video) or interacted with the user to perform item acquisition processing—the server will then process what has happened (as reflected in various collected data) and update the item offering user's status accordingly. Accordingly, step 920 of FIG. 6 might be characterized as processing to look back on activity of the user and update the user's status based on such activity.

After step 920 FIG. 6, the process passes to step 930. In step 930, the server closes out the particular engagement and processing returns to FIG. 3, and specifically passes to step 499 of FIG. 3. In other words, step 930 of FIG. 6 basically represents that the server has completed the current task at hand (through interface with the user) and then returns to await a request for further processing, i.e., a request for a further engagement.

As described above, FIG. 7 is a flowchart showing in further detail the "server interfaces with the user device to determine the type of engagement" step 410 of FIG. 6, in accordance with one embodiment of the invention. In other words, FIG. 7 reflects the processing in which the server interacts with the user to determine what the user wants to do (i.e. what type of engagement the user wants to do)—and then initiates processing to proceed with such desired action. Accordingly, step 410' of FIG. 7 reflects that the server interfaces with the user to determine the particular type of engagement user wishes to initiate.

Figure 7:
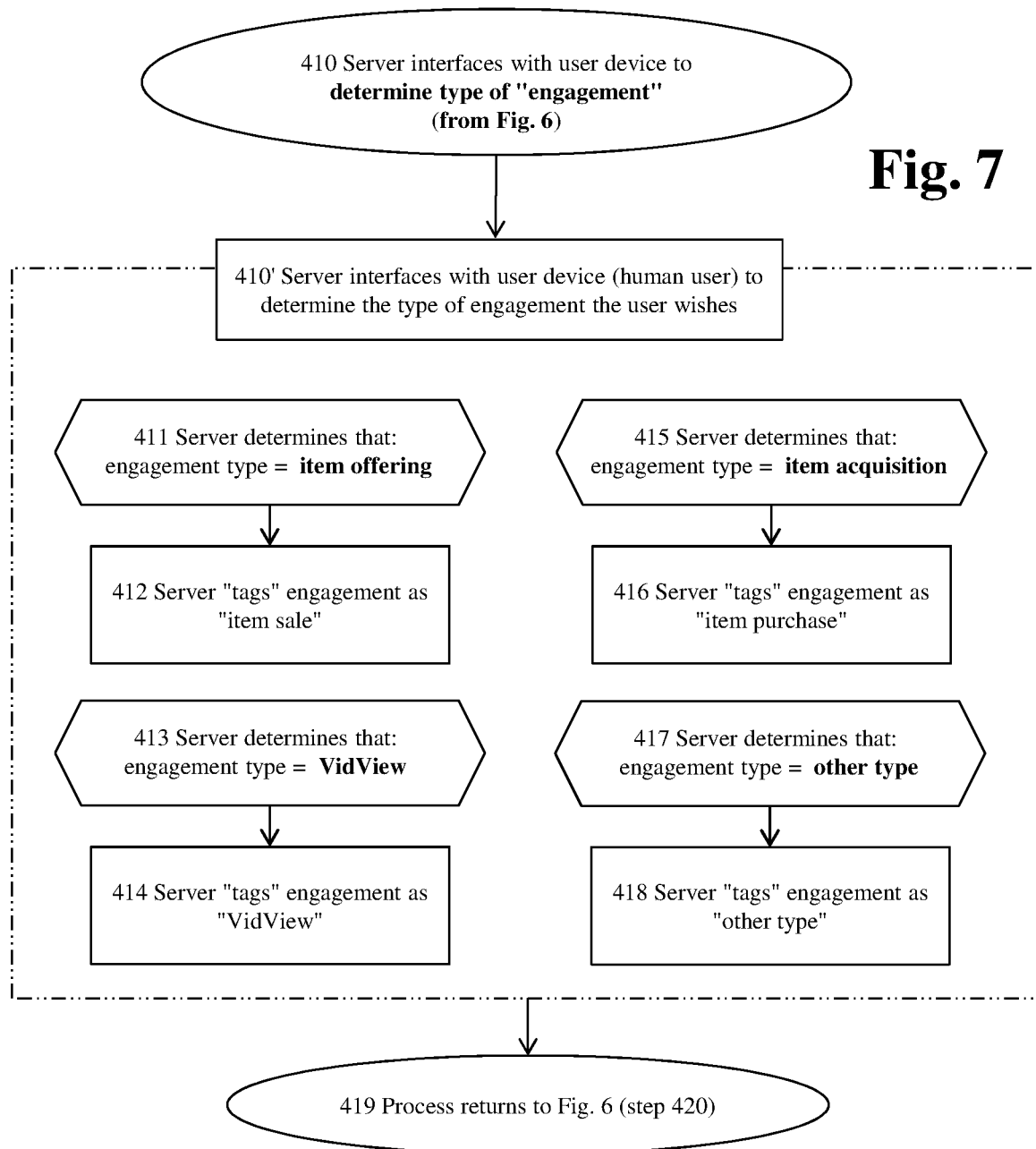
FIG. 7 is a flowchart showing in further detail the "server interfaces with the user device to determine the type of engagement" step 410 of FIG. 6, in accordance with one embodiment of the invention.

Accordingly, step 411 of FIG. 7 shows the situation in which the server determines that the engagement type is an item offering. As a result, the server tags the engagement is an item sale in step 412.

Step 415 of FIG. 7 shows a situation in which the server determines that the engagement type is an item acquisition. As a result, the server tags engagement as an item purchase in step 416.

Step 413 of FIG. 7 shows a situation in which the server determines the engagement type is a "VidView", i.e. a user wishes to create a video commenting on an item that user has recently purchased from another user. As a result, the server tags that engagement as "VidView".

As further illustrated in FIG. 7, in step 417, the server determines that the engagement type is what is characterized as "other type". As a result, the server tags the particular engagement accordingly as "other type". Steps 417 and 418 of FIG. 7 represent that there may be a variety of other types of engagement, in addition to those particular types of engagement reflected in FIG. 7.

After the processing has tagged the current engagement, the processing passes to step 419. In step 419, the process returns to FIG. 6, and specifically passes to step 420 of FIG. 6.

Figure 8:
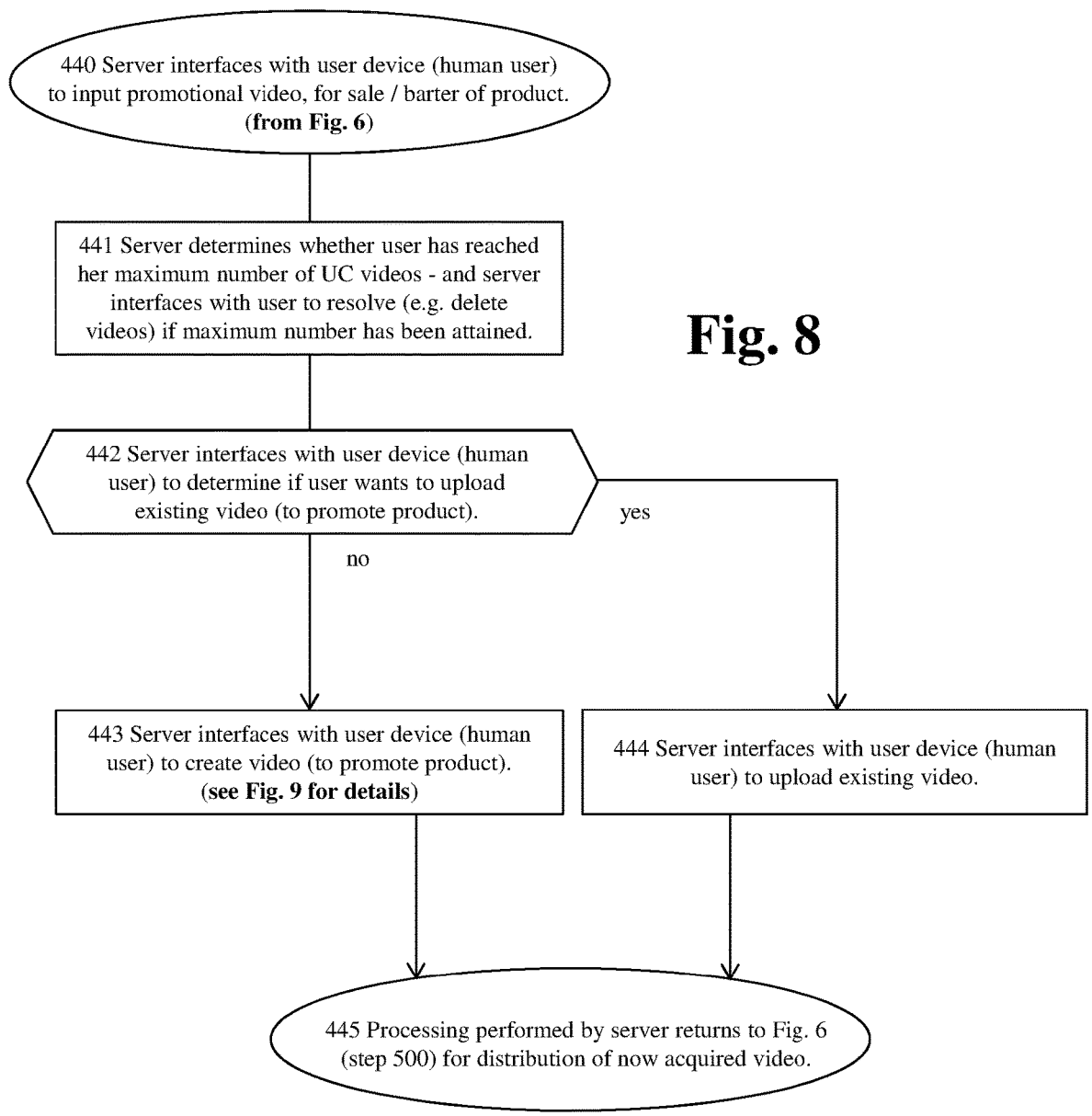
FIG. 8 is a flowchart showing in further detail the "server interfaces with user device to input promotional video for sale or trade of a product" step 440 of FIG. 6, in accordance with one embodiment of the invention.

FIG. 8 is a flowchart showing in further detail the "server interfaces with user device to input promotional video for sale or barter of a product" step 440 of FIG. 6, in accordance with one embodiment of the invention. As shown, the process starts in step 440 and passes to step 441. In step 441, the server determines whether that particular user has reached maximum number of videos. That is, as described above, a constraint may be placed on a user regarding a maximum number of videos the user may post at any given point in time. If the server determines that the user has indeed reached her maximum number of videos, the server interfaces with the user to resolve. For example, the server might advise the user of the maximum status—and prompt the user to delete unneeded videos. In summary, step 441 determines whether there is indeed room for the user to post another video, i.e. given the rule that a user can only have 5 videos.

After step 441, the process passes to step 442. In step 442, the server interfaces with the user to determine if the user wishes to upload an existing video to promote the item she wishes to sell on the T-BOSSES platform. In general, it may be preferable for the user to interface with the platform to generate a video. However, it is envisioned that the user may have previously created a video (to promote her product) using some other device and/or platform. Accordingly, the processing may provide for such possibility.

If "yes" in step 442, i.e. the user does wish to upload an existing video, then the processing passes to step 444. In step 444, the server interfaces with the user to upload the existing video. Thereafter, the process passes to step 445. On the other hand, it may well be the situation, in step 442, that the user has not previously created a video to promote her product. In such situation, i.e. no in step 442, the processing passes to step 443. In step 443, the server interfaces with the user to create a video to promote the product. Further details of this processing are described below with reference to FIG. 9. After step 443, the processing pass to step 445.

Accordingly, upon step 445 being reached in the process of FIG. 8, the video is in place either via (1) upload or (2) generation by the user interfacing with the T-BOSSES platform. In step 445, the processing returns to FIG. 6 (step 500) for distribution of the now acquired video.

Figure 9:
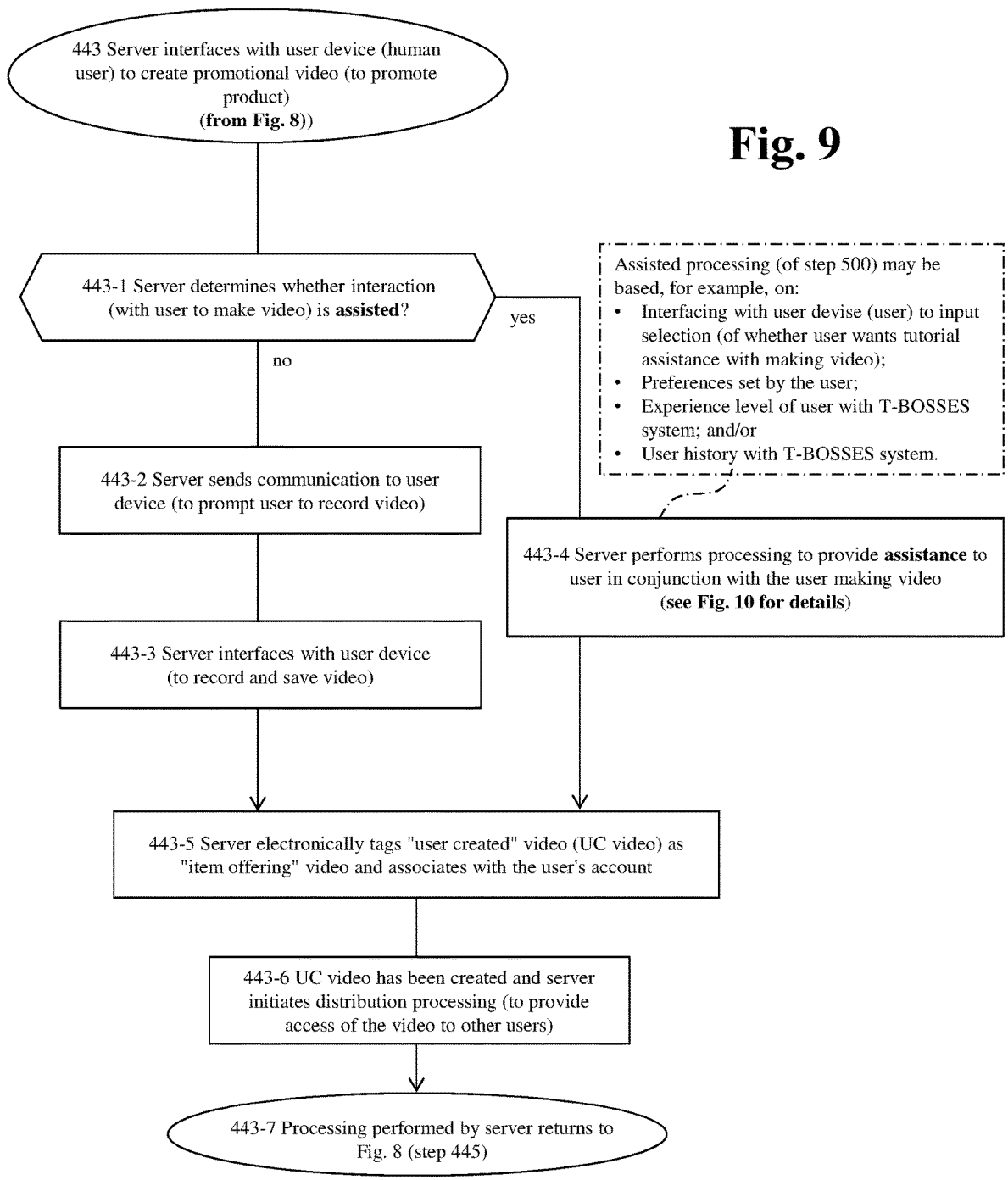
FIG. 9 is a flowchart showing in further detail the "server interfaces with the user to create a promotional video to promote her product" step 443 of FIG. 8, in accordance with one embodiment of the invention.

FIG. 9 is a flowchart showing in further detail the "server interfaces with the user to create a promotional video to promote her product" step 443 of FIG. 8, in accordance with one embodiment of the invention. After the process is initiated in step 443, the processing passes to step 443-1. In step 443-1, the server determines whether interaction (with the user) to make the user is "assisted". To explain, such "assisted" processing may relate to both (1) "tutorial" type assistance in which the user may not be familiar with the T-BOSSES system and may need information on how to use the T-BOSSES system, and (2) "process" assistance in which the user is well familiar with how to use the platform and the system interfaces with the user to make the video in some stepped manner. In other words, with "process" assistance, the system interfaces with the user to create the video (with the user) through a series of steps, regardless of the user's experience with the T-BOSSES system.

If interaction with the user to make the video is assisted, i.e. yes in step 443-1, then the processing passes to step 443-4. In step 443-4, the server performs processing to provide assistance to the user in conjunction with the user making her video. Further details of such processing are described below with reference to FIG. 10. As reflected in FIG. 9, assisted processing (being either "tutorial" assistance or "process" assistance) may be based, for example, on interfacing with the user to input selection of whether the user wishes to have assistance in making her video; preferences set by the user; experience level of the user; and user history.

After step 443-4 of FIG. 9, processing passes to step 443-5.

On the other hand, the system may determine in step 443-1 that interaction with the user to make her video is not assisted. Accordingly, the process passes to step 443-2. In step 443-2, the server sends a communication to the user device to prompt the user to record his or her video. Then, in step 443-3, the server interfaces with the user device to record and save the video to promote the product she wishes to sell. After step 443-3, the process passes to step 443-5.

Accordingly, coming into step 443-5, a video has been created. In step 443-5, the server electronically tags the video as an "item offering" video and associates that video with the user's account. Then, in step 443-6, the server initiates distribution processing to provide access of the video to other users. Note this access may or may not involve pushing the video out to other users. Such access may be constituted by merely placing the video on the seller's "sell page" and allowing access to view the video so disposed on the seller's sell page.

Then, in step 443-7, the processing performed by the server returns to FIG. 8 and specifically step 445.

Figure 10:
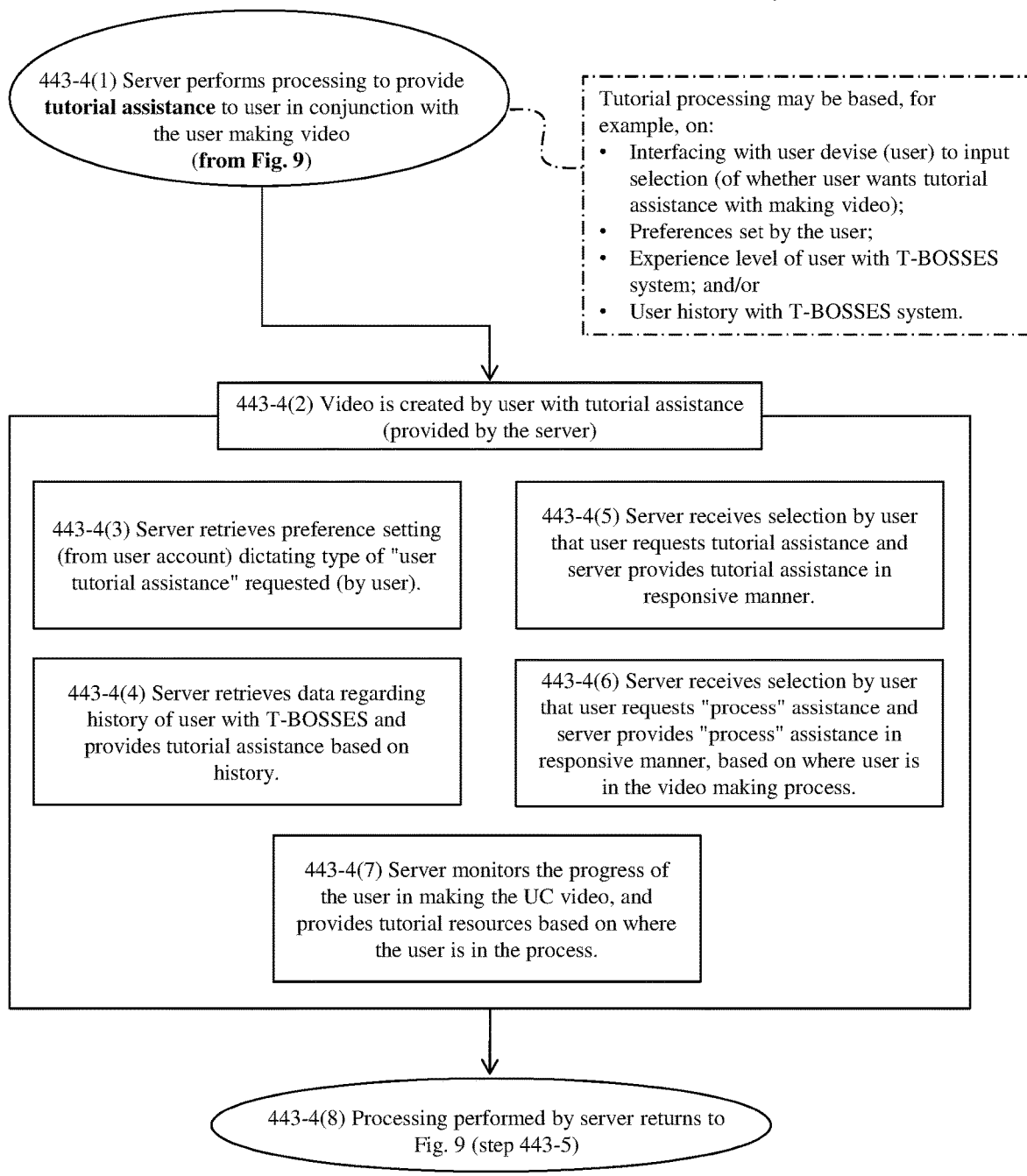
FIG. 10 is a flowchart showing in further detail the processing of "provide assistance to the user in conjunction with the user making the video" step 443-4 of FIG. 9, in accordance with one embodiment of the invention.

FIG. 10 is a flowchart showing in further detail the processing of "provide tutorial assistance to the user in conjunction with the user making the video" step 443-4 of FIG. 9, in accordance with one embodiment of the invention. As shown, the processing starts in step 443-4(1) and passes to step 443-4(2) in which the video was created by the user with tutorial assistance provided by the server. More specifically, step 443-4(2) provides a variety of processing related to different types of tutorial assistance. Illustratively, as reflected in step 443-4(3), the server retrieves preference settings (from the user account) dictating the particular type of user tutorial assistance requested by the user. For example, this reflects a situation in which the user may tap a button (or otherwise indicate to the system) that they do or do not want tutorial assistance. Indeed, some users may wish to have tutorial assistance even though they have used the system over a number of days. On the other hand, some users might use the system one time—and not want any further tutorial assistance, i.e. he or she "knows what they're doing." Relatedly, step 443-4(4) reflects the situation in which the server retrieves data regarding the history of the user and provides tutorial assistance based on history. For example, if the user has never created a video through the platform, this situation may be reflected in the user's history—and tutorial assistance provided based on such information.

Step 443-4(5) of FIG. 10 merely reflects the situation in which the server receives input (by the user) indicating the user requests tutorial assistance—and the server provides such tutorial assistance in a responsive manner. For example, this scenario might occur when a user opted out of tutorial assistance to early, and wishes to opt back in to tutorial assistance to more effectively learn and use the platform.

Step 443-4(6), as shown in FIG. 10, reflects the situation in which the server receives a selection by the user that the user requests "process" assistance. In this scenario, the platform interfaces with the user to, for example, take the user through the video making process in some stepped manner. Illustratively, this might include the platform interfacing with the user to first record footage showing the user promoting a product, and secondly interfacing with the user to set up what text will be overlaid over the recorded footage. In this situation, the user knows well how to use the system. However, processing is performed to take the user through different phases of the video making process. Further, the different phases of the video making process might include the platform assisting the user in making different segments of a video at different points in time and/or in different environments; joining those video segments together; and assisting the user in generating text overlays for each of the segments. For example, such processing might be beneficial in the situation where a product that the user is trying to sell has both an indoor application as well as an outdoor application. Accordingly, the user might want to record respective video segments both indoors and outdoors. This is merely one example of the manner in which the platform might utilize "process" assistance.

Lastly, step 443-4(7) of FIG. 10 reflects a situation with the server monitors the progress of the user and making the video and provides tutorial assistance based on where the user is in the process. For example, this processing might reflect the situation where the system identifies the user as having problems making the video. The system might identify the user is having problems based on the selections of the user (in interfacing with the platform) and/or based upon the pace of the user's interface with the system.

It is appreciated that the various processing of FIG. 10 need not be exclusive to one another. Rather, aspects of one type of processing as shown in step 443-4(2) may well be combined with aspects of other types of processing shown in FIG. 2.

After step 443-4(2), processing passes to step 8. In step 8, the processing returns to FIG. 9 and specifically to step 443-5 of FIG. 9.

Figure 11:
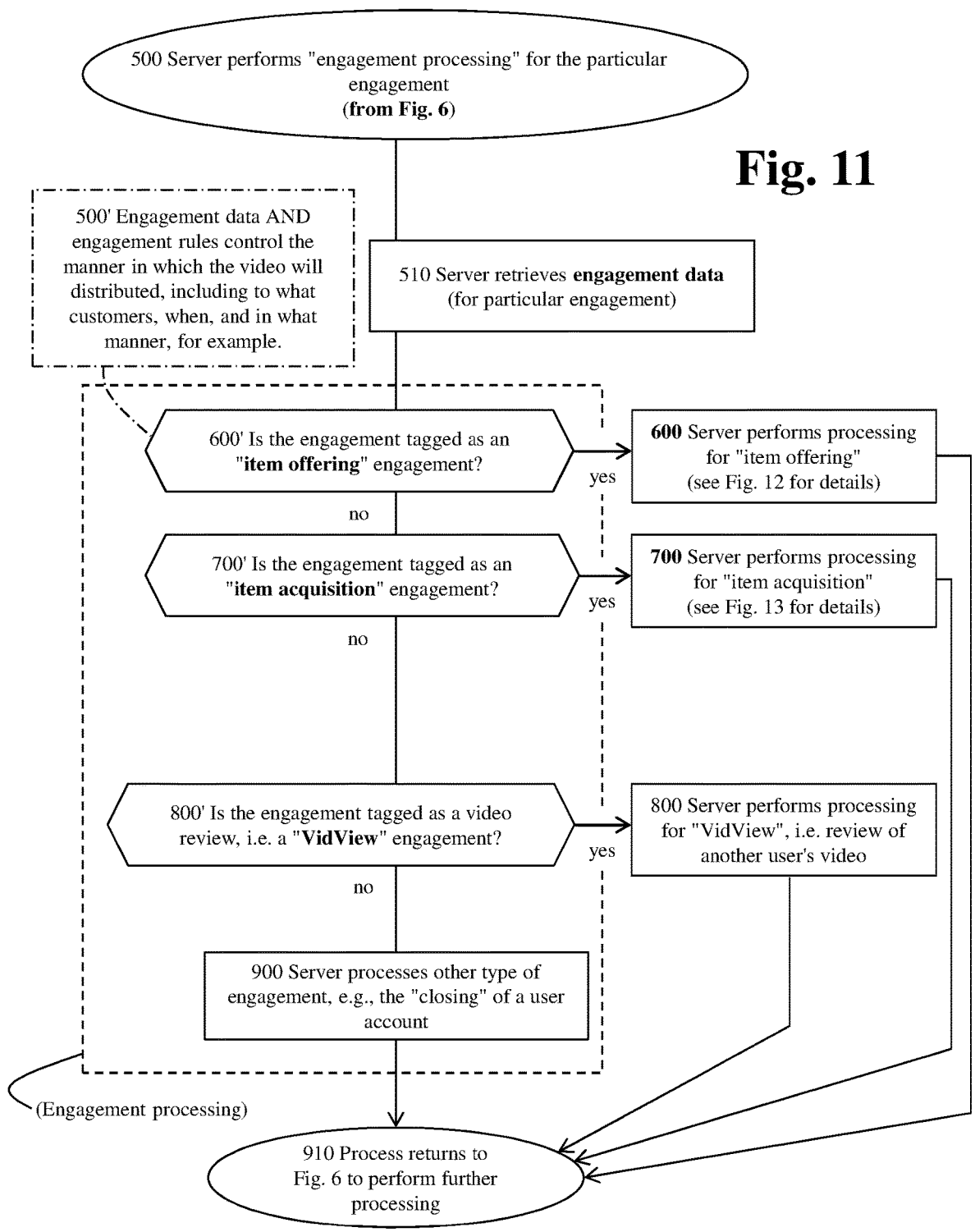
FIG. 11 is a flowchart showing in further detail the "server performs engagement processing for a particular engagement" step 500 of FIG. 6, in accordance with one embodiment of the invention.

FIG. 11 is a flowchart showing in further detail the "server performs engagement processing for a particular engagement" step 500 of FIG. 6, in accordance with one embodiment of the invention. As shown, the process starts in step 500 and passes to step 510. In step 510, the server retrieves engagement data for the particular engagement. After step 510, the process passes to step 600'. In step 600' the processing determines whether the engagement is tagged as an item offering engagement. If yes, then the process passes to step 600. In step 600, the server performs processing for the item offering. Illustratively, the item offering might be sale of an item or barter of an item. Further details are described with reference to FIG. 12 below. After the processing of step 600 of FIG. 11, the process passes to step 910.

With further reference to step 600'(FIG. 11) it may be the case that the engagement is not tagged as an item offering. Accordingly, the process passes to step 700'. In step 700', the processing determines whether the engagement is tagged as an item acquisition engagement. If yes, then the processing passes to step 700. In step 700, the server performs processing for the item acquisition, such as a purchase of an item. Further details are described below with reference to FIG. 13. After step 700, the processing passes to step 910 of FIG. 11.

On the other hand, if no in step 700' (indicating that the engagement is not tagged as either an item offering or a item acquisition), the processing and passes from step 700' to step 800'. In step 800' the system determines whether the engagement is tagged as a video review. If yes, then the process passes to step 800. In step 800, the server performs processing for the "VidView"—i.e. generation of a review of another user's video. After step 800, the process passes to step 910.

As shown in FIG. 11, if no in step 800', then the process passes to step 900. Step 900 reflects that the engagement type is yet some other type of engagement. Illustratively, the engagement type might be the closing of an account or the updating of the user's profile, for example. After step 900, the process passes to step 910. In step 910, the process returns to FIG. 6, as described above, for further processing.

Figure 12:
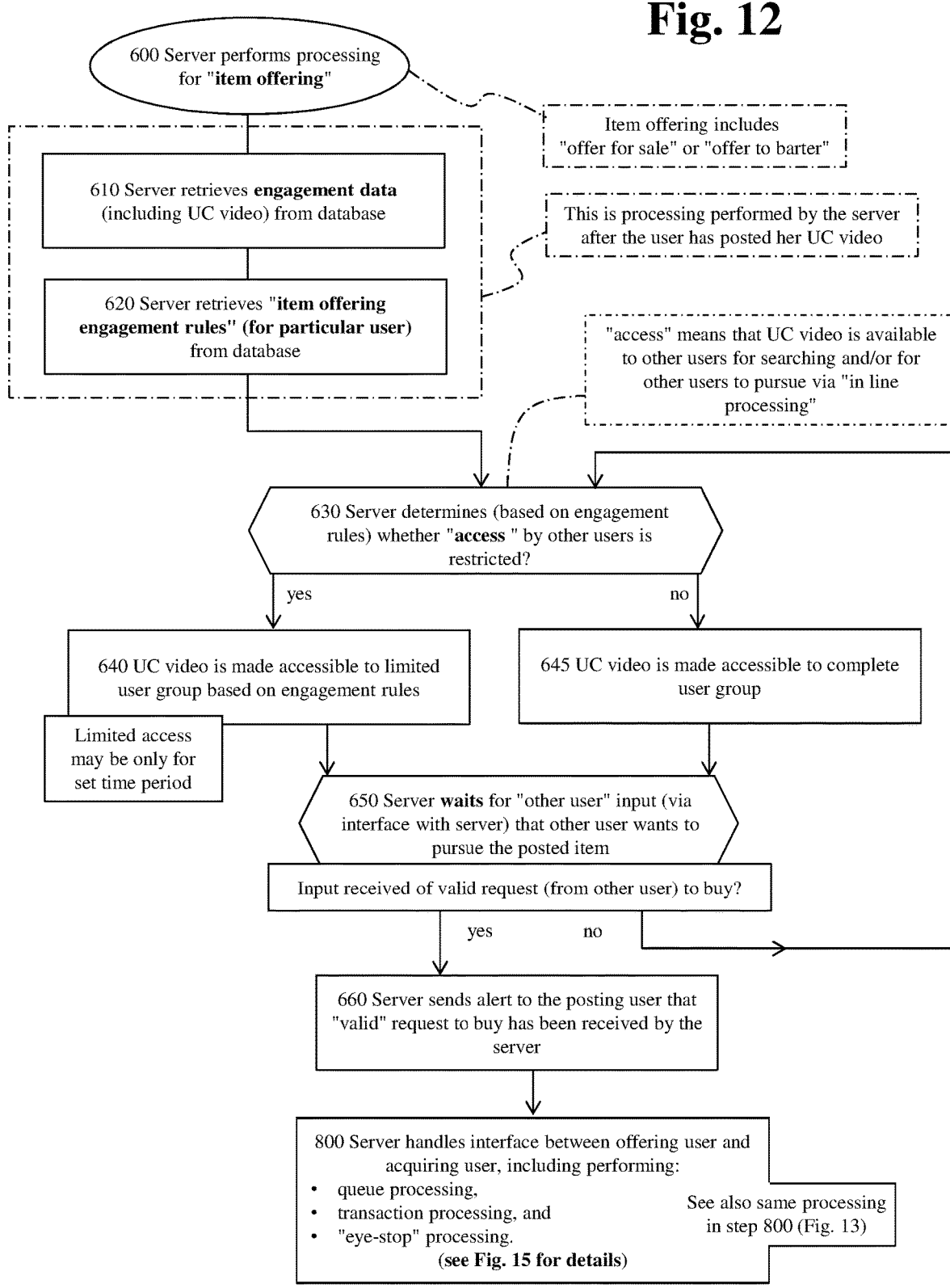
FIG. 12 is a flowchart showing in further detail the "server performs processing for item offering" step 600 of FIG. 12, in accordance with one embodiment of the invention.

FIG. 12 is a flowchart showing in further detail the "server performs processing for an item offering" step 600 of FIG. 12, in accordance with one embodiment of the invention. The item offering may include an offer for sale or an offer to barter. After the process starts in step 600, the process passes to step 610. In step 610, the server retrieves engagement data, including the user video, from the database. Then, in step 620, the server retrieves the item offering engagement rules, for the particular user, from the database. Then, the process passes to step 630.

In step 630, the server determines (based on the relevant engagement rules) whether access by other users is restricted. More specifically, this relates to the situation in which some users may have access to a newly posted video whereas other users may not have access to a newly posted video. If access is not restricted in any manner, then the process passes from step 632 step 645. In step 645, the video is made accessible to the complete user group.

On the other hand, it may be determined in step 630 that access is restricted. Accordingly, the process passes to step 640. As shown in step 640, the video is made accessible to a limited user group based on the engagement rules. As noted in FIG. 12, it may well be that the limited access is only for a set period of time.

After either of step 644 or step 645, the processing passes to step 650. In step 650, the server waits for other user input to indicate that some other user wants to pursue the posted item. That is, the system waits for input of a valid request from another user to buy the item associated with the posted video. If no input is received regarding a request to buy the item, the process loops back (on an ongoing basis) to step 630 in which the server again determines the degree to which access to the video is restricted. That is, it may well be that a time period has passed such that a previously restricted video is no longer restricted.

At a point in time, the server will receive input of a request to buy the item. At that point, the processing passes from step 652 to step 660. In step 668, the server sends an alert to the posting user (i.e. the user wishes to sell the item) that a request to buy her product has been received by the server. This alert may take on a variety of forms through a variety of communication channels. For example, the alert my simply be a pop-up pushed to the user's computer and/or cell phone. On the other hand, the alert might be in the form of an email or text sent to the user's user device. After step 660, the process passes to step 800. In step 800, server (i.e. T-BOSSES platform) handles interface between the offering user and the acquiring user, i.e., the user wanting to sell the item and the user wishing to buy the item.

The interface of step 800 may include the "queue" processing described above and specifically "in-line" processing in which up to 5 potential buyers may be in line to buy an item. Additionally, the processing of step 800 of FIG. 12 may include transaction processing in which the server handles the exchange of funds between the seller and the buyer, as well as "eye-stop" processing as described above. Further details of step 800 are described below with reference to FIG. 15.

Figure 13:
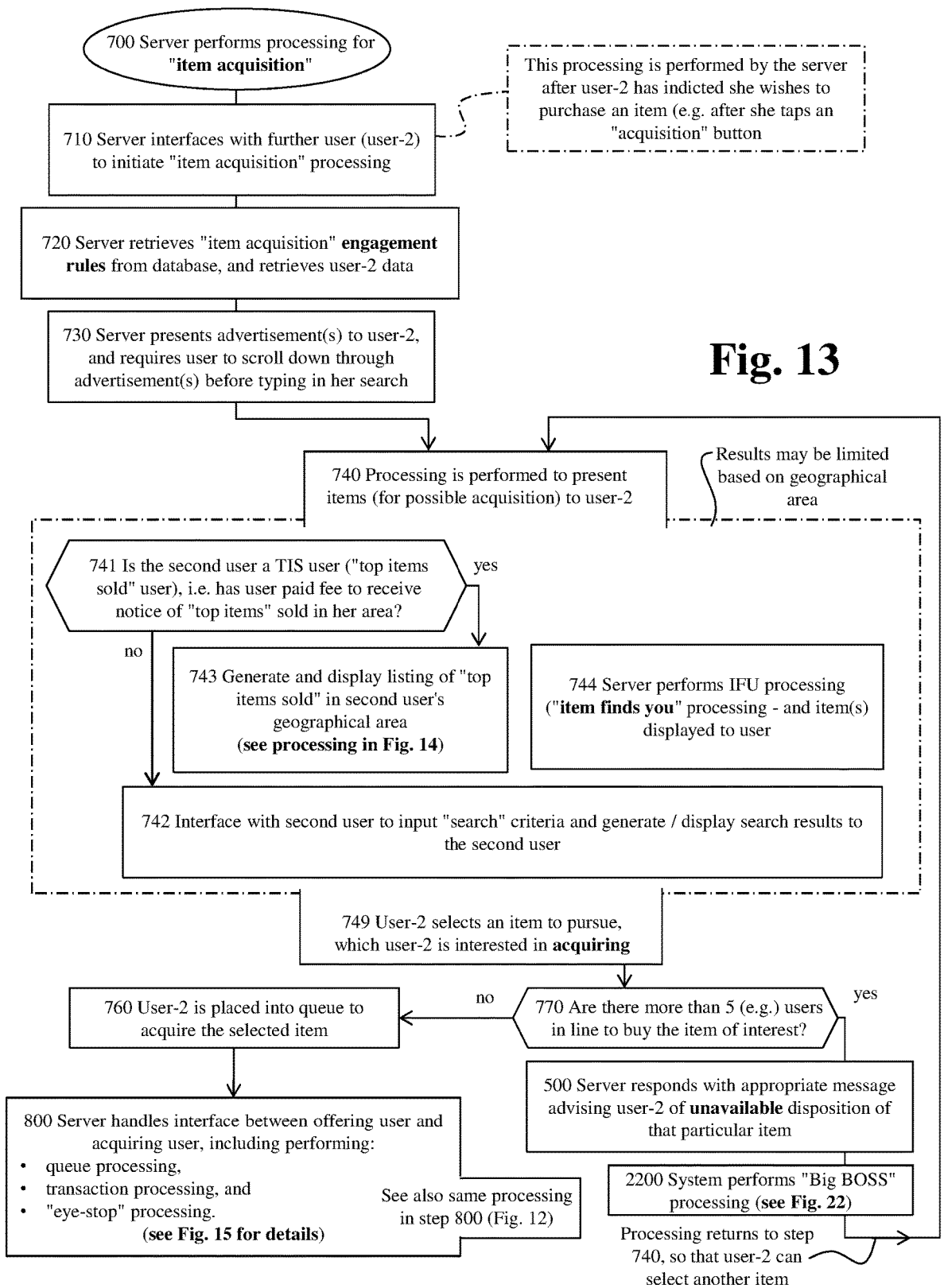
FIG. 13 is a flowchart showing in further detail the "server performs processing for item acquisition" step 700 of FIG. 11, in accordance with one embodiment of the invention.

FIG. 13 is a flowchart showing in further detail the "server performs processing for item acquisition" step 700 of FIG. 11, in accordance with one embodiment of the invention. The process starts in step 700 and passes to step 710. In step 710, the server interfaces with a further user, i.e. a second user to initiate what might be characterized as "item acquisition" processing. Then, in step 720, the server retrieves "item acquisition" engagement rules and also retrieves the data relating to the second user. After step 720, the process passes to step 730.

In step 730, the server presents advertisements to the second user, and requires a second user to scroll down through the advertisements before typing in her search, in accordance with one embodiment of the invention. Then, the process passes from step 732 step 740. In step 740, the server performs processing to present items of interest (to the second user) based on the search of the second user. It is appreciated the particular results (of items for sale by a seller or items for barter) might be limited to a specific geographical region as described above. As reflected by step 740 of FIG. 13, various different processing may be performed to present items of interest to the second user for possible purchase. In particular, such presentment of items of interest may utilize the "find you" processing described above—and reflected in step 744 of FIG. 13.

Illustrative step 741 FIG. 13 shows specific processing of the invention in which the second user receives notice of "top items" sold in her area. If the user is a "top items" user, then the process passes from step 741 to step 743. In step 743, the server generates and displays a listing of the top items sold in the second user's geographical area. Such processing is shown in further detail in FIG. 14. On the other hand, it may be a situation that the user is not a "top items" user. In such situation, the process passes from step 741 to step 742. In step 742, the system interfaces with the second user to input search criteria and generate/display search results to the second user.

Accordingly, the processing of step 740 FIG. 13 relates to exposing the second user to items, utilizing various approaches and methodologies, for possible purchase. Accordingly, step 749 FIG. 13 reflects the situation with the second user has selected an item to pursue. In such situation, the process passes to step 770, as shown in FIG. 13.

In step 770, the server (i.e. the T-BOSSES platform) determines whether there are more than 5 users in line to buy the item of interest. If yes, then the situation is that the second user (in the example here) cannot opt "in-line" in that the maximum number of users are already in line. Accordingly, the process passes from step 772 step 500. In step 500, the server responds to the second user with an appropriate message—advising the second user of the unavailable disposition of that particular product. Accordingly, the process returns to step 740, so that the second user can select another item. As shown in FIG. 13, in conjunction with the processing of step 500 (or performed separately) the processing may perform what is herein characterized as "Big BOSS" processing. Various further details are described below with reference to FIG. 22.

On the other hand, it may be the situation in step 770 that the maximum number of users are not yet "in-line" to buy the particular product of interest. Accordingly, the process passes from step 772 to step 760. In step 760, the second user is placed into queue in the hopes of acquiring the selected item. After step 760, the process passes to step 800. The process step 800 of FIG. 13 is one and the same as process step 800 of FIG. 12 (described above).

Figure 14:
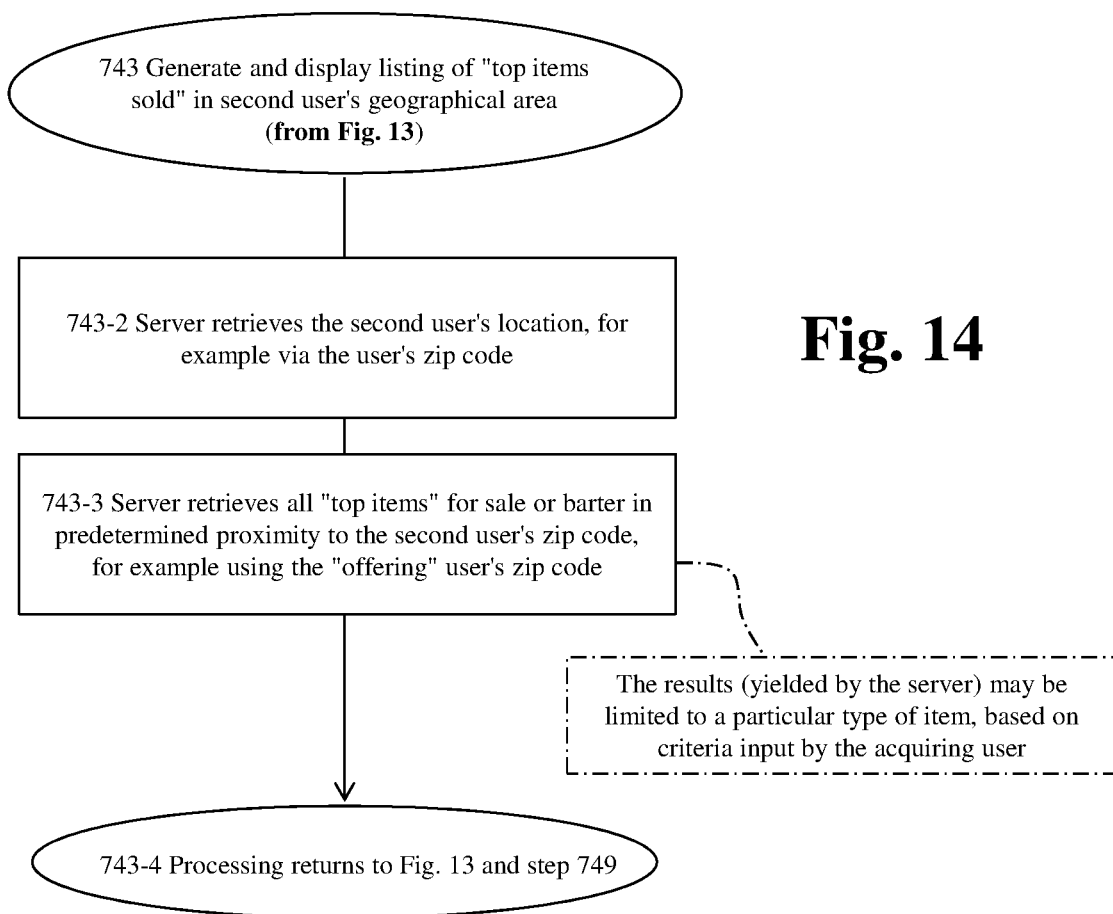
FIG. 14 is a flowchart showing the processing of "generate and display listing of top items sold in the second user's geographical area" step 743 of FIG. 13, in accordance with one embodiment of the invention.

FIG. 14 is a flowchart showing the processing of "generate an display listing of top items sold in the second user's geographical area" step 743 of FIG. 13, in accordance with one embodiment of the invention. As shown, the process starts in step 743 and passes to step 743-2. In step 743-2, the server retrieves the second user's location. For example, this data may be in the form of the second user's ZIP Code. Then, process passes to step 743-3. The server retrieves all the "top items" for sale or barter in a predetermined proximity to the second user's ZIP Code. For example, such processing may utilize the "offering" user's ZIP Code vis-à-vis the second user's ZIP Code. It is appreciated that the degree of proximity may be varied as desired. Further, related to step 743-3, it is appreciated that the results yielded by the T-BOSSES server may be limited to a particular type of item based on criteria input by the acquiring user.

After step 743-3 FIG. 14, the process passes to step 743-4. The process then returns to FIG. 13, and specifically step 749 of FIG. 13.

Figure 15:
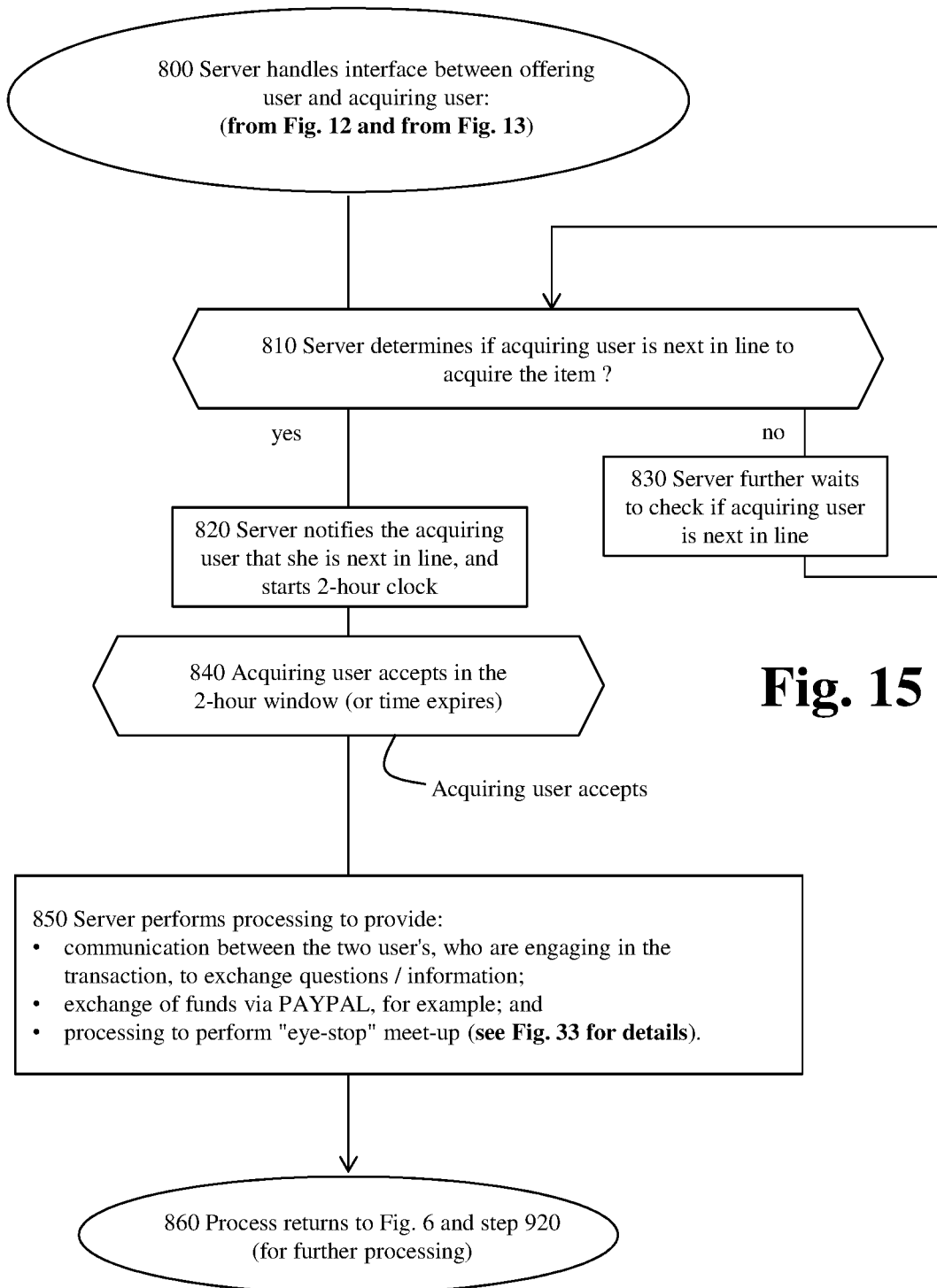
FIG. 15 is a flowchart showing the "server handles interface between offering user and acquiring user" step 800 of both FIG. 12 and FIG. 13, in accordance with one embodiment of the invention.

FIG. 15 is a flowchart showing the "server handles interface between the offering user and the acquiring user" step 800 of both FIGS. 12 and 13, in accordance with one embodiment of the invention. As shown, the process starts in step 800 and passes to step 810. In step 810, the server determines if the acquiring user is next "in line" to acquire the item. If no, then the process passes to step 830. In step 830, the server further waits to check if the acquiring user is next in line.

On the other hand, it may be determined that the acquiring user is indeed next in line to acquire the item, i.e. "yes" in step 810. That is, as described above, there may be up to 5 people in line to buy an item. At a point the second user (in the example above) will end up being the first in line to potentially by the item. Accordingly, the process passes from step 810 to step 820. In step 820, the server notifies the potentially acquiring user that she is next in line and starts a 2 hour clock (for example) running as described above. It should of course be appreciated that the particular time window in which a user is afforded the opportunity to interact with a seller (and buy an item) may be varied as desired.

Accordingly, after the server notifies the second user that she is next in line (in step 820 of FIG. 15) the process passes to step 840. Step 840 reflects a situation in which the second user indeed accepts (in the allotted time) window, i.e., the second user buys the item. It is of course appreciated that it may alternatively be the situation that the time expires prior to the user purchasing the offered item—or the user rejects the item. After the user agrees to buy the item in step 840, the process passes to step 850.

Step 850 provides for a variety of processing related to the purchase of the item from the seller. Specifically, the processing provides for communication between the 2 users who are engaging in the transaction to exchange questions and information; the exchange of electronic funds; and/or the coordination of an "eye-stop" meet-up location.

After step 850 of FIG. 15, the process passes to step 860. In step 860, the process returns to FIG. 6 and step 920 for further processing as describe above.

Figure 16:
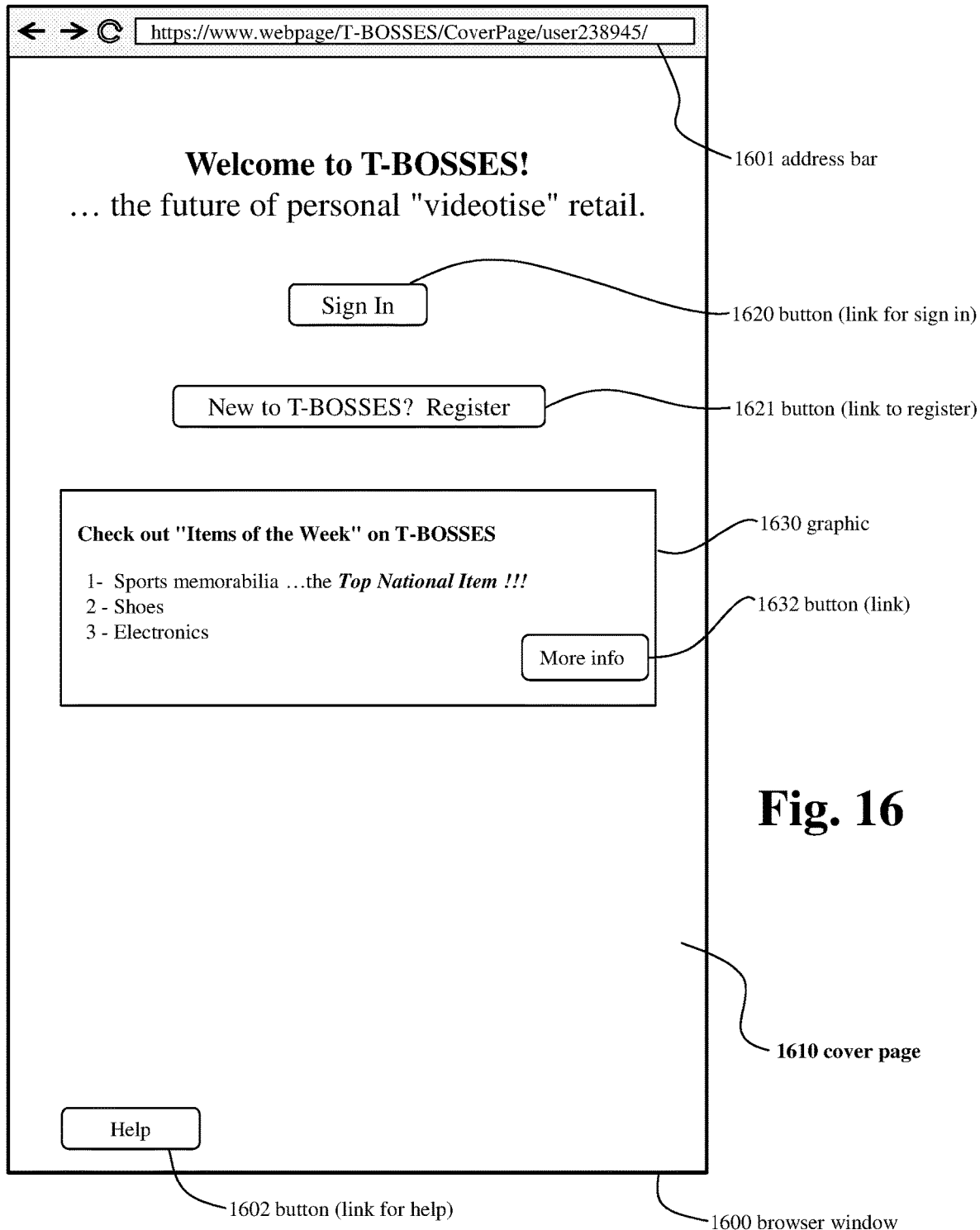
FIG. 16 is a graphical user interface (GUI) showing a "cover page" generated by the T-Bosses platform—and displayed on a user device, in accordance with one embodiment of the invention.

Hereinafter, various aspects of illustrative graphical user interfaces (GUIs) of the invention will be described. FIG. 16 is a graphical user interface (GUI) showing a "cover page" or "landing page" 1610 generated by the T-Bosses platform—and displayed on a browser window 1600 of a user device, in accordance with one embodiment of the invention. The cover page 1610 contains a variety of information relating to the T-BOSSES platform. Such information may relate to either a registered user, i.e. a user, of the T-BOSSES platform as well as an individual who is not yet a registered user of the T-BOSSES platform. A user may access the cover page 1610 by entering some predetermined address, e.g. URL", in an address bar 1601 of the browser window 1600.

The cover page 1610 may include a suitable button for a user to sign in, such as the button 1620. Relatedly, the cover page 1610 may include a button 1621 for selection by a new user. Specifically, the processing may provide for a new user to tap the button 1621 so as to initiate the processing described above with reference to step 325 of FIG. 4 and the processing of FIG. 5. Further, the "Help" button 1602, as shown in FIG. 16, may be provided to offer additional information to the user in some suitable manner. Such a "help" button might be set up to provide any of a wide variety information, including information regarding how the T-BOSSES platform works. A "comments" button may also be provided so as to facilitate helpful feedback from customers.

As shown in FIG. 16, cover page 1610 may include a wide variety of engaging text, graphics and other indicia. Illustratively, as shown in FIG. 16, the cover page 1610 may include information regarding the "items of the week" currently on the T-BOSSES platform. The "items of the week" may be presented in some abbreviated manner on the cover page 1610—with the option of a user clicking a "more info" button 1632. Accordingly, by clicking such button 1632, the user may be provided with a variety of additional information as may be desired. It is appreciated that the access provided to any particular individual, i.e. whether the individual is allowed to access more information via the "more info" button 1632 may depend on whether that user is registered or not. Additionally, upon a user clicking the "more info" button 1632—the particular content generated by the T-BOSSES platform and displayed to the user may depend on attributes of the user. For example, the system may retrieve the user's geographical location (for example ZIP Code) so as to generate information most related to that geographical location. The "items of the week" example of FIG. 16 is merely illustrative. It should of course be appreciated that any of a wide variety of information may be provided on the cover page 1610 so as to elicit the further engagement of a prospective user, as well as information to be of interest to a current user of the T-BOSSES platform.

Figure 17:
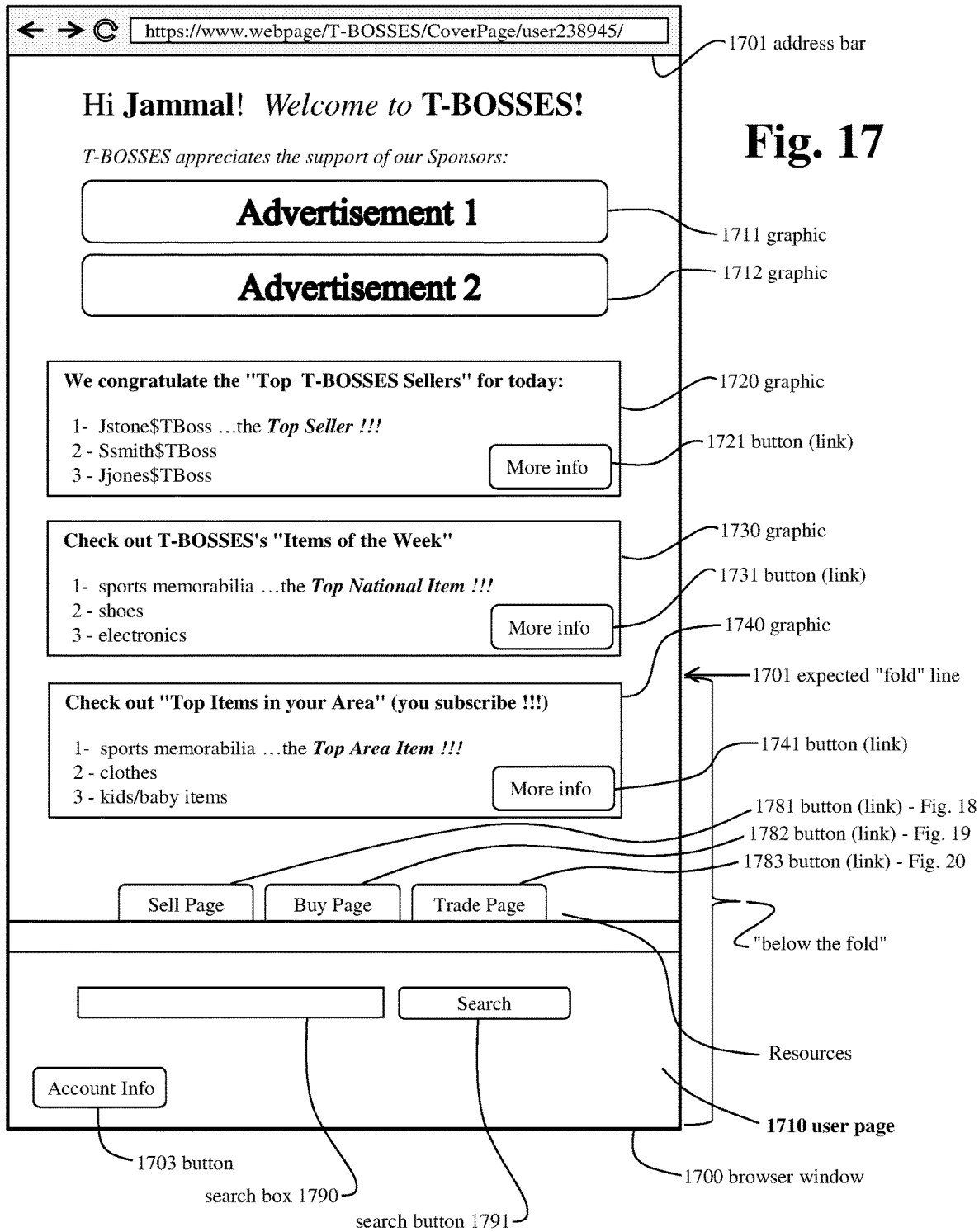
FIG. 17 is a graphical user interface (GUI) showing a "user page" generated by the T-Bosses platform—and displayed on a user device, in accordance with one embodiment of the invention.

In accordance with one embodiment of the invention, once the user signs in to his or her account the user is brought to a user page. FIG. 17 is a graphical user interface (GUI) showing a "user page" 1710 generated by the T-Bosses platform—and displayed on a browser window 1700 of a user device, in accordance with one embodiment of the invention. A user may access the user page 1710 by entering some predetermined address, e.g. URL", in an address bar 1701 of the browser window 1700. In addition, the user may access his or her user page via signing into his or her account via the GUI of FIG. 16.

The user page 1710 (of FIG. 17) may also include a wide variety of engaging text, graphics and other indicia to engage the user. However, such content is geared towards that specific user to a greater degree vis-à-vis the cover page 1610 of FIG. 16. Indeed, the user page 1710 may provide a wide variety of information regarding the user, aspects of the T-BOSSES platform as they pertain to that specific user, attributes of the user's account, as well as of a wide variety of other information. The user may be provided with the ability to select the level of detail displayed on the user page 1710.

As shown in FIG. 17, the user page 1710 includes a variety of advertisement information, as described above. Specific to the example of FIG. 17, the user page 1710 includes advertisements in the form of graphics 1711 and 1712. Such two graphics are merely illustrative and any number of graphics may be utilized as desired. Indeed, it is well envisioned that the user page 1710 would include sufficient advertisement and other paid promotional material such that a user would need to scroll down through such advertisement and other paid promotional material—so as to access the various other information disposed at the bottom of the user page 1710.

In the example of FIG. 17, the user page 1710 further includes a graphic 1720. The graphic 1720 is provided to promote various T-BOSSES platform users, i.e. those users who obtained a "Top T-BOSSES Sellers" for the day. Further information may be obtained by the user tapping the more "info button" 1721. As shown, the internal T-BOSSES messaging address may be provided in the graphic 1720. As shown, such address might utilize the particular user's name in conjunction with TBOSS as a domain name, each separated by the "$" indicia instead of the normal "@" indicia—i.e. the electronic address for use in an internal T-BOSSES network may be in the format of "Jstone$Tboss", for example.

Additionally, in this example, the user page 1710 includes an "Items of the Week" graphic 1730 akin to such content presented on the cover page 1610. However, it is appreciated that the particular "Items of the Week" graphic 1730 on the user page 1710 may be uniquely varied for purposes of display to the particular user. Relatedly, the level of information and/or detail presented to the particular user in the "Items of the Week" graphic 1730 may of course be varied. More information may be accessed (by the user) by tapping the button 1731.

Related to the processing of FIG. 13 and FIG. 14 above, the user page 1710 may include a graphic 1740 directed to "Top Items in your Area". Such graphic may include a variety of information related to the "top items" to which the particular user subscribes. The user may access more information via the "more info" button 1741. As noted above, it is appreciated that the level of information displayed on the user page 1710 versus the amount of information retrieved via the "more info" button may vary as desired and indeed may be adjustable by the user. For example, some users may wish to have a lot of information on a single page, where as other users prefer to "drill down" to access additional information regarding a particular of content.

It is appreciated that the spatial arrangement of the user page 1710, as well as the other GUIs, may vary as desired. For example, the graphics (1720, 1730, 1740), might be disposed on the right or left side of the browser window 1700. This might be desirable to provide for additional content disposed in the middle of the browser window 1700. In particular, this might be desirable to provide space for additional advertising content and other promotional content in the middle of the browser window 1700. It is appreciated that the advertising, i.e. promotions, disposed on a particular offering user's webpage may well relate to the particular items offered by that user. Accordingly, the offering T-BOSSES webpage of a user who routinely offers sneakers for sale may well be provided with advertising relating to sneakers, for example.

In general, objectives of the user page 1710 may be to provide a platform for advertising through which the user must scroll down to access resources; high level content regarding the user's account; and indeed the resources themselves.

The user page 1710 includes a search box 1790. The search box may be populated with desired search requests, entered by the particular user. Hand in hand, once the user has entered his or her search, the user then taps the search button 1791. Relatedly, FIG. 17 shows an expected "fold" line 1701. It is expected that such fold line 1701 will be disposed around a lower border of a user's display screen. Accordingly, in accordance with one marketing aspect of the invention, the user will need to scroll down through the advertisements to reach various resources that are disposed at the bottom of the user page 1710. The search box 1790 is one of those resources. In other words, it is envisioned that the various resources will be disposed "below the fold."

As shown in FIG. 17, the user page 1710 may also include an "account info" button 1703. The account info button 1703 may provide the particular user with various information regarding that user's account.

Further resources (disposed on the user page 1710) are various resource buttons that may be disposed at the bottom of the user page 1710. Specifically, these resource buttons include a "sell page" button 1781; a "buy page" button 1782; and a "trade page" button 1783. A user taps one of the buttons (1781, 1782, 1783) to access corresponding information as described below. Illustratively, if the user taps the "sell page" button 1781, the user is directed to the GUI of FIG. 18.

Figure 18:
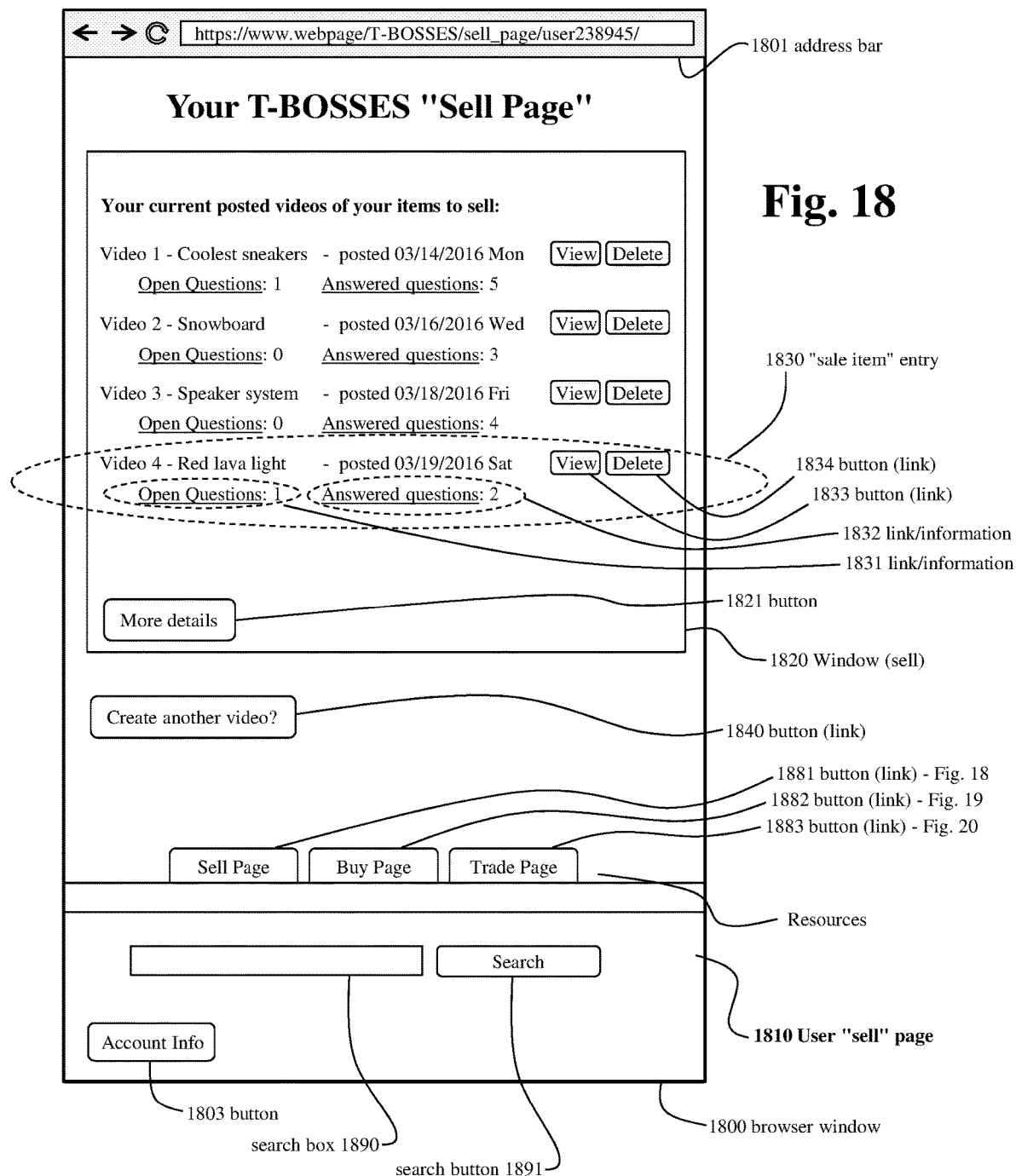
FIG. 18 is a graphical user interface (GUI) showing a user "sell page" generated by the T-Bosses platform—and displayed on a user device, in accordance with one embodiment of the invention.

FIG. 18 is a graphical user interface (GUI) showing a user "sell page" 1810 generated by the T-Bosses platform—and displayed on a browser window 1800 on a user device, in accordance with one embodiment of the invention. In particular, the "sell page" 1810 includes the current posted videos of that particular user. More specifically, the sell page 1810 includes a listing of all the videos the user currently has posted—for the purpose of selling items. As shown in FIG. 18, each posted video is reflected as a "sale item entry" 1830. Each sale item entry 1830 includes the name of the video, as such name is created by the user in accordance with one embodiment of the invention. Additionally, each sale item entry 1830 may include various attributes of the video, such as when the video was posted, length of the video, and other attributes of the video. So for example, the video for "red lava light" is reflected as posted on Mar. 19, 2016. The sale item entry 1830 may include a button 1833 the user may tap to view the particular video. Further, the sale item entry 1830 may include a button 1834 the user may tap to delete the particular video.

Each sale item entry 1830 includes a link 1831 to "open questions" and a link 1832 to "answered questions". The user may click such links to obtain further information regarding any "open" questions the user has associated with the video and/or any "answered" questions the user has associated with the particular video, for example. To further explain, both the open questions and the answered questions relate to questions that a prospective buyer has posed to the user (who is the seller). A number may be disposed next to the link 1831 showing how many open questions the user has. In similar manner, a number may be disposed next to the link 1832 showing the number of answered questions.

Accordingly, one objective of the sell page 1810 is to provide a variety of information regarding the various videos a user has posted in conjunction with promoting the sale of a particular item. All of the various sale item entries 1830 may be disposed in a distinct window 1820. Additionally, a "More Details" button 1821 may be disposed alongside the sale item entries 1830. The "More Details" button may be tapped by the user to access more detailed information regarding the various posted videos and associated items for sale. For example, the "more details" might include a variety of metrics associated with the posting of videos such as the number of views, number of users who opted to be placed "in-line", geographical information regarding the users who viewed the posted video, and various other information as may be desired.

In a similar manner to the user page 1710, the "sell page" 1810 has various resources disposed at the bottom of the page including resource buttons (1881, 1882, 1883), the search button 1891, and the search box 1890. Additionally, the sell page 1810 may include an "account info" button 1803, as described above.

Figure 19:
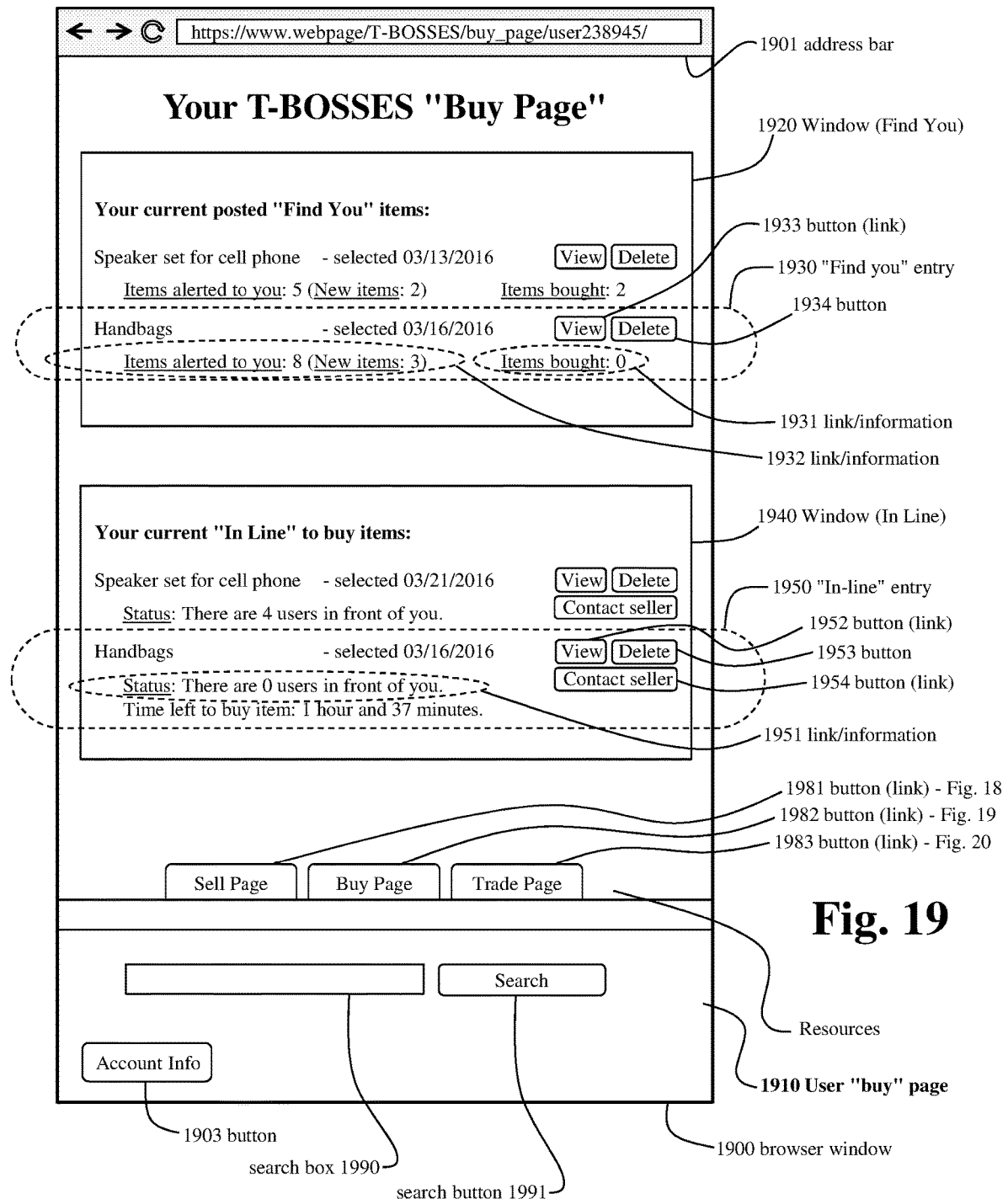
FIG. 19 is a graphical user interface (GUI) showing a user "buy page" generated by the T-Bosses platform—and displayed on a user device, in accordance with one embodiment of the invention.

FIG. 19 is a graphical user interface (GUI) showing a user "buy page" 1910 generated by the T-Bosses platform—and displayed on a browser window 1900 of a user device, in accordance with one embodiment of the invention. In particular, the "buy page" 1910 includes a variety of information related to the "buy" activities of the user. Specifically, the buy page 1910 includes that user's current posted "find you" items and that user's current "in-line" to buy items.

The current "find you" items may be disposed in a window 1920. The window 1920 includes a plurality of "find you" entries 1930. In accordance with one embodiment of the invention, each "find you" entry 1930 may include a name of the signed item, as designated by the user. It is appreciated that the name shown in the "find you" entry 1930 may or may not coincide with the search criteria associated with that particular "find you" entry. Rather, such search criteria for a particular "find you" entry 1930 may be viewed utilizing the "view" button 1933. Each "find you" entry 1930 may include various information as desired, such as the date the particular "find you" entry was created.

Additionally, each "find you" entry 1930 may include what might be characterized as a running status of the "find you" items. Specifically, the "find you" entry 1930 may include "items alerted to you", which reflects the number of items that the platform has alerted you to and that you have reviewed for possible purchase. Additionally, the "find you" entry 1930 may include an indication of the "new items". Such "new items" may constitute items the T-BOSSES platform has alerted you to—but that you have not yet reviewed for possible purchase.

Additionally, as noted above, the buy page 1910 includes the particular users "in-line" items. Each "in-line" item is represented by an "in-line" entry 1950. Each such "in-line" entry may include the name of the "in-line" entry as well as particulars of the "in-line" entry. Additionally, each "in-line" entry 1950 may include a "view" button 1952 by which the user may view the particulars of any in-line item the T-BOSSES platform has identified for the user. Also, each "in-line" entry 1950 may include a "contact seller" button 1950. The "contact seller" button 1950 may be tapped by the user to access information to contact the seller of the particular item, as well as various information regarding the identified item—so that the user can further pursue potentially purchasing such identified item. Lastly, each "in-line" entry 1950 includes a delete button 1953. The delete button 1953 may be tapped by the user to delete the particular item, i.e., once the user no longer wishes to pursue the purchase of such item, i.e. for one reason or another.

Additionally, each "in-line" entry 1950 includes status information regarding each "in-line" entry. In particular, such status information may include the total number of users in front of you, i.e. how many users are in front of you (who have to pass on the particular item) prior to you having the option to buy the item. The "status" may be constituted by a link, which a user may tap for further information. In addition, each "in-line" entry 1950 may include "time left to buy item" information. Such information (in the case where it is the user's time to decide whether the user wishes to purchase the identified item) indicates how much time left the user has in which to make the purchase. In the illustrative situation shown in "in-line" entry 1950, the user has one hour and 37 minutes left in which to buy the product.

In a similar manner to the user page 1710, the "buy page" 1810 has various resources disposed at the bottom of the page including resource buttons (1981, 1982, 1983), the search button 1991, and the search box 1990. Additionally, the buy page 1910 may include an "account info" button 1903, as described above. Each of the resource buttons (1981, 1982, 1983) may be tapped by the user to navigate around the T-BOSSES site is desired.

The systems and methods of the invention provide a variety of technology that functions in association with the T-BOSSES platform's manipulation of user videos. In particular, the disclosed T-BOSSES platform provides substantial capability to a user to post items for sale in the highly beneficial electronic medium of a "video." The key systems and methods of the invention afford a technical improvement in that the invention provides for the manipulation of a large amount of consumable information (in the form of video) in a highly effective manner. To explain further, once a user video (promoting a product) is input into the T-BOSSES platform, various novel features serve to effectively tag such video, distribute such video, control access to such video, control sales associated with such a video, control purchases associated with such video, provide alerts to users and other processing components regarding the possible purchase and sale of the particular item, control the handling of the video, as well as various related processings. All these novel features collectively afford a highly effective personal sales and purchasing platform dedicated to the sale, purchase, and barter of items utilizing video. Accordingly, the invention improves the manner in which the T-BOSSES platform operates (i.e. the manner in which the computer of the T-BOSSES platform operates) in that the invention creates a framework in which a video medium (as the fundamental sales/better mechanism) may be effectively utilized. Absent the features of the present invention, known systems fall short in effectively handling the substantial memory requirements implicated in the manipulation of video. In particular, the invention provides for potential purchasers to come to a seller's "sell" page to investigate prospective purchases. This mechanism greatly reduces memory requirements in that the prospective purchasers come to a seller's video, which is in sharp contrast to the seller's video being output to the prospective purchasers. Accordingly, this arrangement greatly decreases the requisite memory of involved processors. In this manner, the invention provides a technical improvement in that the invention improves the memory requirements of involved processors.

Figure 20:
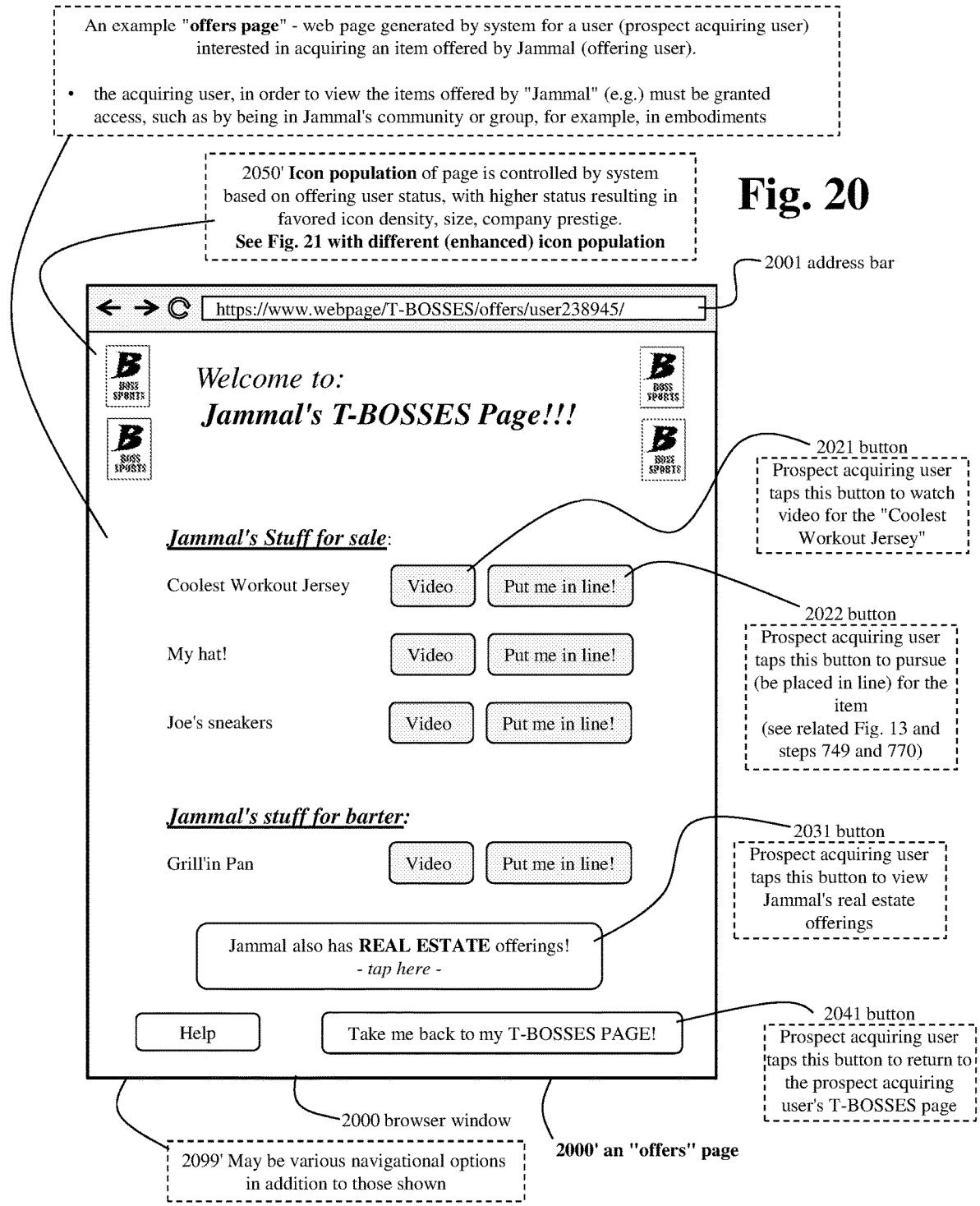
FIG. 20 is a graphical user interface (GUI) showing an "offers page" generated by the T-Bosses platform—and displayed on a user device, in accordance with one embodiment of the invention.

Hereinafter, various further aspects of the systems and methods of the invention will be described with reference to FIG. 20. FIG. 20 is a graphical user interface (GUI) showing an "offers page" generated by the T-Bosses platform—and displayed on a user device, in accordance with one embodiment of the invention. More specifically, FIG. 20 shows a browser window 2000 that displays an example offers page 2000'. The offers page 2000' provides an example webpage generated by the system for a first user (i.e. a prospect acquiring user) who is interested in acquiring an item offered by an offering user. In the example, that offering user is characterized as an individual, "Jammal". The first user may be characterized as a prospect acquiring user, or simply characterized as an "acquiring user" in that such user has not yet acquired an item upon viewing the offers page 2000'.

In the example of the offers page 2000', the acquiring user may access the offers page 2000' through a search of the particular user "Jammal" or through a search of one of the items offered on the particular webpage, for example. As shown, the offers page 2000' includes URL address bar 2001. In accordance with embodiments of the invention, the acquiring user—in order to view the items offered by the offering user (here "Jammal")—must be granted or allowed access to the particular offers page (of the particular offering user). Accordingly, in some embodiments, a particular user is not granted access to all other users' offers page. Rather, the acquiring user, in order to view items offered by an offering user, must be in the offering users community or group, for example. Accordingly, the T-BOSSES system controls what users have access to what other users in a structured way. Various aspects of this functionality are described herein.

As shown in FIG. 20, the offers page 2000 may include suitable nomenclature such as the illustrated "Welcome to Jammal's T-BOSSES Page!!!" In embodiments of the invention, the offering user may be provided functionality so as to set the particular welcome nomenclature. Such functionality (to allow the user to set the particular welcome nomenclature) may be subject to appropriate protocols and constraints, such as "number of character" constraints, for example.

As shown in FIG. 20, the offers page 2000' includes a listing of items that a particular offering user is currently selling. This listing is identified by appropriate nomenclature such as "Jammal's Stuff for Sale". Listed below such identifier is a listing of items—including, in the example, "coolest workout jersey". As shown in FIG. 20, other items are also listed. Each item is associated, in accordance with this embodiment, with multiple buttons, which are disposed alongside the particular button. Specifically, each listed item is associated with a video button 2021, as well as a "Put me in line!" button 2022. These buttons allow an acquiring user, who is viewing the offers page 2000', to engage with the particular listed item.

More specifically, the video button 2021 is provided to allow the prospect acquiring user to view the video associated with the "coolest workout jersey" item. The prospect acquiring user taps the video button 2021 to watch the video for the particular item. On the other hand, in accordance with one embodiment of the invention, the offers page 2000' also includes the "Put me in line!" button". This button is typically tapped by the acquiring user after the acquiring user has watched the video associated with a particular item, i.e. after the user has tapped the video button 2021. The prospect acquiring user taps button 2022 to be "placed in line" for the particular listed item. As described above, related processing is set forth with reference to FIG. 13, and specifically steps 749 and 770 of FIG. 13.

In similar manner to the listing of items for sale, as shown in FIG. 20, the offers page 2000' may also include a listing of items for barter. Each item listed for barter includes a video button (via which a prospect acquiring user may view the video associated with the particular item) and a "Put me in line!" button—via which a prospect acquiring user may be placed in line for the particular item, as described above with reference to FIG. 13.

As shown in FIG. 20, the offers page 2000' also includes button 2031. The button 2031 is selectable by the acquiring user (who is visiting the offering user's page) so as to navigate to the particular offering user's real estate offerings (i.e. property offerings)—if indeed the offering user has real estate offerings. In embodiments of the invention, such real estate offerings may be displayed on a suitable offers page in a manner similar to the items displayed on the offers page 2000' of FIG. 20. In the situation where the particular offering user does not have "real estate" items, the button 2031 may either be not present (i.e. there is no real estate button displayed), dimmed out, and/or disabled in some suitable manner.

Further, the offers page 2000' includes button 2041. The prospect acquiring user may tap button 2041 to return to the prospect acquiring user's T-BOSSES page. For example, by tapping the button 2041, the user is returned to that user's homepage, sell page, or some other page as may be desired.

In accordance with one aspect of the invention, and as reflected at box 2099', it is appreciated that each webpage generated for users by the T-BOSSES platform may be provided with various navigational options, as desired. For example, it is appreciated that buttons to navigate between the various webpages associated with a user may be provided as desired. It is appreciated that a suitable assistance buttons (such as a "help" button) may be provided on T-BOSSES pages as desired.

The offers page 2000' of FIG. 1 also shows a feature of the invention characterized as "icon population," in accordance with embodiments of the invention. As reflected at box 2050' of FIG. 20, icon population (of a particular user webpage) is a feature that is controlled by the T-BOSSES system based on the offering user's status, in accordance with one embodiment of the invention. Accordingly, as the status of the particular user is raised (i.e. enhanced), such enhanced status will result in enhanced icon population. As characterized herein, the term "icon population" is not limited to the mere number of icons displayed on a particular user's page. Rather, the "icon population" feature may relate to any of a variety of favored icon attributes including the number of icons, the icon density across the webpage, the size of the icons displayed on the webpage, the nature of the icons, the color of the icons displayed, and/or the company prestige of the icons disposed on the webpage, for example. Further, the term "icon" is intended to encompass any shape, logo, symbol, of any other graphical representation.

Illustratively, the offers page 2000' (of FIG. 20) includes a total of four icons. Over time, the T-BOSSES user population will come to learn and understand the meaning of a particular icon population. Accordingly, the icon population feature provides for other users to quickly understand and appreciate the T-BOSSES "social status" of the particular offering user. Indeed, different types of "icon population" may convey different types of status for a particular offering user. For example, the pure number of icons displayed on an offers page (such as page 2000' of FIG. 20) might convey a representation of the number of items that user has successfully sold on the T-BOSSES platform. On the other hand, the size of the icons displayed might convey some other strength of the particular offering user, such as how many times the offering user has attained "BOSS" status. Such aspect of the icon population feature is reflected at box 2150" of related FIG. 21.

Figure 21:
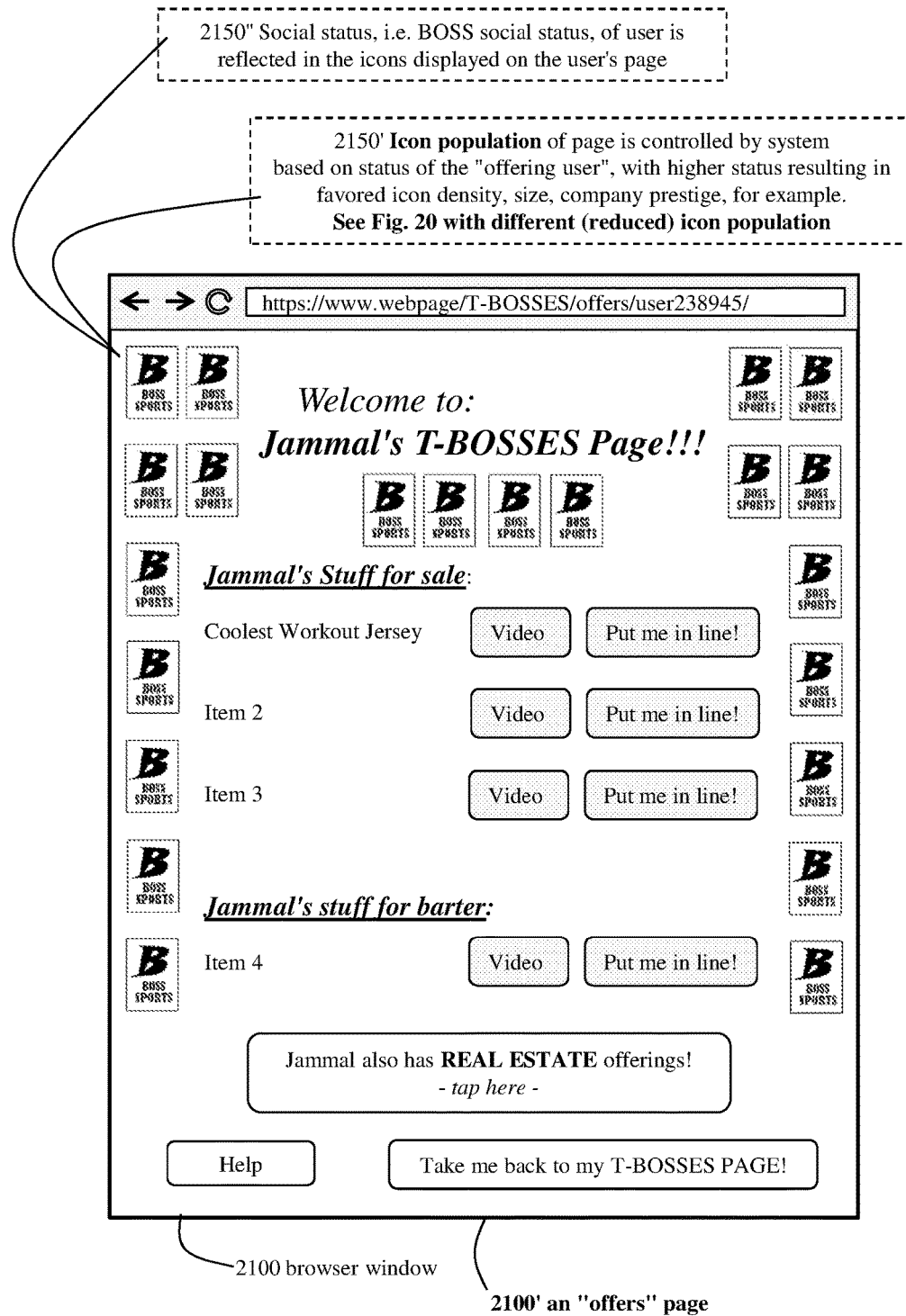
FIG. 21 is a graphical user interface (GUI) showing a further illustrative "offers page" generated by the T-Bosses platform—and displayed on a user device, in accordance with one embodiment of the invention.

FIG. 21 is a graphical user interface (GUI) showing a further illustrative "offers page" generated by the T-Bosses platform—and displayed on a user device, in accordance with one embodiment of the invention. In particular, FIG. 21 shows a browser window 2100 that displays a further illustrative "offers page" 2100'. Related to FIG. 20 described above, FIG. 21 also shows aspects of the "icon population" feature as reflected at box 2150' of FIG. 21.

As shown, the offers page 2100' includes the same functionality as the offers page 2000' described above with reference to FIG. 20. However, the offers page 2100' is different in that it displays an enhanced icon population. That is, as shown, the offers page 2100' of FIG. 21 displays a total of "18" "Boss Sports" icons. As can be appreciated, such displayed icon content on the offers page 2100' is notably enhanced vis-à-vis the icon content displayed on the page 2000' of FIG. 20.

In accordance with embodiments of the invention, it is appreciated that the particular number of icons displayed may reflect any single social attribute attained in connection with use of the T-BOSSES platform—or alternatively—may reflect some collection of social attributes attained in connection with use of the T-BOSSES platform, i.e. may reflect social attributes in the aggregate.

In accordance with a related feature of the invention, a user may be provided a "selectable" feature in which the user chooses the particular manner in which the icon population (of his or her offers page) is enhanced. Accordingly, one user might choose to increase the number of icons displayed on her webpage. On the other hand, another user might choose to enhance some other attribute of the icons displayed (on her webpage), such as the dimensionality, size or color of the displayed icons.

Hereinafter, further aspects of the T-BOSSES platform will be described.

Figure 22:
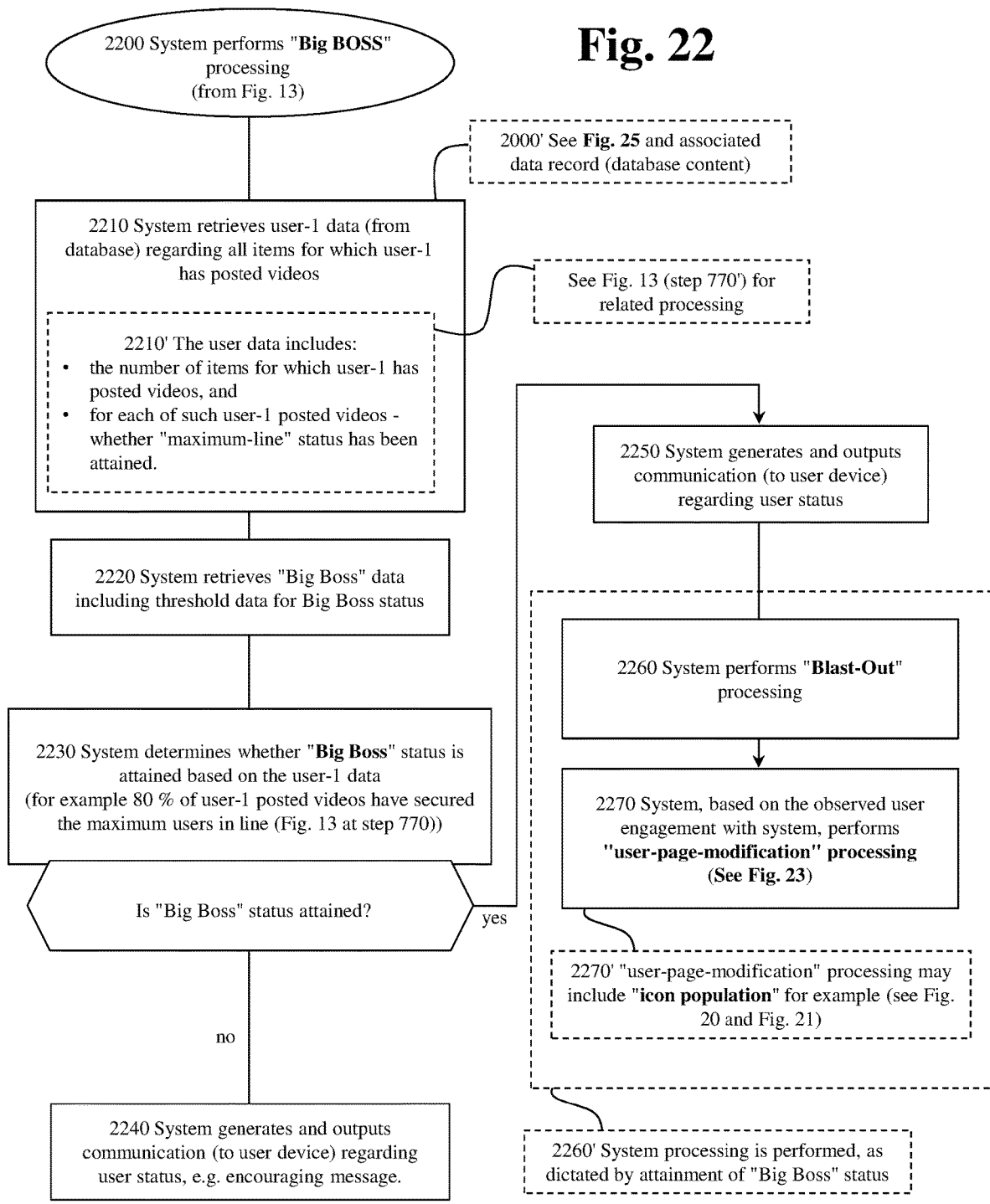
FIG. 22 is a flowchart showing details of what is herein characterized as "Big Boss" processing, in accordance with one embodiment of the invention.

FIG. 22 is a flowchart showing details of what is herein characterized as "Big Boss" processing, in accordance with one embodiment of the invention. As referenced above, Big Boss processing (as shown in step 2200 of the flowchart of FIG. 22) is launched in the processing of FIG. 13. More specifically, as described above, in step 770 of FIG. 13, a determination is made of whether there are more than some predetermined number of users, for example 5, in a particular offering user's line. The processing of FIG. 22 is launched in the situation that it is indeed determined that there were more than the maximum number of users in line. In other words, such determination indicates that the particular offering user has attained a level of success, at least as to that particular offered item. Based on this observation by the T-BOSSES platform, the platform launches the processing of FIG. 22 in conjunction with other processing being performed (such as the processing of step 500 in FIG. 13).

As shown in FIG. 22, the "Big Boss" processing starts in step 2200 and passes to step 2210. For purposes of illustration, the processing of FIG. 22 is described with reference to an illustrative user, user-1. As shown, in step 2210, the T-BOSSES system retrieves (in accordance with one embodiment of the invention) various data regarding items for which user-1 has posted videos. For example, such data pull may be from the user database 160 shown in FIG. 2. As is shown at box 2210' in FIG. 22, the user data may include the number of items for which user-1 has posted videos, and for each of such user-1 posted videos, whether the "maximum-line" status has been attained. Additionally, some predetermined time window may be taken into account. For example, it may be the case that user-1 has posted 10 videos over the past 6 months. Of these 10 videos, for purposes of this example, say 8 have attained the maximum number of acquiring users in line, as reflected in the processing of step 770 in FIG. 13.

With this example in hand, and with further reference to FIG. 22, after step 2210 of FIG. 22, the processing passes to step 2220. In step 2220, the system retrieves Big Boss data including threshold data for Big Boss status. Then, in step 2230, the system determines whether Big Boss status is attained based on the retrieved user-1 data vis-à-vis the threshold data retrieved in step 2220.

If the determination is no in step 2230, then the processing passes to step 2240. In step 2240, the system generates and outputs a suitable communication to the user device (of the particular user) regarding status of the particular user. For example, the nature of the communication might include that the particular user has not yet attained Big Boss status, but is making good progress to attaining such status.

On the other hand, if yes in step 2230 (the particular user has indeed attained Big Boss status), the processing passes to step 2250. In step 2250, the system generates and outputs a communication to the user device (i.e. to the user) that Big Boss status has been attained. Additionally, as reflected at box 2260', system processing may then be performed as dictated by the attainment of "Big Boss" status by the particular user.

Illustratively, specific processing that may be performed, upon attainment of Big Boss status, is the system performing "Blast-Out" processing, as characterized herein. A "Blast-Out" is specific functionality provided by the T-BOSSES system upon the attainment by a user of certain status. In accordance with one embodiment of the invention, a Blast-Out includes a mass communication, generated by the T-BOSSES system to effectively celebrate the success of the particular user, i.e. the user who has attained Big Boss status (user-1 in this example). Such Blast-Out communication may go out to all users who are associated with user-1—through group or community, for example. In particular, a Blast-Out communication may advertise one or more items that user-1 is currently offering on his or her T-BOSSES page.

Additional system processing is reflected in the processing of step 2270 of FIG. 22. As shown in step 2270, the system performs user-page-modification processing based on the observed user engagement with the T-BOSSES system, which may include the attainment of Big Boss status by the particular user. Further details of the processing of step 2274 are illustratively described below with reference to FIG. 23. However, as reflected by box 2270', the user-page-modification processing in particular may include "icon population" processing for example. Features of such processing are also described above with reference to FIGS. 20 and 21.

Figure 23:
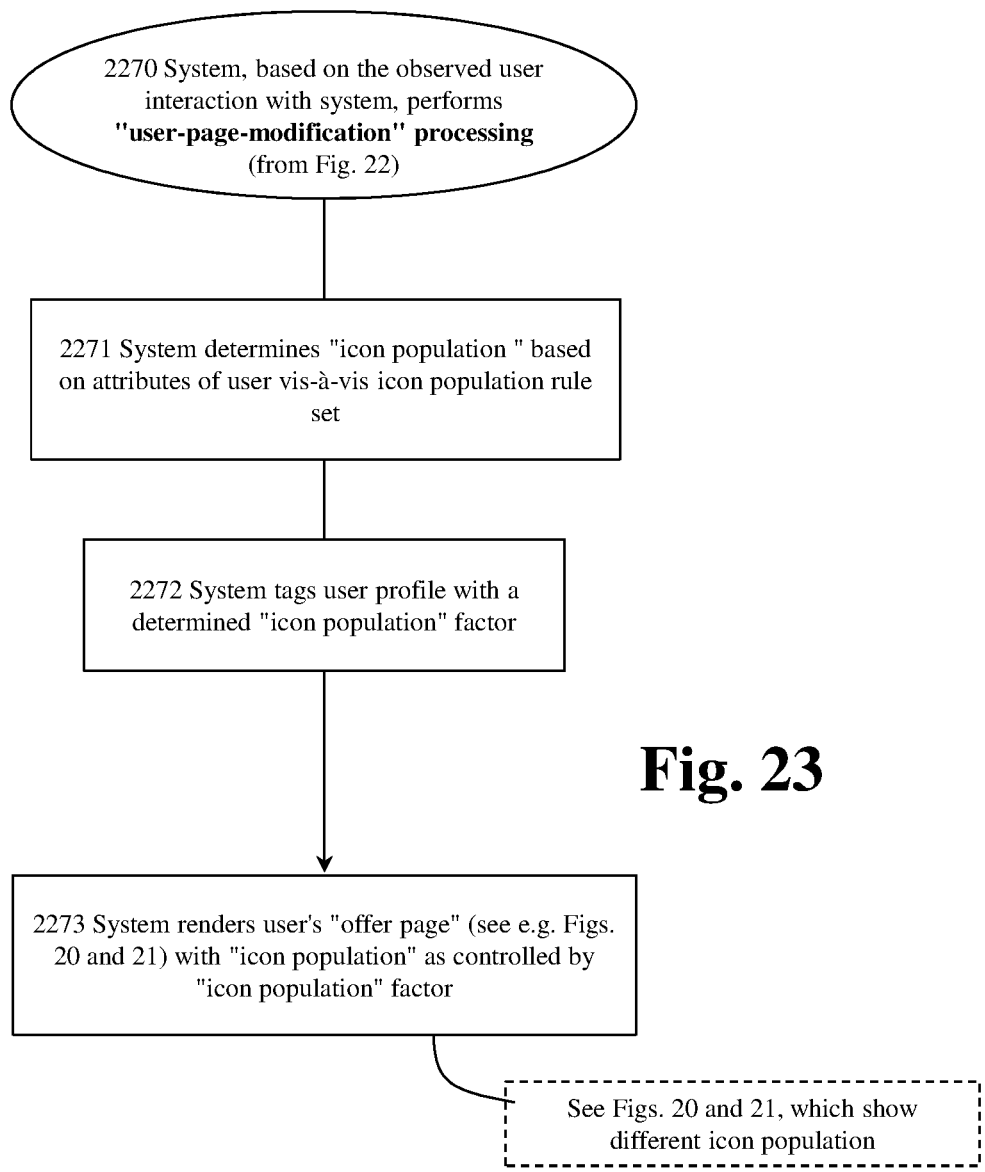
FIG. 23 is a flowchart showing in further detail the system, based on observed user engagement, performs "user-page-modification" processing (step 2270) of FIG. 22, in accordance with one embodiment of the invention.

In the processing of FIG. 22, it is appreciated that the particular activity and/or the particular thresholds that dictate whether a user has (or has not) attained Big Boss status may vary as desired. Indeed, in accordance with one embodiment of the invention, Big Boss status may be obtained by a single item attaining the maximum number of users waiting in line (step 770 FIG. 13)—thus resulting in a Blast-Out communication for the particular user. Alternatively, Big Boss status may require numerous items to attain the maximum number of users waiting in line, over a period of time As referenced above, FIG. 23 is a flowchart showing in further detail the system, based on observed user engagement, performs "user-page-modification" processing (step 2270) of FIG. 22, in accordance with one embodiment of the invention. As shown, the process starts in step 2270 and passes to step 2271.

In step 2271, the system determines icon population based on attributes of the particular user vis-à-vis an icon population rule set. Then, in step 2272, the system tags the particular user profile with a determined "icon population" factor, as characterized herein. Then, the processing passes to step 2273. In step 2273, the system renders the particular user's "offer page" with the particular icon population as controlled by the "icon population" factor. Different icon populations are described above and shown in FIG. 20 in FIG. 21, for example.

FIG. 24 is a diagram illustrating processing aspects of the T-BOSSES platform (100), in accordance with one embodiment of the invention. More specifically, box 2400 of FIG. 24 illustrates various aspects of what is herein characterized as a "video item". As shown in FIG. 24, as characterized herein, each "video item" processed by the T-BOSSES system is constituted by "video item content". Further, such "video item content" includes "video media data" and "video attribute data".

FIG. 24 sets first particulars of the invention relating to the video that users create. Firstly, the "video media data" (as characterized in FIG. 24) is the actual "user created video" that is created by an offering user and viewable by acquiring users, i.e. those acquiring users who have access to view the offered item. Accordingly, "video media data" and "user created video" are one and the same and have been used herein interchangeably.

Secondly, and on the other hand, video attribute data includes various data that is associated with the "video media data." As shown in FIG. 24, video attribute data may include various data types. In particular, video attribute data may include a description of the video that the user enters into the system, i.e. to describe the video. In other words, the T-BOSSES platform may prompt the user to enter a short description in conjunction with the user creating a user created video. For example, the user may be creating a video to sell a stroller for a baby. In such situation, the description might simply be "stroller". As shown in FIG. 24, video attribute data may also include distribution data. The distribution data of the video item controls user distribution of the particular video item, i.e. to what users will be particular video item be accessible by and/or output to in some manner.

Relatedly, it is appreciated that in some embodiments of the invention, a prospect acquiring user may be able to view the video of an offering user—even though such acquiring user may not be able to purchase the item. Such functionality may be provided based on a set of rules applied to a group and/or community in which the offering user is associated. Such functionality may motivate such acquiring user (who can view, but who do not have access to buy) to take some predetermined action so as to become a member of the offering user's group, for example. A T-BOSSES group might be formed around an activity, an existing group, a homeowners group (HOA), a sports team, a person, or in any other manner as desired.

With further reference to FIG. 24, the video attribute data may also include user data that "maps" or "links" the particular video item to the creating user. Further, the video attribute data may include geographical or geo data. Such geographical data may tag a video item as being associated with a particular geographical region. For example, the geographical data might be constituted by a ZIP Code that is linked to the particular video item. Alternatively, it is appreciated that a video item may be linked to the offering user (who created the video item)—and in turn the offering user is associated with geographical data, such as a ZIP Code. As a result, the video item may be effectively linked to the ZIP Code. In some embodiments of the invention, geographical data may be automatically associated with a user created video. Such functionality might be provided using the GPS feature of the phone—on which the "user created video" was created.

As also shown in FIG. 24, the video attribute data may include date and time information of when the video was created. Additionally, the video attribute data may include "eye-stop" data that is associated with a video item. In other words, data regarding what eye-stops are available for a particular user created video may be maintained in video attribute data associated with such user created video. Further aspects of eye-stop functionality are described below.

As reflected in box 2400 of FIG. 24, it is appreciated that video attribute data is not limited to the particular data listed. Rather, other types of data may be included dependent on a particular situation or application, for example.

FIG. 25 is a diagram showing a portion of a user database, in accordance with one embodiment of the invention. In particular, FIG. 25 shows further detail of the user database 160 of FIG. 2. As shown, the user database 160 includes a plurality of user data records—likely in the thousands or millions. As shown, the user database 160 includes data records 2021, 2022, 2023, 2024 and 2025 for corresponding users. Illustratively, the user data record 2021 includes a data record named user-2021 data that is associated with a human user.

The user-2021_data includes, but is not limited to, a variety of data as shown in FIG. 25. Each of such data may be in the form of suitable data records and/or data fields. Further, each of such data may be associated with other data such as utilizing a relational database or some other associative data structure. Further, the content in each of the user data records in the user database (shown in FIG. 25) will be varied in the normal course of performing the processing of the invention. As described further below, the data may be written to and saved upon a suitable computer readable medium. Specifically, the user-2021_data includes:

2021-1 User-2021_Personal_Data: this data includes any of a wide variety of data associated with the human user such as name information, state location, username, password, contact information, address information, for example.

2021-2 User-2021_Items_for_sale_Data: this data includes any of a wide variety of data relating to those items (i.e. a video item) that the user currently has for sale. In particular, this data includes video media data and video attribute data as described below with reference to FIG. 24, for example.
2021-3 User-2021_History_Data: this data includes any of a wide variety of data associated with the user history, for example. 2021-4 User-2021_Network_Data: this data includes any of a wide variety of data relating to the particular user's group, community, or network, for example.
2021-5 User-2021_Geo_Data: this data includes any of a wide variety of data relating to the user's geographical or physical location, for example.
2021-6 User-2021_Offering_Data: this data includes any of a wide variety of data relating to past or current offers for sale or barter, for example.
2021-7 User-2021_Acquisition_Data: this data includes any of a wide variety of data relating to items the particular user has acquired through purchase or barter, for example.
2021-8 User-2021_Find-You_Data: this data includes any of a wide variety of data relating to the find you processing of the invention, for example.
2021-9 User-2021_EyeStop_Data: this data includes any of a wide variety of data relating to the eye-stop processing of the invention, for example.
2021-10 User-2021_Status_Data: this data includes any of a wide variety of data relating to the user's social status in the T-BOSSES system such as the number of times that the particular user has achieved "Big BOSS" status, for example.

Various further aspects of such data are described further below. It is appreciated that data stored in one database and/or data record may overlap with other databases and/or data records. It is appreciated that various other data may be used in the systems and methods of the invention in addition to the data shown in FIG. 25. Accordingly, FIG. 25 is meant to be illustrative and not limiting.

Hereinafter, various aspects of what is herein characterized as "BOSS-queue" processing will be described with reference to FIGS. 26 to 29. Such BOSS-queue functionality provided by the system of the invention is directed to creating a queue of sorts—that effectively reserves a time window in the future for the creation of a "user created video", i.e. for the creation of a video item. That is, as reflected in box 2600" of FIG. 26, the BOSS-Queue processing of the invention allows user-7, for example and illustratively, to "queue" a time window to post video.

Figure 26:
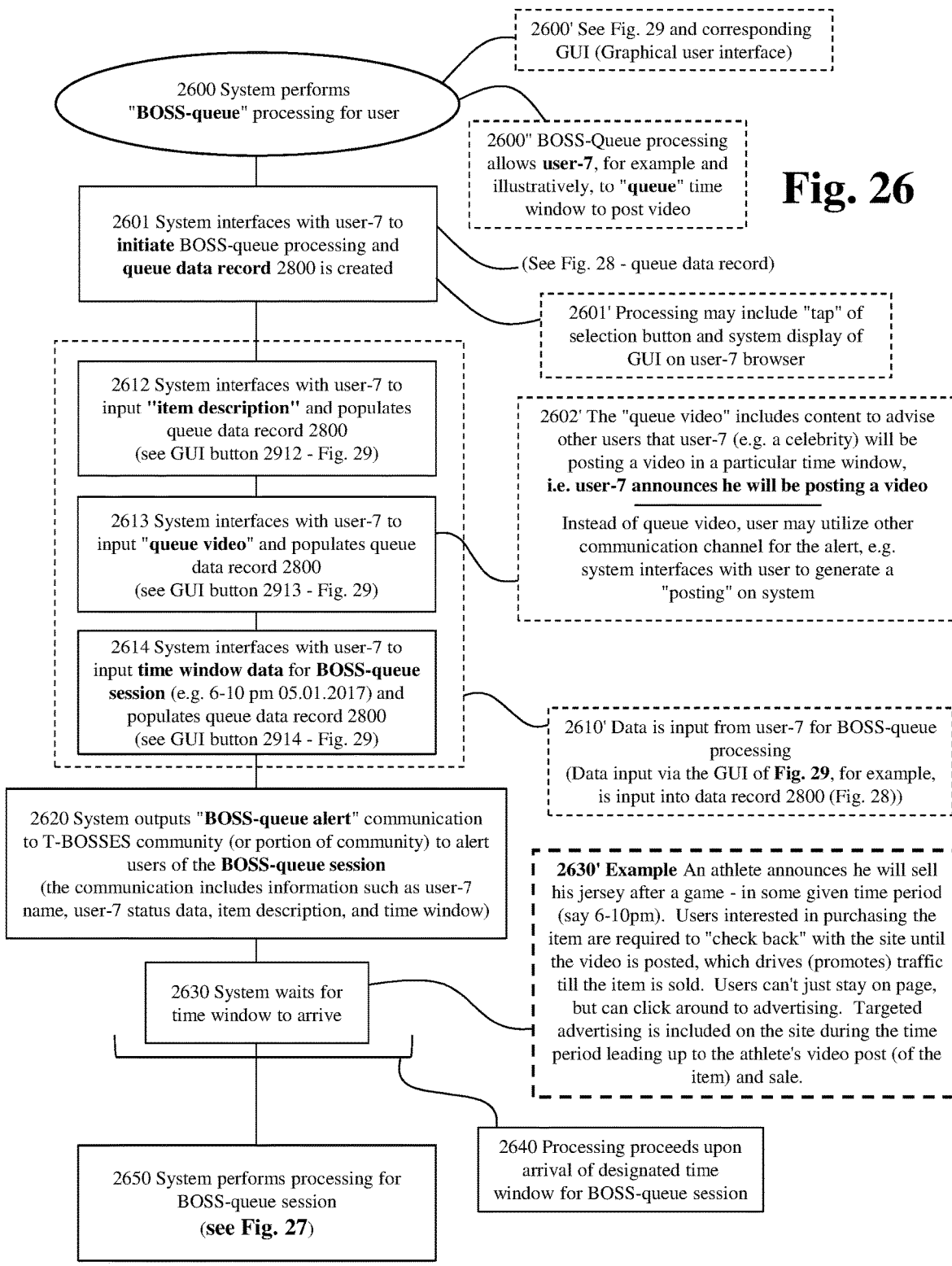
FIG. 26 is a flowchart showing aspects of the "system performs BOSS-Queue processing for a user" in accordance with one embodiment of the invention.
Figure 27:
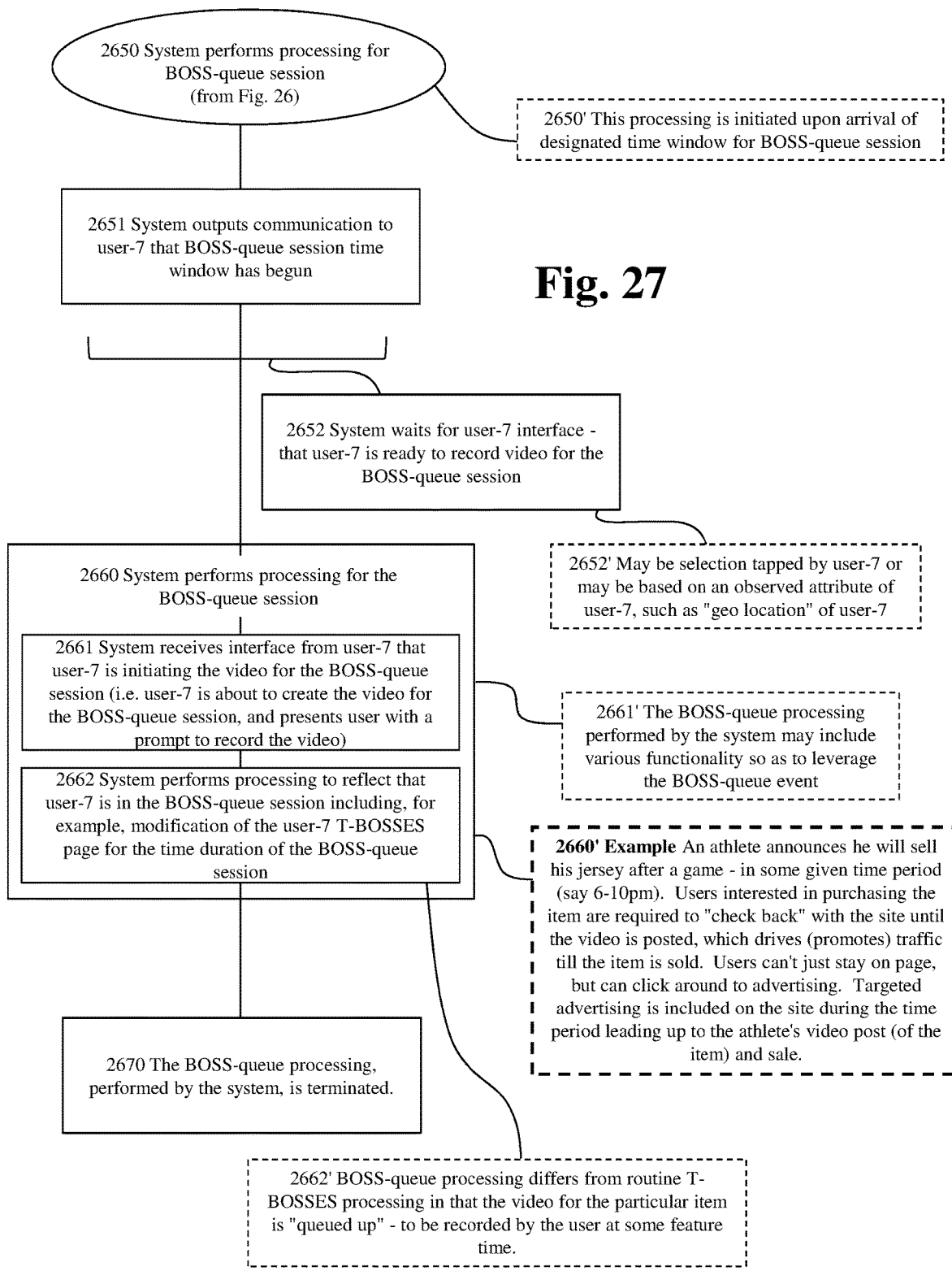
FIG. 27 is a flowchart showing in further detail the "system performs processing for BOSS-queue session" (step 2650) of FIG. 26, in accordance with one embodiment of the invention.

FIG. 26 and FIG. 27 are flowcharts directed to the BOSS-Queue processing. In particular, FIG. 26 is a flowchart showing aspects of the "system performs BOSS-Queue processing for a user" in accordance with one embodiment of the invention. For purposes of description, the BOSS-Queue processing is described in the context of an illustrative user, user-7.

Figure 28:
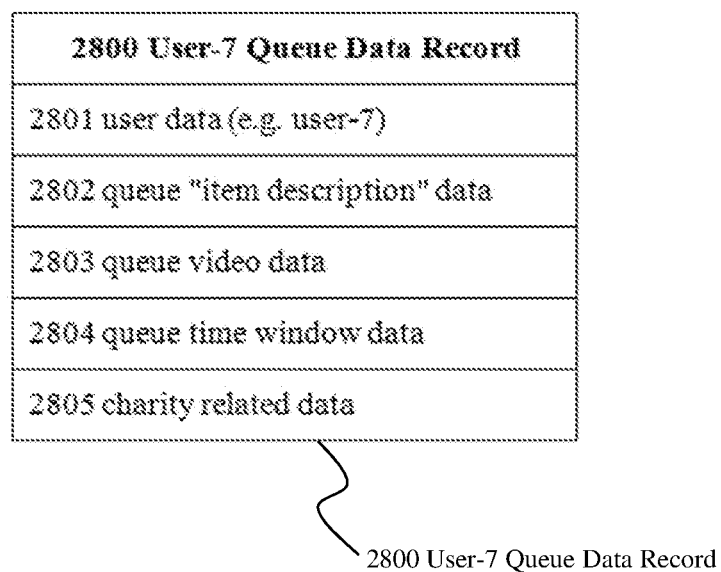
FIG. 28 shows a user-7 queue data record 2800, in accordance with one embodiment of the invention.

Related to the processing of FIG. 26, FIG. 28 shows a user-7 queue data record 2800, in accordance with one embodiment of the invention. Further details of such data record 2800 are described below in the context of the processing of FIG. 26 and FIG. 27.

Figure 29:
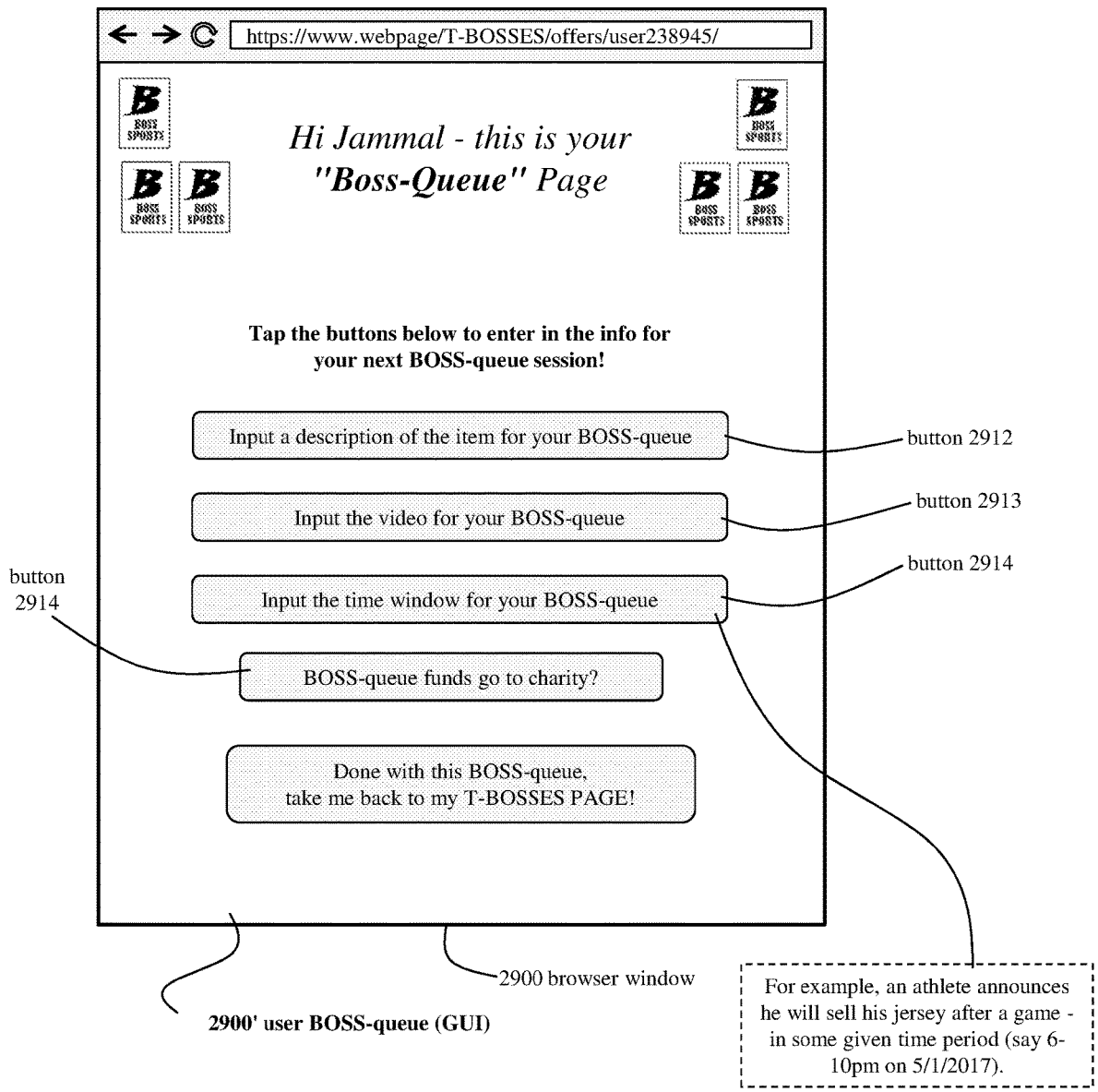
FIG. 29 is a graphical user interface (GUI) showing a user BOSS-queue GUI 2900' disposed in browser window 2900, in accordance with one embodiment of the invention.

Also related to the processing of FIG. 26 (as reflected in box 2600' of FIG. 26), FIG. 29 is a graphical user interface (GUI) showing a user BOSS-queue GUI 2900' disposed in browser window 2900, in accordance with one embodiment of the invention. As shown, the GUI 2900' may include nomenclature reflecting the BOSS-queue page. Further details of the GUI 2900' are described below in the context of the processing of FIG. 26 and FIG. 27.

As shown in FIG. 26, the BOSS-queue processing of the invention starts in step 2600 and passes to step 2601.

In step 2601, the system interfaces with the user-7 to initiate the BOSS-Queue processing. In accordance with one embodiment of the invention, upon initiation of the BOSS-Queue processing, a queue data record 2800 is created. FIG. 28 shows such a queue data record 2800.

As shown in FIG. 26, after the processing of step 2601, the processing passes to step 2612. In step 2612, the system interfaces with the user-7 to input an item description, and (with such input data) the system populates the queue data record 2800 with the item description (data 2802 as shown in FIG. 28). Input of the item description may be performed by user-7 via interface (by the user) with the GUI 2900'. As noted above, in accordance with one embodiment of the invention, the GUI 2900' may be generated by the system and displayed to user-7 so as to facilitate input of BOSS-Queue related data. As shown in FIG. 29, the GUI 2900' may include nomenclature reflective of the nature of the page, as well as nomenclature describing use of the page. For example, as shown, the GUI 2900' may describe "Tap the buttons below to enter in the info for your next BOSS-Queue session!". With regard to input of an item description for the BOSS-Queue processing, the GUI 2900' may include button 2912 appropriately labeled. For example, upon the user-7 tapping the button 2912, the T-BOSSES platform may generate an appropriate dialog box into which the user-7 enters the item description.

After the processing of step 2612, the processing passes to step 2613. In step 2613, the system interfaces with the user-7 to input a queue video, and (with such input data) the system populates the queue data record 2800 with the input queue video data (data 2803 as shown in FIG. 28). Input of the queue video may be performed by user-7 via interface (by the user) with the GUI 2900' of FIG. 29, in accordance with one embodiment of the invention. In particular, the GUI 2900' may include button 2912 appropriately labeled. For example, upon the user-7 tapping the button 2913, the T-BOSSES platform may interface with the user-7 so as to input the queue video.

To explain further, in accordance with embodiments of the invention, the queue video (input in step 2613 of FIG. 26) is of course different than the "user created video" (i.e. the video media data) described throughout the present disclosure. The purpose of the "queue video" is for the user-7 to record a video clip (for example 30 seconds of video recording) so as to promote the upcoming user created video. Accordingly, it is the user created video that will be created and released by the user-7 in the time window (e.g. 6-10 pm 05.01.2017) that is setup by the user interfacing with the T-BOSSES system.

To explain yet further, as reflected in box 2602' of FIG. 26—the "queue video" includes content to advise other users that user-7 (e.g. a celebrity) will be posting a video in a particular time window, i.e. our example user-7 announces he will be posting a video. Alternatively, In accordance with some embodiments of the invention, instead of a queue video, the user may utilize some other communication channel for the alert. For example, the T-BOSSES system might interface with the user to generate a "posting" on system, or some other text based communication.

After the processing of step 2613, the processing passes to step 2614. In step 2614, the system interfaces with the user-7 to input time window data for the particular BOSS-queue session (e.g. 6-10 pm 05.01.2017), and (with such input data) the system populates the "queue time window" data record 2800 with the input data (data 2804 as shown in FIG. 28). Input of the queue time window data may be performed by user-7 via interface (by the user) with the GUI 2900' of FIG. 29, in accordance with one embodiment of the invention. In particular, the GUI 2900' may include button 2914 appropriately labeled. For example, upon the user-7 tapping the button 2913, the T-BOSSES platform may interface with the user-7 so as to input the queue time window data.

Accordingly, as reflected in box 2610' of FIG. 26, through the series of processing steps 2612, 2613 and 2614, data for the BOSS-queue processing of the invention is input. In particular, data as input via the GUI of FIG. 29, for example, is utilized to populate data record 2800 (of FIG. 28).

As shown in FIG. 26, after the processing of step 2614, the process of the invention passes to step 2620. In step 2620, the T-BOSSES system outputs what is characterized as a "BOSS-queue alert" communication to the relevant T-BOSSES community (or portion of community associated with the particular user-7) to alert users of the upcoming BOSS-queue session. Such communication may include information such as the user-7 name, user-7 status data, item description, and time window, for example.

As shown in FIG. 26, after step 2620, the process passes to step 2630 of FIG. 26. In step 2630, the T-BOSSES platform waits for the time window—for the BOSS-queue session—to arrive. Accordingly, as reflected in box 2630' of FIG. 26, an example is that an athlete announces he will sell his jersey after a game—in some given time period (say 6-10 pm). Users interested in purchasing the item are (in accord with the methodology of the invention) required to "check back" with the site until the video is posted, which drives (i.e. promotes) traffic till the item is sold. In accordance with one embodiment of the invention, users can't just stay on the user-7 page, but can click around to advertising, for example. Targeted advertising may be included on the particular user's site during the time period leading up to the athlete's video post (of the item) and sale.

Once the predetermined time window arrives for the BOSS-queue "session", as reflected in step 2640 of FIG. 26, processing for the BOSS-queue session proceeds. Specifically, the processing passes to step 2650 of FIG. 26. In step 2650, the system performs processing for the BOSS-queue session. Further details of this processing are described below with reference to FIG. 27.

That is, FIG. 27 is a flowchart showing in further detail the "system performs processing for BOSS-queue session" (step 2650) of FIG. 26, in accordance with one embodiment of the invention. As shown at box 2650', the processing of FIG. 27 is initiated upon arrival of the designated time window for the BOSS-queue session.

As shown, the processing starts in step 2650 and passes to step 2651. In step 2651, the system outputs a communication to user-7 that the BOSS-queue session time window has begun. Accordingly, to explain an aspect of the invention, the processing performed in FIG. 26 (including processing 2610' in which data is input from user-7 for the BOSS-queue session) effectively allows the platform to perform various related processing. Such related processing may include various communications out to relevant users in the user-7 community, as well as modification of the user-7 T-BOSSES page, for example.

With further reference to FIG. 27, after the system outputs a communication to the user-7 that the BOSS-queue session time window has begun, the processing passes to step 2652. In step 2652, the system waits for interface from the user-7 indicating that user-7 is ready to record the user created video for the BOSS-queue session. As reflected at box 2652' of FIG. 27, such interface may be a suitable selection by the user or may be based on some observed attribute of the user. For example, an observed attribute might be the observed geographical (Geo) location of user-7.

Once the system observes input from the user—that the user is ready to record the user created video for the BOSS-queue session—the process passes "by" step 2652, and passes to step 2660. In step 2660, the system performs processing for the BOSS-queue session. Such processing may include both steps 2661 and 2662, in accordance with embodiments of the invention. As described above and reflected in box 2661', the BOSS-queue processing performed by the system may include various functionality so as to leverage the BOSS-queue event.

Illustratively, as shown in FIG. 27, in step 2661 the T-BOSSES system receives input (from user-7) that user-7 is initiating the video for the BOSS-queue session, i.e. user-7 is about to create the video for the BOSS-queue session. The T-BOSSES platform then presents the user with a prompt to record the video, i.e. so as to assist the user-7.

Further, in step 2662, the system performs processing to reflect that user-7 is in the BOSS-queue session including, for example, modification of the user-7 T-BOSSES page for the time duration of the BOSS-queue session might be performed. As reflected at box 2660' and described above, an example of the BOSS-queue processing is that an athlete announces he will sell his jersey after a game—in some given time period (say 6-10 pm)—and users interested in purchasing the item are required to "check back" with the site until the video is posted, which drives (promotes) traffic till the item is sold by the user-7.

As shown in FIG. 27, once the BOSS-queue session processing is performed in step 2660, the processing passes to step 2670. In step 2670, the BOSS-queue processing, performed by the system, is terminated. In further explanation of the described BOSS-queue processing, box 2662' explains that BOSS-queue processing differs from routine T-BOSSES processing in that the video for the particular item is "queued up"—to be recorded by the user at some feature time. In contrast, with a typical user created video of the invention, such a video is created and subsequently posted without the various advanced processing as described above with reference to FIG. 26.

In accordance with one aspect of the invention, the BOSS-queue processing described herein may be performed so as to generate donations for a charity. The GUI 2900' of FIG. 29 may be provided with a suitable button 2914 to allow for the user-7 to input (or select) a particular charity to receive the proceeds from the particular BOSS-queue session. Such input, in the form of data 2805, may be stored in the data record 2800, as shown in FIG. 28. The association of a particular charity to a BOSS-queue session is not limited to merely receiving funds from the BOSS-queue session. Rather, the BOSS-queue session may be beneficially promoted as being associated with the particular charity. For example, as shown above in FIG. 26, in step 2620 the system outputs an alert communication to the T-BOSSES community. The alert communication alerts the relevant T-BOSSES community of the upcoming BOSS-queue session. This communication may include reference to the particular charity that will receive proceeds from the BOSS-queue session.

Figure 30:
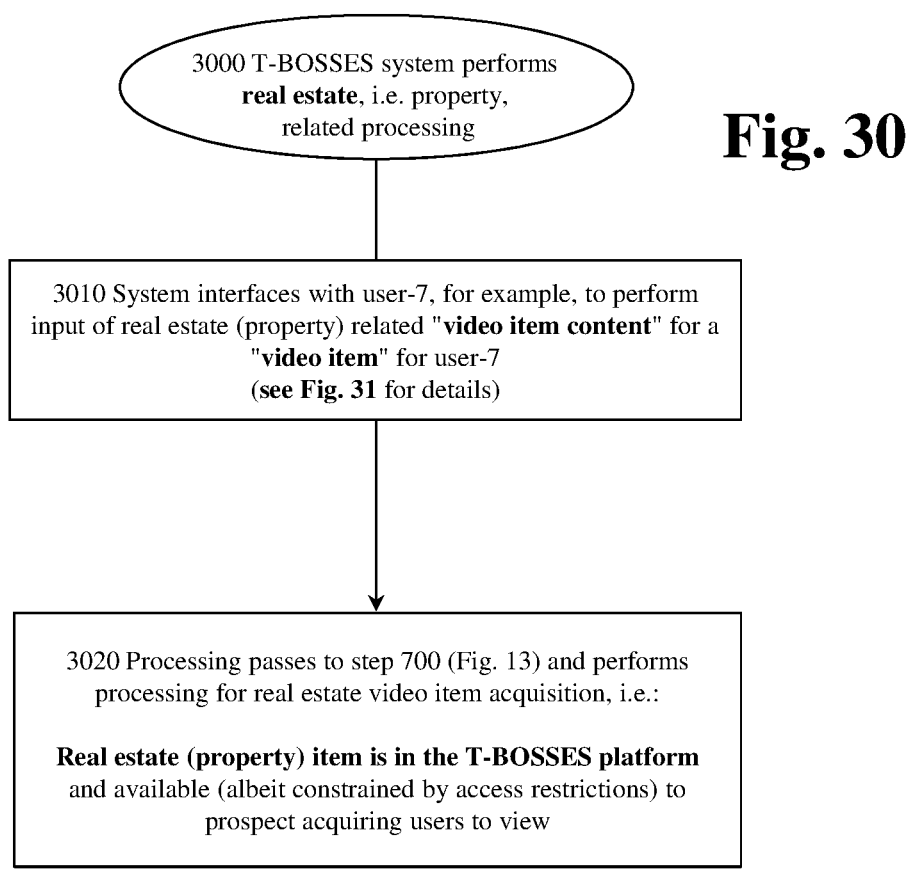
FIG. 30 is a flowchart directed to the T-BOSSES system performing real estate (property) related processing, in accordance with one embodiment of the invention.

Hereinafter, aspects of the T-BOSSES system relating to real estate, i.e. property, will be described. The processing of the T-BOSSES system relating to the offer and acquisition of real estate is similar in nature to the various other processing described above, such as relating to the sale of personal items—such as a pair of sneakers or a stroller, for example. However, in accordance with embodiments of the invention, the T-BOSSES system provides functionality specifically directed to the processing of real estate. Accordingly, FIG. 30 is a flowchart directed to the T-BOSSES system performing real estate (property) related processing, in accordance with one embodiment of the invention. The processing of FIG. 30 may be launched in response to interface from an offering user—that the offering user wishes to sell an item of real estate, for example.

As shown in FIG. 30, the process starts in step 3000, and passes to step 3010. In step 3010, the system interfaces with our example user-7, for example, to perform the input of a real estate related video. More specifically, the T-BOSSES system interfaces with the user to perform input of a video item content (i.e. a user created video). Further details of the processing of step 3010 are described below with reference to FIG. 31. After step 3010, the process passes to step 3020.

In step 3020, the processing passes back to the processing described earlier above. In particular, processing passes to step 700 (FIG. 13) and performs processing for real estate video item acquisition. In other words, the real estate item is in the T-BOSSES platform, associated with the particular user who is offering the real estate item, and available to prospect acquiring users to view. It is of course appreciated that such viewing may be constrained—such as constrained to the offering user's group or community. Relatedly, it is appreciated that real estate or property items may be processed by the T-BOSSES system in a segregated manner. That is, there may be a separate offer page for any particular user—upon which that user's real estate items are listed. Such functionality of the T-BOSSES system is reflected by button 2031 as shown in the GUI of FIG. 20.

As described above, FIG. 31 is a flowchart showing in further detail the system interfaces with the user-7 to perform the input of real estate (property) related video (step 3010) of FIG. 30, in accordance with one embodiment of the invention. As shown, the process starts in step 3010 and passes to step 3011. In step 3011, the system interfaces with the user-7 to input a text description of the property. This is simply a description that will accompany the user created video for the property. As reflected by box 3011', the processing of step 3011 constitutes the input of video attribute data as characterized in related FIG. 24.

Figure 31:
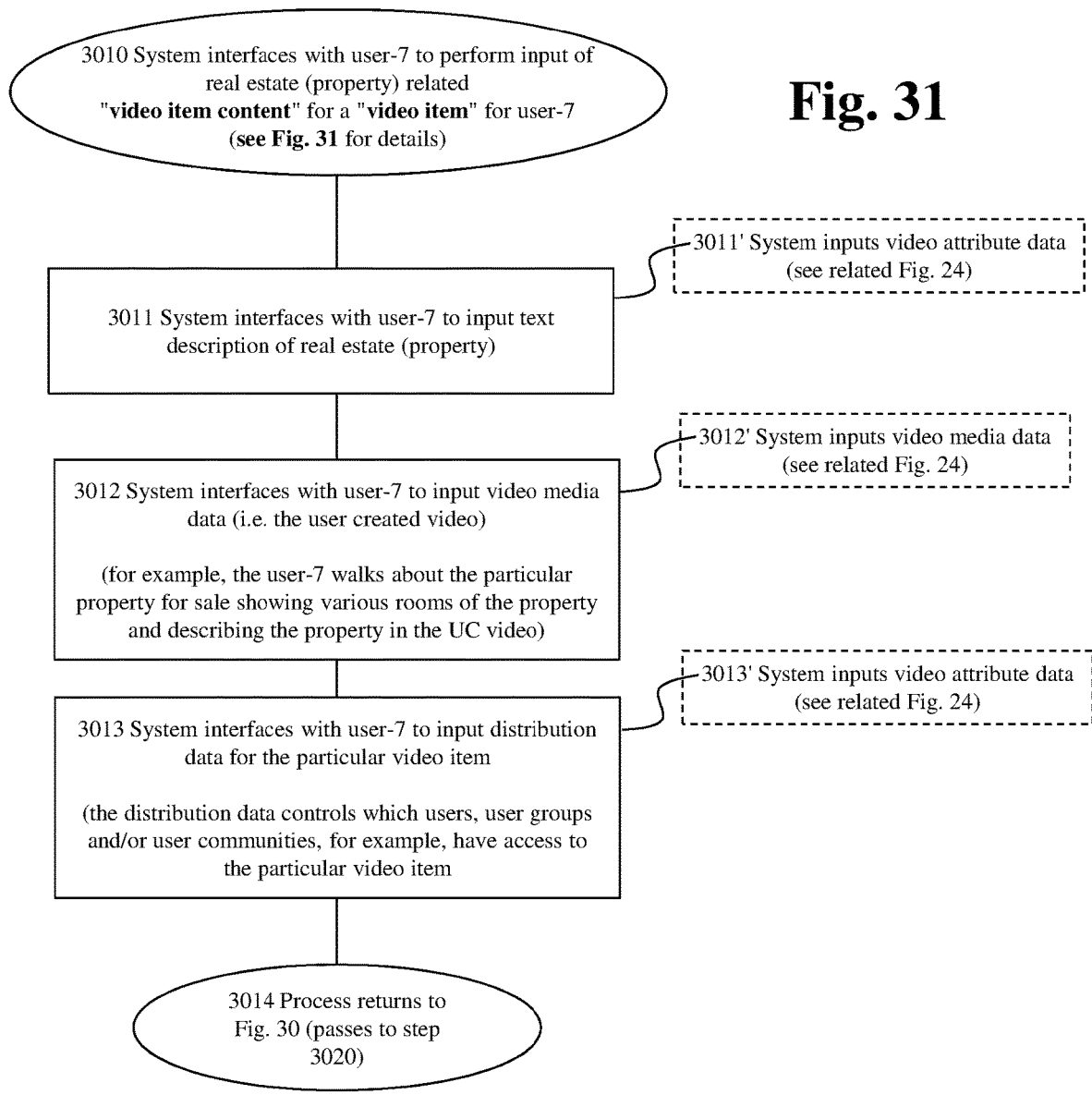
FIG. 31 is a flowchart showing in further detail the system interfaces with the user-7 to perform the input of real estate (property) related video (step 3010) of FIG. 30, in accordance with one embodiment of the invention.

After the processing of step 3011 in FIG. 31, the process passes to step 3012. In step 3012, the system interfaces with the user-7 to input video media data. For example, such processing of step 3012 might include, illustratively, the user-7 walking about the particular property for sale, showing various rooms of the property, showing various landscape of the property, and describing the property in the user created video. As reflected by box 3012', the processing of step 3013 thus constitutes the input of video media data as characterized in related FIG. 24.

A distinction between the input of the video in step 3012 for real estate vis-à-vis the input of a video (as described above) for a personal item might be the length of the video. In that more time may be required by a user to record a video directed to real estate, the T-BOSSES system may be so programmed to provide more time. A user created video for a personal item might be limited to 45 seconds, for example, whereas a user created video for real estate might be limited to 3 minutes, for example. It is of course appreciated that such particular time constraints may be varied as desired, i.e., as such constraints are coded into the T-BOSSES system.

After the processing of step 3012, the process passes to step 3013. In step 3013, the system interfaces with the user-7 so as to input distribution data for the particular video item. As reflected in step 3013, the distribution data controls which users, user groups and/or communities, for example, have access to the particular video item. In general, in accord with some embodiments of the invention, distribution of a real estate video may be constrained by requiring some association with the offering user. As reflected by box 3013', the processing of step 3013 constitutes the input of video attribute data as characterized in related FIG. 24.

After step 3013 FIG. 31, the process passes to step 3014. In step 3014, the processing is performed by the T-BOSSES system returns to FIG. 30—and specifically passes to step 3020 of FIG. 30. Processing then continues on as described above with reference to FIG. 30.

FIG. 32 (3200') illustrates various processing aspects of the T-BOSSES system, in accordance with one embodiment of the invention. As described, the T-BOSSES platform provides a personal "videotized" retail platform. The T-BOSSES platform allows users to create and post videos for personal retail (to sell or trade personal items), along with various associated functionality and processing. Features of the T-BOSSES platform include that (a) traffic to a particular user's page increases the user's T-BOSSES "social status", (b) the T-BOSSES platform brings a "social status" environment to personal "videotized" retail, and (c) the T-BOSSES platform allows an individual seller to reach buyers directly.

The T-BOSSES platform provides a virtual "mall" like "structure" for personal retail, effectively leveraging the power of video. T-BOSSES provides an authentic environment for users to create a personal retail experience of their own. T-BOSSES is great for both celebrities and non-celebrities.

Further example features of the T-BOSSES platform include:
(1) The T-BOSSES Platform provides for users to sell, buy, and trade items through video.
(2) The T-BOSSES Platform observes the activity of a user and gives a user opportunity to attain a social status based on how many people (other users) shop his/her page. In other words, the platform affords "social status" based on activity associated with the particular user.
   (a) As a user's "social status" on the system is raised, that user is provided additional features:
   (b) For example, a user may be granted "Big BOSS Status" based on activity associated with that user.
   (c) For example, at a certain "level" the user's backdrop is unlocked to allow for icons (as illustrated in FIGS. 20 and 21.
(3) The T-BOSSES Platform allows geographic focus—a user can select a particular geographical area to sell his item, or in which to purchase an item. For example, Kirk Cousins only wants to sell game jersey in DC area.
(4) The T-BOSSES Platform includes various "exclusives." For example, "exclusive videos" are not automatically sent to users (buyers), but rather select buyers have to "search their favorite sellers." This feature promotes traffic.
(5) Platform provides "find you" feature in which a user designates a "find you" item. A user is provided with the ability to select a discrete number of items at a time, for example 5 items at a time) using descriptors, which that user wishes to purchase.

(6) The "Eye Stop" feature addresses safety associated with use of the system, e.g. an "Eye Stop" (at which an offering user meets with an acquiring user to physically transfer an item) may be in a mall parking lot and/or might be associated with a major store, such as Walmart.

(7) The T-BOSSES Platform may adjust "tutorial assistance" to user, depending on the user's experience with the system.

Hereinafter, further details of the invention relating to the eye-stop feature of the T-BOSSES system will be described. As set forth above, the eye-stop processing relates to the T-BOSSES platform being programmed to provide predetermined geographical locations at which two parties in a transaction may meet. For example, the T-Bosses platform may interface with users and/or platform administrators to input predetermined locations in a particular geographical area. Such predetermined geographical locations might be a particular gas station or restaurant in various towns around a particular area of the country, for example. The eye-stop processing may include the system retrieving data of available eye-stop locations as well as data regarding the geographical location of each user in a transaction. As described in further detail below, the eye-stop processing might then determine the proximity of each user in the transaction vis-à-vis each available eye-stop location.

FIG. 33 is a flowchart showing T-BOSSES processing to perform an "eye-stop" meet-up between an "offering user" and an "acquiring user", in accordance with one embodiment of the invention. The processing of FIG. 33 might be launched from the processing of step 800 (FIG. 12) as described above, in accordance with one embodiment of the invention.

As shown, the processing of FIG. 33 starts in step 3300 and passes to step 3301. In step 3301, the T-BOSSES platform interfaces with the acquiring user (who is purchasing an item for example) to input a request (from the acquiring user) to physically transfer an acquired item using the eye-stop feature of the T-BOSSES platform. Such interface may be performed through GUI interface between the T-BOSSES platform and the acquiring user. As reflected in box 3301', the processing of step 3301 may include the server outputting data (that is available to the acquiring user) of the offering user's eye stop attributes. In particular, such eye-stop data that is output by the T-BOSSES platform (to the acquiring user) may include an indication of whether the offering user indeed does eye-stops, as well as the specific locations of the particular offering user's eye-stops. Other data may be provided to the acquiring user, such as time window constraints that may be controlled by the offering user and/or day constraints. For example, an offering user may only be able to meet with an acquiring user (to transfer an item) in the evening or on a particular day of the week. However, in some embodiments of the invention, the acquiring user first indicates that he or she wishes to use the eye-stop feature before the T-BOSSES platform reveals (to the acquiring user) the particular preferences of the offering user. The additional processing shown in FIG. 33, such as step 3302, reflects such embodiment in which the acquiring user is not initially given the offering user's eye-stop preferences.

As reflected at box 3301" of FIG. 33, the illustrative processing of step 3301 reflects a situation in which the acquiring user indeed wants to use the eye-stop feature of the T-BOSSES platform to acquire the item (that the acquiring user purchased from the offering user).

As shown, the processing passes from step 3301 to step 3302. In step 3302, the server retrieves data regarding the offering user's eye-stop preferences. Then, in step 3303, the T-BOSSES platform determines whether the offering user does indeed do eye-stops. If no, i.e. the retrieved data reflects that the offering user does "not" do eye-stops—then the process passes to step 3304. In step 3304, the T-BOSSES platform outputs a communication to the acquiring user regarding such determination. That is, the T-BOSSES platform outputs a communication (to the acquiring user) indicating that the offering user does not do eye-stops.

On the other hand, the T-BOSSES platform may determine, from the retrieved data, that the offering user does indeed do eye-stops. Accordingly, the processing passes from step 3303 on to step 3310. In step 3310, what is characterized herein as "eye-stop coordination processing" is performed between the acquiring user and the offering user, in accordance with one embodiment of the invention. Further details are described below with reference to FIG. 34.

Figure 34:
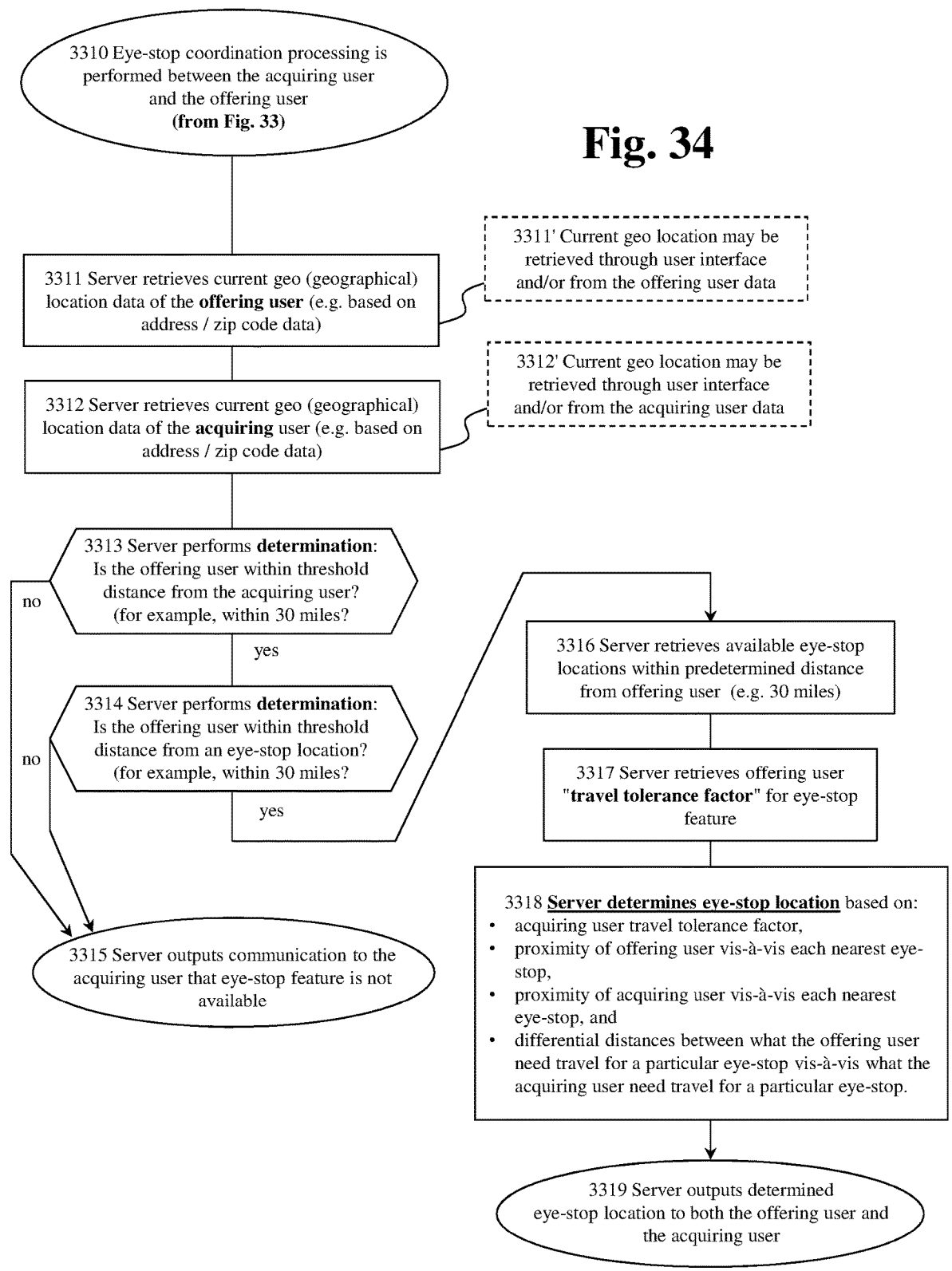
FIG. 34 is a flowchart showing in further detail "eye-stop coordination processing" performed between the acquiring user and the offering user (step 3310) of FIG. 33, in accordance with one embodiment of the invention.

FIG. 34 is a flowchart showing in further detail "eye-stop coordination processing" performed between the acquiring user and the offering user (step 3310) of FIG. 33, in accordance with one embodiment of the invention.

As shown, the process of FIG. 34 starts in step 3310 and passes to step 3311. In step 3311, the server retrieves current geo location data of the offering user. For example, such location data may be based on the address of the offering user or simply ZIP code data of the offering user, for example. As shown at box 3311', current geo location may be retrieved through user interface and/or from the offering user data.

After step 3311, the process passes to step 3312. In step 3312, the server retrieves current geo location data of the acquiring user. For example, such location data may be based on the address of the acquiring user or simply the ZIP code data of the acquiring user, for example. As shown at box 3312', current geo location may be retrieved through user interface and/or from the offering user data.

The processing performed by the T-BOSSES platform than passes to step 3313, as shown in FIG. 34. In step 3313, the server performs a determination of whether the offering user is within a threshold distance from the acquiring user. Illustratively, the threshold distance might be 30 miles. If "no" in step 3313, then the processing performed by the T-BOSSES platform passes to step 3315. In step 3315, the server outputs the communication to the acquiring user that the eye-stop feature is not available. In accordance with some embodiments, such determination that the eye-stop feature is not available might result in the T-BOSSES platform presenting other delivery options to the acquiring user and/or providing the acquiring user the option to not purchase the particular item. Relatedly, the interrelationship between eye-stop coordination processing and completion of purchase of an item (by an acquiring user from an offering user) may be varied, in accordance with embodiments of the invention. For example, eye-stop coordination processing might be performed prior to completion of purchase (of an item) by an acquiring user.

On the other hand, it might be determined in step 3313 (FIG. 34) that the offering user is indeed geographically located within the threshold distance from the acquiring user. Accordingly, the determination is "yes" in step 3313. The process than passes to step 3314. In step 3314, the T-BOSSES platform performs a determination of whether the offering user is within a threshold distance from an eye-stop location. For example, the threshold distance might be 30 miles. Additionally, the processing of step 3314 might be constrained by eye-stop locations that have been selected by the offering user, i.e. those eye-stop locations that are acceptable to the offering user.

If the T-BOSSES platform determines "no" in step 3314, i.e. the offering user is not within the threshold distance from an eye-stop location, then the processing again passes to step 3315. The processing of step 3315 is then performed by the T-BOSSES platform, as described above.

On the other hand, it may be determined "yes" in step 3314, i.e. the offering user is indeed within the threshold distance from an eye-stop location. As a result, the processing passes from step 3314 to step 3316.

In step 3316, in accordance with one embodiment of the invention, the T-BOSSES platform retrieves all available eye-stop locations within a predetermined distance from the offering user, for example 30 miles. Then, the process passes to step 3317. In step 3317, in accordance with this illustrative example processing, the server retrieves what is herein characterized as "a travel tolerance factor" for the offering user, as relating to eye-stop processing. The travel tolerance factor may be selectable by the offering user (through interface between the offering user and the T-BOSSES platform) so as to limit the amount of travel for the offering user. Accordingly, if the "offering user" is in great need of sale of the particular item –then the offering user might set his or her travel tolerance factor at a high setting—meaning that she is willing to travel a substantial distance. On the other hand, if the offering user is not in substantial need of the sale, then the offering user might set her travel tolerance factor at a low setting, meaning that she is not willing to travel a substantial distance. Also, in accordance with embodiments of the invention, it is appreciated that the travel tolerance factor, as well as various other user attributes associated with eye-stop processing may be taken into account in determination of T-BOSSES social standing (for a user).

After step 3317, the process passes to step 3318. In step 3318, the T-BOSSES platform performs processing to determine the optimal eye-stop location based on attributes associated with the offering user including the travel tolerance factor, attributes associated with the acquiring user, and how much those attributes are weighted in the determination. More specifically, as shown in step 3318, the server determines a particular eye-stop location based on acquiring user travel tolerance factor, proximity of offering user vis-à-vis each nearest eye-stop, proximity of acquiring user vis-à-vis each nearest eye-stop, and differential distances between what the offering user need travel for a particular eye-stop vis-à-vis what the acquiring user need travel for a particular eye-stop, for example.

Figure 35:
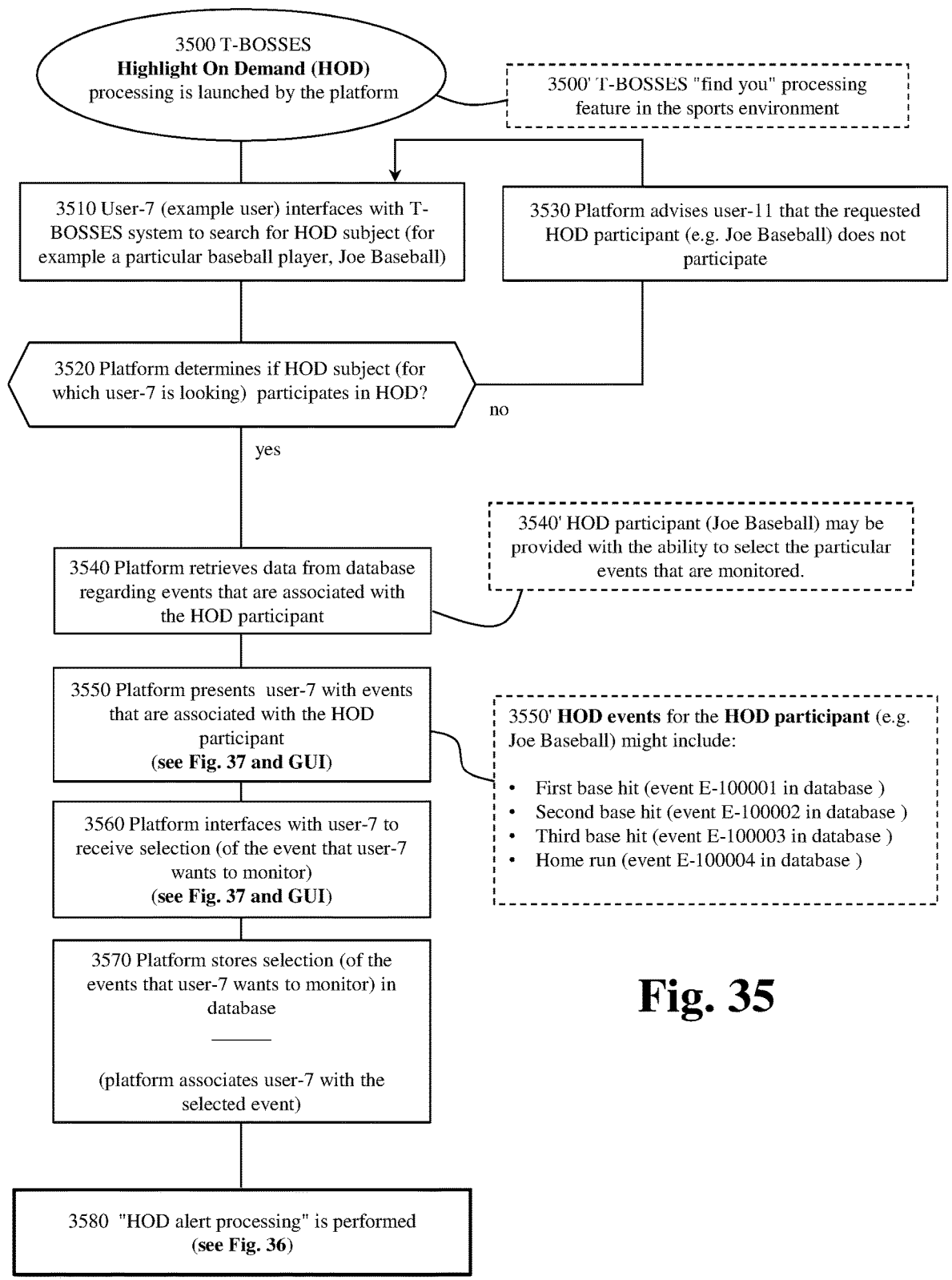
FIG. 35 is a flowchart showing a "highlight on demand (HOD)" feature, in accordance with one embodiment of the invention.

In accordance with a further feature of the invention, FIG. 35 is a flowchart showing a "highlight on demand (HOD)" feature, in accordance with one embodiment of the invention. As reflected at box 3500', the HOD processing of the invention might be characterized as the above-described "find you" processing, but in the sports environment. HOD processing allows a user to select what is herein characterized as an "HOD participant". An HOD participant might be a professional athlete, such as a baseball player, for example.

Through selection of the particular HOD participant and the HOD processing as described below, the user can secure digital video footage of that HOD participant for a predetermined event.

As shown, the processing of FIG. 35 starts in step 3500 and passes to step 3510. In step 3510, our illustrative user-7 interfaces with the T-BOSSES system to search for the HOD participant of interest to the user. As shown in the example, the HOD participant might be a baseball player, Joe baseball. After the processing of 3510, the process passes to step 3520. In step 3520, the T-BOSSES platform determines if the HOD subject participates in the HOD processing offered by the T-BOSSES platform. If such determination is no, then the processing passes to step 3530. In step 3530, the platform advises user 11 that the requested HOD participant does not participate. As a result, the processing passes back to step 3510—such that the user can perform searching for another athlete, for example.

On the other hand, the platform may determine in step 3510 that the requested HOD subject is indeed an HOD participant. As a result, the processing passes to step 3540. In step 3540, the platform retrieves data from the database of the T-BOSSES system. The retrieves data contains information regarding specific events that are associated with the HOD participant. Relatedly, in step 3550, the platform presents user-7 with such events that are associated with the HOD participant. As reflected at box 3550', HOD events for a particular HOD participant might include such events as first base hit, second base hit, third base hit, and home run. Each of these events, and the attributes associated with each of these events, are stored on a suitable data record in a suitable database, such as the database portion 150 of FIG. 2.

It is of course appreciated that the HOD processing of the invention is not limited to the particular events reflected in FIG. 35. Nor, is the HOD processing of the invention limited to professional athletes or other celebrities. Rather, the HOD processing of the invention may relate to any of a wide variety of individuals and events.

Figure 37:
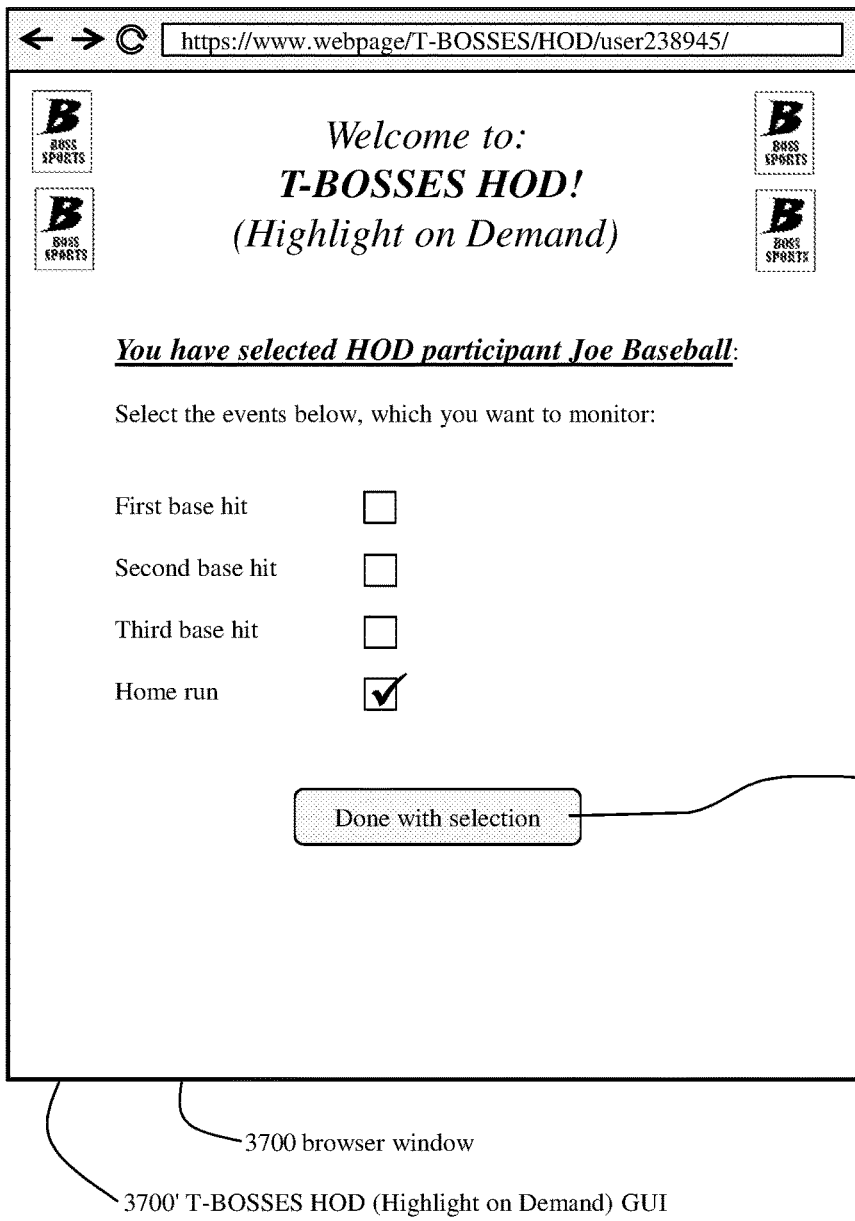
FIG. 37 is a GUI showing features of HOD processing, in accordance with embodiments of the invention.

As reflected in step 3550, FIG. 37 is a GUI showing features of HOD processing, in accordance with embodiments of the invention. In particular, FIG. 37 shows a browser window 3700 that displays an illustrative HOD GUI 3700', in accordance with one embodiment. The platform may present the user-7 with the events associated with the particular HOD participant utilizing the GUI 3700'—as generated by the T-BOSSES platform and displayed via a browser on the user device of user-7.

After the processing of step 3550, in which the platform presents the available events, the processing passes to step 3560. In step 3560, the platform interfaces with user-7 to receive a selection of the event that the user wants to monitor. This functionality may be performed utilizing the GUI 3700' and displaying checkable boxes adjacent to each available event, which the user-7 may choose from. Then, the process passes to step 3570. In step 3570, the platform saves the selection of the events, which the user-7 wants to monitor, in a suitable database. In other words, a digital association is created by the platform so as to associate the particular user with the particular event. After the processing of step 3570, the process passes to step 3580.

In step 3580, what is herein characterized as "HOD alert processing" is performed. Further details are described below with reference to FIG. 36.

With regard to a further aspect of HOD processing, box 3540' of FIG. 35 reflects that an HOD participant may be provided with the ability to select the particular events that are monitored. That is, in accord with some embodiments of the invention, the actual participant, whose events are being monitored, may be afforded functionality so as to dictate whether an event is available to HOD processing or whether an event is not available to HOD processing. Such functionality may be provided to the HOD participant through interface with the T-BOSSES platform via web browser, for example.

Figure 36:
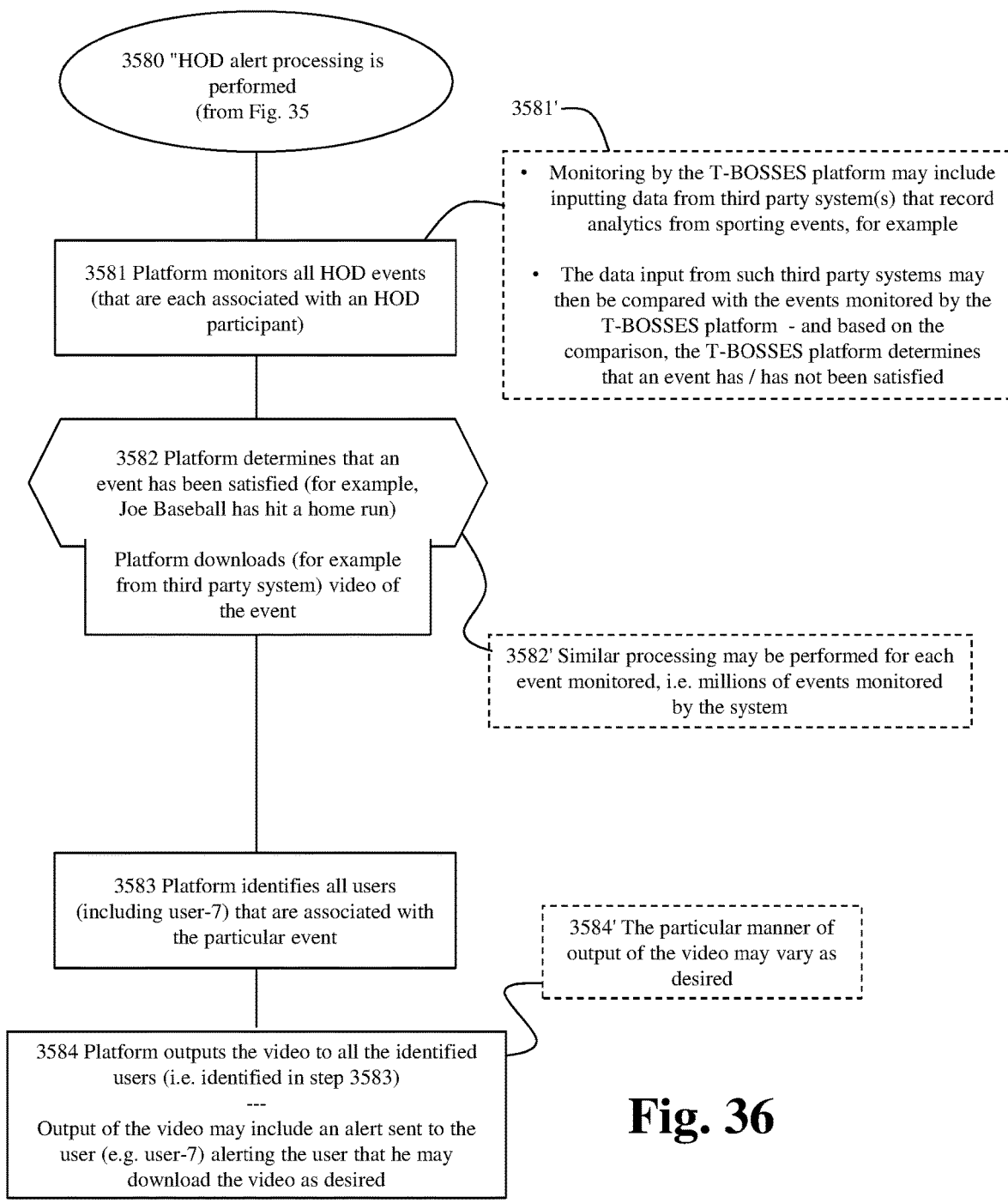
FIG. 36 is a flowchart showing details of "HOD alert processing" in accordance with one embodiment of the invention.

As referenced above, FIG. 36 is a flowchart showing details of "HOD alert processing" in accordance with one embodiment of the invention. As shown, the processing starts in step 3580 and passes to step 3581. In step 3581, the platform monitors all HOD events that are associated with a respective HOD participant. As reflected at box 3581', monitoring by the T-BOSSES platform may include inputting data from third-party systems that record analytics from sporting events, for example. The data input from such third-party systems may then be compared with the events monitored by the T-BOSSES platform. Based on a comparison, the T-BOSSES platform determines that an event has or has not been satisfied. More specifically, a suitable data record field may be toggled from a first value to a second value dependent on whether data indicative of the event (occurring) has indeed been input, in accordance with one embodiment of the invention. In general, it is appreciated that HOD processing may utilize the reality that many events, and in particular many sports events, are captured digitally in one manner or another. The HOD processing of the invention leverages this reality. Relatedly, the duration of many sports events are videotaped. In accordance with one embodiment of the invention, the HOD processing may include retrieving a snippet of video footage disposed (in time) about the specific time that an event was identified as happening. For example, if a home run was identified by input data as occurring at 4:35 PM in the afternoon, a snippet of video footage might be generated from 4:30 PM to 4:40 PM. In accordance with one aspect of the invention, it is this snippet, for example, that is output in the processing of step 3584 described below.

Returning now to the flow of FIG. 36, as noted above, in step 3581 the T-BOSSES platform monitors all HOD events. Then, the processing passes to step 3582. In step 3582, the platform determines that an event has indeed been satisfied. For example, Joe baseball has indeed hit a home run. This indicative data may be input from a third party system that monitors the particular event. Accordingly, as also illustrated in step 3582, the T-BOSSES platform downloads the video from the event. Illustratively, such video might be in the form of the snippet described above. Further, the video of step 3582 might be downloaded from a third party system whose business is to generate video footage of discrete events. As reflected in box 3582', similar processing to that of step 3582 may be performed for each event monitored, which may likely be in the millions.

After the processing of step 3582, processing passes to step 3583.

In step 3583, the platform identifies all users, including user-7, that are associated with the particular event that was identified as having occurred in step 3582. Then, the processing passes to step 3584. In step 3584, the platform outputs the video to all the identified users, which were identified in step 3583. As reflected in box 3584', is appreciated that the particular manner of output of the video may be varied as desired. For example, it might be the output of the video may include an alert sense to the user—that alerts the user that he or she may download the video is desired. However, it is appreciated that other methodologies for delivery of the video may be utilized.

Figure 38:
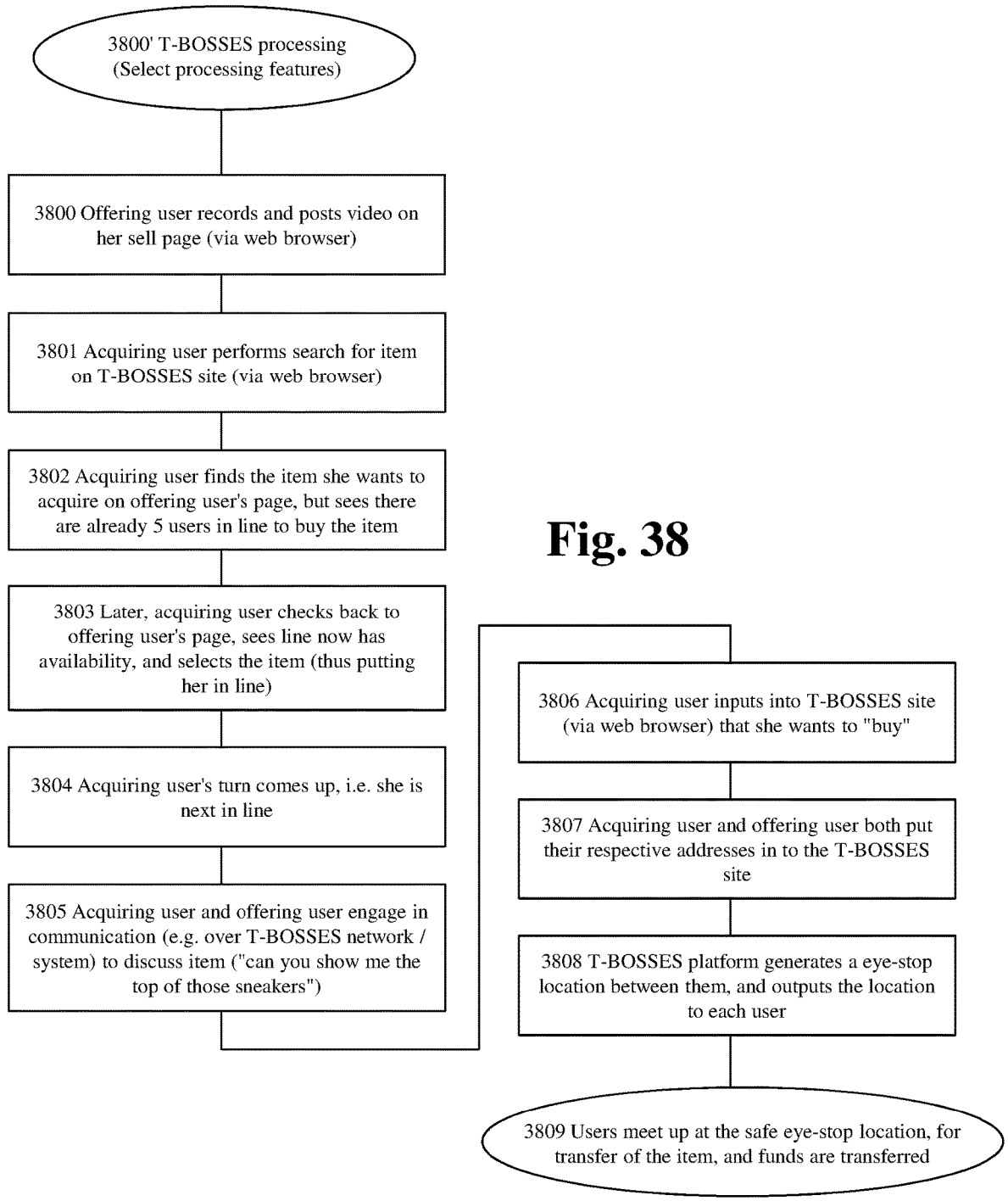
FIG. 38 is a flowchart showing select processing features of the T-BOSSES platform, in accordance with one embodiment of the invention.

In summary of various features of the invention, FIG. 38 is provided. That is, FIG. 38 is a flowchart showing select processing features of the T-BOSSES platform, in accordance with one embodiment of the invention. As illustrated in FIG. 38, the process starts in step 3800 and passes to step 3801. In step 3801, an acquiring user performs a search for a desired item on the T-BOSSES site. Such processing is performed via the acquiring user interfacing with the T-BOSSES platform.

In step 3800, the offering user records and posts a video on her sell page. In accordance with one embodiment of the invention, this process may be performed via the user interfacing with his or her T-BOSSES "app" on a user device, such as a cell phone. Specifically, the process to record a video may include the user pulling up the T-BOSSES application on her cell phone; the user logging into her T-BOSSES account; the user going to her "sell" page; the user clicking on a "video icon" that is displayed on the "sell" page; and then recording the video directed to a particular item to sell, for example. In conjunction with such process, the user might be provided with various options—such as the option of whether the user wants to have a delay in starting her video or does not want any delay. After recording of the video, the user may be prompted with options including to view, delete, post, or retake. The T-BOSSES platform responds to the selected option. In particular, with the option that the user wishes to "post" her video—the T-BOSSES platform then processes the video so as to generate an entry on the offering user's "sell" page in accordance with embodiments of the invention. As otherwise described herein, the length of videos posted on the T-BOSSES platform may be limited in length. For example, the length of the videos may be limited to 45 seconds or less. Given the nature of a particular product, the limit for time of a video might be different. For example, as described above, the length of a video for real estate might be longer. In accordance with one embodiment of the invention, once an individual (user) posts a video, that user populates a provided dialog box or boxes to describe the item. For example, in conjunction with posting a video, the user might interface with the system to both provide a short name for the item (stroller, for example) and, secondly, provide a description of the item. As discussed above, such description of the "video media data" may be characterized as "video attribute data". That is, the video media data is the actual user created video, as opposed to associated information (entered in by the user) to label and/or describe the item being promoted in the user created video. Illustratively, the short name for the item and the description of the item may be utilized by the T-BOSSES system to link that video to acquiring users (buyers) looking for items with those same keywords as they are items.

Accordingly, the search functionality provided by the T-BOSSES platform may utilize text data (such as a title of an offered item or a description of an offer item) vis-à-vis a search description entered by an acquiring user, i.e. so as to determine a match or degree of matching.

As described herein, such search functionality may be constrained as desired—such as to a particular geographical area and/or within a particular group, for example. A user might be provided functionality to not search locally, or to search locally. Further, the search methodology provided by the T-BOSSES system may rank search matches based on geographical proximity to the acquiring user. As a result, the closest item in geographical proximity may be presented at the top of the listing search results.

In step 3802, an acquiring user finds the item she wants to acquire on an offering user's page. However, the acquiring user sees (through interface with the T-BOSSES platform) that there are already 5 users in line to buy the particular item. In some embodiments, users that are already in line will be visible to other users wanting to be in line. However, in other embodiments there is not such visibility.

Rather, and acquiring user may simply be alerted that the line for a particular item is at its maximum number, e.g. 5 users in line. In an embodiment, the T-BOSSES platform may provide a button (on a suitable GUI) that an acquiring user pushes if she wants to be in line for the item. Functionality may be provided by the platform whereby the button changes color, is disabled, is enabled, or varies some other attribute dependent on whether there is availability of the item.

In step 3803, at some later point in time relative to step 3802, the acquiring user checks back to the offering user's page, sees that the line for the desired item that has availability, and selects the item (through interface with the T-BOSSES platform) thus placing herself in a virtual, digital line i.e. the line as described herein, for hopeful securement of the desired item.

In step 3804, the acquiring user's turn comes up, i.e., she is next in line. This processing is controlled by the T-BOSSES platform and conveyed to the acquiring user via web interface, for example.

In step 3805, the acquiring user and the offering user engage in communication to discuss the particular item. Such communication may be facilitated by the T-BOSSES platform through various communication channels. For example, such communications might be provided through a T-BOSSES internal messaging system and/or through a T-BOSSES internal video chat system, for example. The nature of this communication may be to exchange any needed information to facilitate transfer of the item. In accordance with some embodiments of the invention, is appreciated that the "item" of the invention that is being sold does not necessarily have to be a physical item. Rather, for example, an offering user might take a video of a service she is providing. Accordingly, the systems and methods of the invention may be utilized with various manifestations of an offered "item" and need not necessarily be a physical item.

As otherwise described herein, once a user is next in line (such that she is provided the option to purchase the particular item) that user may be limited by the particular amount of time she can take. Illustratively, this amount of time might be one hour or two hours. The particular time period might be varied on the nature of the item.

In step 3806, the acquiring user inputs into the T-BOSSES site that she wants to buy.

In step 3807, the acquiring user and the offering user both put their respective addresses into the T-BOSSES platform via interface by web browser, for example.

In step 3808, the T-BOSSES platform generates and eye-stop location between the offering user and the acquiring user—and outputs such identified location to each user. Relatedly, is appreciated that the interrelationship between an offering user opting to be placed in line for an item, generation and availability of eye-stop information, and actual commitment to buy an item (by the acquiring user from the offering user) may be varied in the various embodiments described herein, as desired. For example, eye-stop information regarding a particular offering user might be available to an acquiring user even before that acquiring user opts to be placed in line (for an item). On the other hand, in other embodiments, eye-stop information might only be available after an acquiring user commits to purchasing an item. Also, it is appreciated that the eye stop processing of the invention, in one embodiment, might wait for the input of address information from both the offering user and the acquiring user, i.e., after commitment to purchase the item, for example. However, in other embodiments the T-BOSSES platform may simply utilize address information on file for each user—and output a determined eye-stop location in an automated manner at any point in the process, as may be desired. Accordingly, eye-stop information may be displayed to users at any point in the process, as desired. Further, eye-stop information may be displayed spatially on a user's webpage as desired, such as for example on the side adjacent to an offered item. As otherwise described herein, the T-BOSSES platform may generate an available eye-stop location based on the address of the acquiring user and the offering user—through the use of some algorithm or methodology. In one embodiment, the system may determine the geographical midpoint between the 2 users—and then determine the closest eye-stop to that geographical midpoint. Functionality may be provided by the T-BOSSES platform such that either the offering user or the acquiring user might override the automated determination of the T-BOSSES platform. However, for purposes of safety and personal dynamics in use of the system, it may be advantageous to simply have the T-BOSSES platform choose the eye-stop location.

In step 3809, the two users meet up at the safe eye-stop location for physical transfer of the item. Funds are then exchanged from the acquiring user to the offering user in any suitable manner, such as via PayPal. It is appreciated that any of a wide variety of records may be maintained by the T-BOSSES system regarding engagement by users, transfers of items by users, the value of items sold, time spent on the system, and/or other attributes relating to a given user's engagement with the T-BOSSES system. For example, the T-BOSSES platform might maintain and appropriately publish data regarding a top seller in a geographical area. Of course, the maintenance and securement of any such data would be subject to suitable rules, regulations, and terms of use, etc.

It is appreciated that features of one embodiment as described herein may be used in conjunction with features of other embodiments, as may be desired.

Hereinafter, further aspects of implementation of the systems and methods of the invention will be described.

As described herein, embodiments of the system of the invention and various processes of embodiments are described. The system of the invention or portions of the system of the invention may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, code or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the invention may be in the form of a processing machine. The processing machine may also utilize (or be in the form of)

any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention on the processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. An apparatus to distribute a video item over a network through interface with a community of users, the apparatus in the form of a tangibly embodied computer processor, the computer processor including instructions on a non-transitory computer medium disposed in a database, the apparatus comprising:

a communication portion that interfaces between the computer processor and a plurality of electronic user devices;

the database; and the computer processor, the computer processor performing processing including interfacing with a first user device of a first user over the network to input the video item, such interfacing including (a) inputting a user created video in the form of video media data, over a recording time, with a recorded item description of an item by the first user in the video, and (b) inputting video attribute data of the video item including a first video attribute, and the video media data and the video attribute data collectively constituting the video item; and storing the video item in the database;

outputting, by the computer processor over the network, the first video attribute over the network so as to be available by a community of users associated with the first user, and the community of users including a second user;

presenting, by the computer processor over the network, the second user with the first video attribute for prospect selection, the presenting including the first video attribute being presented, in a web session along with other video items;

inputting, by the computer processor in the web session with the second user over the network, selection data representing that the second user selected the first video attribute;

outputting in response to the selection data, by the computer processor in the web session with the second user over the network, the video media data, and such outputting including playing, by the second user, the video media data over the recording time so as to view the item description by the first user;

inputting, by the computer processor in the web session with the second user over the network, second selection data representing that the second user has selected to be in line for the video item;

placing the second user in the line for the video item;

interfacing with the second user in the web session, over the network, to input an indication to acquire the item, and based on the indication, initiating eye-stop processing including performing a determination of a physical geo location, and the eye-stop processing based on eye-stop data that is associated with the video item, and the eye-stop processing, performed by the computer processor, including:

interfacing with the first user, over the network, to input a first address from the first user via the first user device; and interfacing with the second user, over the network, to input a second address from the second user.

2. The apparatus of claim 1, the interfacing with the first user device over the network is performed in the environment of a web session between the computer processor and the first user device.

3. The apparatus of claim 1, the inputting the second selection data is performed in conjunction with enabling a selection button displayed to the second user via the network.

4. The apparatus of claim 1, the eye-stop processing including the computer processor comparing the first address with available eye-stop locations, and comparing the second address with available eye-stop locations; and
   determining a proximate eye-stop from the available eye-stop locations.

5. The apparatus of claim 4, the determining the proximate eye-stop from the available eye-stop locations includes determining an eye-stop location that is disposed most proximate to a geo center point between the first address and the second address.

6. The apparatus of claim 1, the computer processor automatically outputting an eye-stop location, in the eye-stop processing, based on stored address information of each of the first user and the second user.

7. The apparatus of claim 1, the outputting, by the computer processor over the network, the first video attribute over the network so as to be available by the community of users associated with the first user includes:
   constraining the outputting based on proximity of a determined geo location of the first user device, the geo location of the first user device based on IP address of the first user device.

8. The apparatus of claim 1, the outputting, by the computer processor over the network, the first video attribute over the network so as to be available by the community of users associated with the first user includes:
   constraining the outputting based on a virtual group to which the first user is associated.

9. The apparatus of claim 1, the computer processor determining that the number of other users currently in line for the video item exceed a predetermined threshold, and limiting further users from entering the line for the video item.

10. The apparatus of claim 1, the computer processor determining that the number of other users currently in line for the video item exceed a predetermined threshold, and enhancing a social status attribute of the first user based on such determination.

11. The apparatus of claim 10, the enhancing the social status attribute of the first user including enhancing icon population on a webpage of the first user.

12. The apparatus of claim 1, the computer processor including performing processing in advance of the interfacing with the first user to input the video item, the processing in advance including:
   interfacing with the first user to input an item description and populate a queue data record with the item description; interfacing with the first user to input a queue video, and interfacing with the first user to input a time window.

13. The apparatus of claim 1, the item is one of a personal item and real estate.

14. An apparatus to distribute a video item over a network through interface with a community of users, the apparatus in the form of a tangibly embodied computer processor, the computer processor including instructions on a non-transitory computer medium disposed in a database, the apparatus comprising:
   a communication portion that interfaces between the computer processor and a plurality of electronic user devices;
   the database; and
   the computer processor, the computer processor performing processing including
      interfacing with a first user device of a first user over the network to input the video item, such interfacing including (a) inputting video media data, over a recording time, including a recorded item description of an item, and (b) inputting video attribute data of the video item including a first video attribute, and the video media data and the video attribute data collectively constituting the video item;
      storing the video item in the database;
      outputting, by the computer processor over the network, the first video attribute over the network so as to be available by a community of users, and the community of users including a second user;
      presenting, by the computer processor over the network, the second user with the first video attribute for prospect selection, the presenting including the first video attribute being presented, in a web session;
      inputting, by the computer processor in the web session with the second user over the network, selection data representing that the second user selected the first video attribute;
      outputting in response to the selection data, by the computer processor in the web session with the second user over the network, the video media data, and such outputting including playing, by the second user, the video media data over the recording time so as to view the item description;
      inputting, by the computer processor in the web session with the second user over the network, second selection data representing that the second user has selected to be in line for the video item; and
      placing the second user in the line, for the video item, along with further users; and
      the computer processor determining that the number of other users currently in line for the video item exceed a predetermined threshold, and enhancing a social status attribute of the first user based on such determination.

15. The apparatus of claim 14, the computer processor performing processing including:
   interfacing with the second user, over the network, to input an indication to acquire the item, and based on the indication, initiating eye-stop processing including performing a determination of a physical geo location, and the eye-stop processing, performed by the computer processor, including:
      interfacing with the first user, over the network, to input a first address from the first user via the first user device;
      interfacing with the second user, over the network, to input a second address from the second user; and
      determining the physical geo location based on the first address and the second address.

16. The apparatus of claim 14, the computer processor determining whether a number of further users in line are below a predetermined threshold prior to placing the second user in the line.

17. The apparatus of claim 1, the computer processor determining that the number of other users currently in line for the video item exceed a predetermined threshold, and limiting further users from entering the line for the video item; and the computer processor including performing processing in advance of the interfacing with the first user to input the video item, the processing in advance including: interfacing with the first user to input an item description and populate a queue data record with the item description; interfacing with the first user to input a queue video, and interfacing with the first user to input a time window.

* * * * *